(12) United States Patent
Yamagishi et al.

(10) Patent No.: US 8,154,602 B2
(45) Date of Patent: Apr. 10, 2012

(54) VIDEO QUALITY ESTIMATION APPARATUS, METHOD, AND PROGRAM

(75) Inventors: Kazuhisa Yamagishi, Tokyo (JP); Takanori Hayashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1170 days.

(21) Appl. No.: 11/886,406

(22) PCT Filed: Nov. 28, 2006

(86) PCT No.: PCT/JP2006/023733
§ 371 (c)(1),
(2), (4) Date: Sep. 13, 2007

(87) PCT Pub. No.: WO2007/129423
PCT Pub. Date: Nov. 15, 2007

(65) Prior Publication Data
US 2009/0225170 A1    Sep. 10, 2009

(30) Foreign Application Priority Data
May 9, 2006    (JP) ................................. 2006-130085

(51) Int. Cl.
*H04N 17/02* (2006.01)
*H04B 3/46* (2006.01)
*G01N 37/00* (2006.01)

(52) U.S. Cl. ........ 348/192; 370/252; 375/224; 375/225; 375/226; 375/228; 702/81

(58) Field of Classification Search ........................ None
See application file for complete search history.

(56) References Cited

U.S. PATENT DOCUMENTS
7,812,857 B2 * 10/2010 Bourret ........................ 348/180

FOREIGN PATENT DOCUMENTS
| JP | 06-090441 | 3/1994 |
| JP | 2004-349824 | 12/2004 |
| JP | 2005-142900 A | 6/2005 |

(Continued)

OTHER PUBLICATIONS

Mohamed et al., "Real-time Video Quality Assessment in Packet Networks: A Neural Network Model", Institut National De Recherche en Informatique et en Automatique, May 2001.*

(Continued)

*Primary Examiner* — Kristine Kincaid
*Assistant Examiner* — James Marandi
(74) *Attorney, Agent, or Firm* — Blakely, Sokoloff, Taylor & Zafman

(57) ABSTRACT

In estimating subjective video quality corresponding to main parameters which are input as an input frame rate representing the number of frames per unit time, an input coding bit rate representing the number of coding bits per unit time, and an input packet loss rate representing a packet loss occurrence probability of an audiovisual medium, a degradation model specifying unit specifies a degradation model representing the relationship between the packet loss rate and the degradation in reference subjective video quality on the basis of the input frame rate and input coding bit rate. A desired subjective video quality estimation value is calculated by correcting the reference subjective video quality on the basis of a video quality degradation ratio corresponding to the input packet loss rate calculated by using the degradation model.

7 Claims, 31 Drawing Sheets

FOREIGN PATENT DOCUMENTS

| | | |
|---|---|---|
| JP | 2006-033722 A | 2/2006 |
| JP | 2006-074333 A | 3/2006 |

OTHER PUBLICATIONS

Mohamed et al., "A Study of Real-Time Packet Video Quality Using Random Neural Networks", IEEE Transactions on Circuits and Systems for Video Technology, Dec. 2002.*

Yamagishi et al., "Video Quality Estimation Model based on Displaysize and Resolution for Audiovisual Communication Services", IEICE Technical Report, Sep. 2005, vol. 105, No. 282, pp. 61-64, Abstract.

Miyata et al., "Scalable Video Coding based on Subjective Quality—An Approach of Nonuniform Frame Period—", SIG Technical Report, Oct. 2003, vol. 2003, No. 99, pp. 29-34, Abstract.

Arayama et. al., "Opinion model for audio-visual communication quality from quality parameters by coding and packet loss", IEICE Technical Report, Nov. 2005, vol. 105, No. 406, pp. 57-60, Abstract.

Yamagishi et al., "Video Quality Opinion Model for Audiovisual Communication Services", IEICE, Oct. 2006, Abstract.

Yamagishi et al., "Verification of Video Quality Opinion Model for Audiovisual Communication Services", Proceedings of IEICE Society Conference, Sep. 2006, Abstract.

Yamagishi et al., "A Proposal of Video Quality Opinion Model for Audiovisual Communication Services", IEICE Technical Report, Jul. 2006, vol. 106, No. 153, Abstract.

Yamagishi et al., "Video quality estimation function for videophone services", Jun. 2006.

Yamagishi et al., "Opinion Model for Estimating Video Quality of Videophone Services", IEEE Global Telecommunications Conference, Nov.-Dec. 2006.

Yamagishi et al., "Verification of Video Quality Opinion Model for Videophone Services", $2^{nd}$ ISCA/DEGA Tutorial and Research Workshop on Perceptual Quality of Systems, Sep. 2006.

ITU-T recommendation J.144.

* cited by examiner

```
┌─────────────────────────────┐
│   VIDEO QUALITY ESTIMATION  │
└──────────────┬──────────────┘
               ▼
┌─────────────────────────────────────────────────────────────────┐
│ EXTRACT INPUT FRAME RATE fr, INPUT CODING BIT RATE br, INPUT    │── S100
│ PACKET LOSS RATE pl, AND REFERENCE SUBJECTIVE VIDEO QUALITY     │
│ FROM ESTIMATION CONDITIONS                                      │
└─────────────────────────────────────────────────────────────────┘
               ▼
┌─────────────────────────────────────────────────────────────────┐
│ CALCULATE DEGRADATION INDEX τ₁(fr) CORRESPONDING TO INPUT       │── S101
│ FRAME RATE fr BY REFERRING TO FRAME RATE VS. DEGRADATION        │
│ INDEX CHARACTERISTIC                                            │
└─────────────────────────────────────────────────────────────────┘
               ▼
┌─────────────────────────────────────────────────────────────────┐
│ CALCULATE DEGRADATION INDEX τ₂(br) CORRESPONDING TO INPUT       │── S102
│ CODING BIT RAGE br BY REFERRING TO CODING BIT RAGE VS.          │
│ DEGRADATION INDEX CHARACTERISTIC                                │
└─────────────────────────────────────────────────────────────────┘
               ▼
┌─────────────────────────────────────────────────────────────────┐
│ SPECIFY DEGRADATION MODEL BY CALCULATING DEGRADATION INDEX      │── S103
│ τ(fr,br) FROM DEGRADATION INDICES τ₁(fr) AND τ₂(br)             │
└─────────────────────────────────────────────────────────────────┘
               ▼
┌─────────────────────────────────────────────────────────────────┐
│ CALCULATE VIDEO QUALITY DEGRADATION RATIO P(fr,br,pl)           │── S104
│ CORRESPONDING TO INPUT PACKET LOSS RATE pl BY REFERRING TO      │
│ DEGRADATION MODEL                                               │
└─────────────────────────────────────────────────────────────────┘
               ▼
┌─────────────────────────────────────────────────────────────────┐
│ CORRECT REFERENCE SUBJECTIVE VIDEO QUALITY BY USING             │── S105
│ VIDEO QUALITY DEGRADATION RATIO P(fr,br,pl)                     │
└─────────────────────────────────────────────────────────────────┘
               ▼
           ┌───────┐
           │  END  │
           └───────┘
```

FIG. 9

| INPUT FRAME RATE | INPUT CODING BIT RATE | DEGRADATION INDEX |
|---|---|---|
| fr [fps] | br [kbps] | τ |
| 30 | 2048 | 3.5 |
| 15 | 2048 | 1.2 |
| 10 | 2048 | 1.0 |
| ⋮ | ⋮ | ⋮ |
| 10 | 1024 | 1.0 |
| ⋮ | ⋮ | ⋮ |
| 1 | 64 | 0.5 |

| DEGRADATION INDEX COEFFICIENT DATABASE 26 | | | | | | | |
|---|---|---|---|---|---|---|---|
| COMMUNICATION TYPE PARAMETER 25A | REPRODUCTION PERFORMANCE PARAMETER 25B | | | | | REPRODUCTION ENVIRONMENT PARAMETER 25C | DEGRADATION INDEX COEFFICIENTS 27 |
| TASK | ENCODING METHOD | VIDEO FORMAT | KEY FRAME [sec] | MONITOR SIZE [inch] | MONITOR RESOLUTION | INDOOR LUMINANCE | a | b | ... | i |
| VIDEOPHONE | MPEG1 | VGA | 1 | 17 | 1280 × 1024 | 500 | 0.2 | 0.3 | ... | 0.5 |
| VIDEO DISTRIBUTION | MPEG4 | QVGA | 3 | 15 | 1024 × 768 | 500 | 0.7 | 0.5 | ... | 0.9 |
| VIDEO DISTRIBUTION | H264 | QVGA | 3 | 15 | 1024 × 768 | 500 | 0.2 | 0.9 | ... | 0.8 |

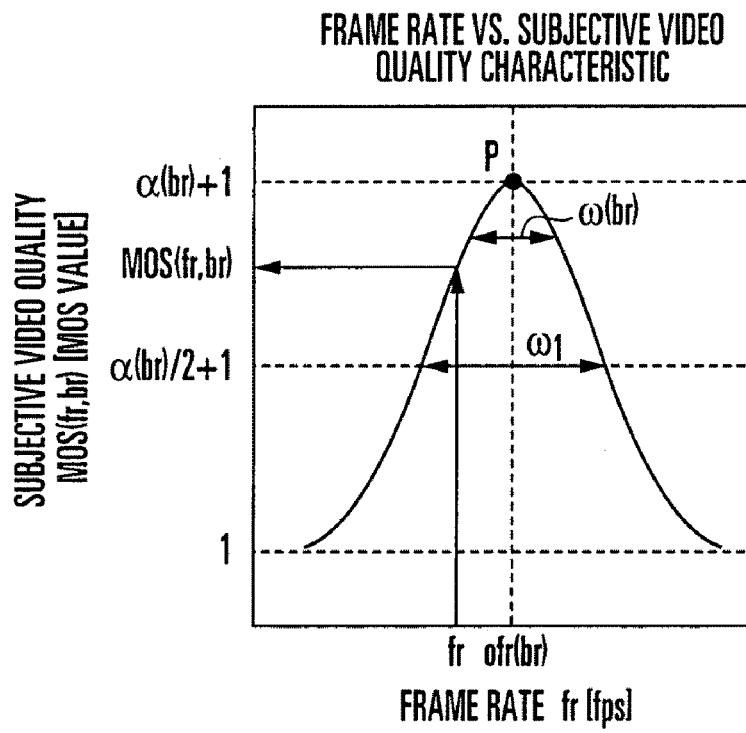
F I G. 21
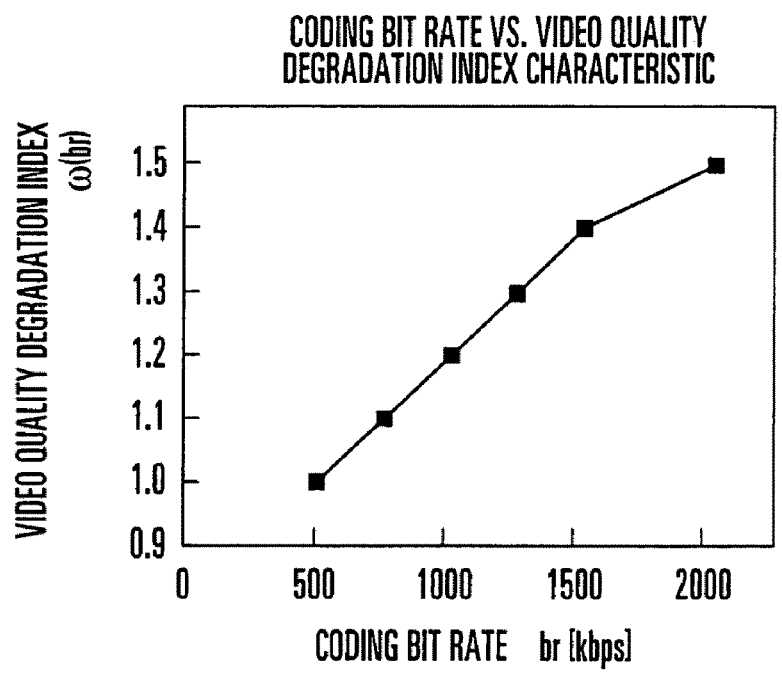
F I G. 22

| INPUT CODING BIT RATE br [kbps] | OPTIMUM FRAME RATE ofr(br) [fps] | BEST VIDEO QUALITY α(br) [MOS] | VIDEO QUALITY DEGRADATION INDEX ω(br) |
|---|---|---|---|
| 2048 | 30 | 3.5 | 1.5 |
| ⋮ | ⋮ | ⋮ | ⋮ |
| 1024 | 10 | 2.5 | 1.0 |
| ⋮ | ⋮ | ⋮ | ⋮ |
| 64 | 3 | 0.5 | 0.5 |

FIG. 27

CHARACTERISTIC COEFFICIENT DATABASE 28

| COMMUNICATION TYPE PARAMETER 25A | REPRODUCTION PERFORMANCE PARAMETER 25B | | | | | REPRODUCTION ENVIRONMENT PARAMETER 25C | CHARACTERISTIC COEFFICIENTS 29 | | | |
|---|---|---|---|---|---|---|---|---|---|---|
| TASK | ENCODING METHOD | VIDEO FORMAT | KEY FRAME [sec] | MONITOR SIZE [inch] | MONITOR RESOLUTION | INDOOR LUMINANCE | j | k | ... | p |
| VIDEOPHONE | MPEG1 | VGA | 1 | 17 | 1280 × 1024 | 500 | 0.2 | 0.3 | ... | 0.5 |
| VIDEO DISTRIBUTION | MPEG4 | QVGA | 3 | 15 | 1024 × 768 | 500 | 0.7 | 0.5 | ... | 0.9 |
| VIDEO DISTRIBUTION | H264 | QVGA | 3 | 15 | 1024 × 768 | 500 | 0.2 | 0.9 | ... | 0.8 |
| ....... | | | | | | | | | ....... | |

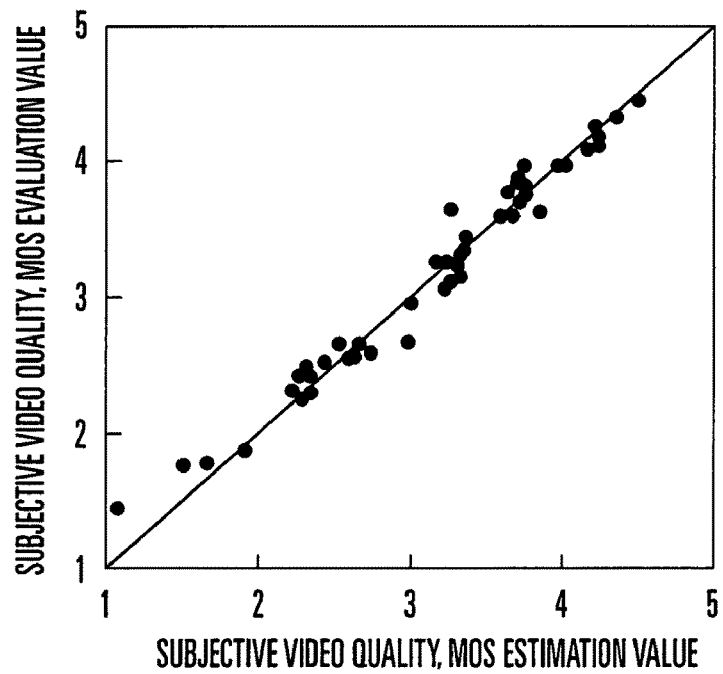
F I G. 31
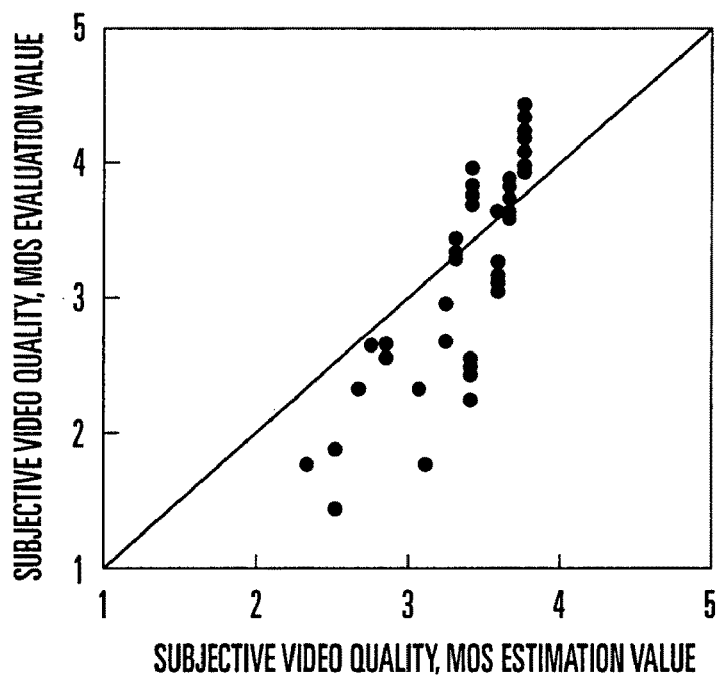
F I G. 32

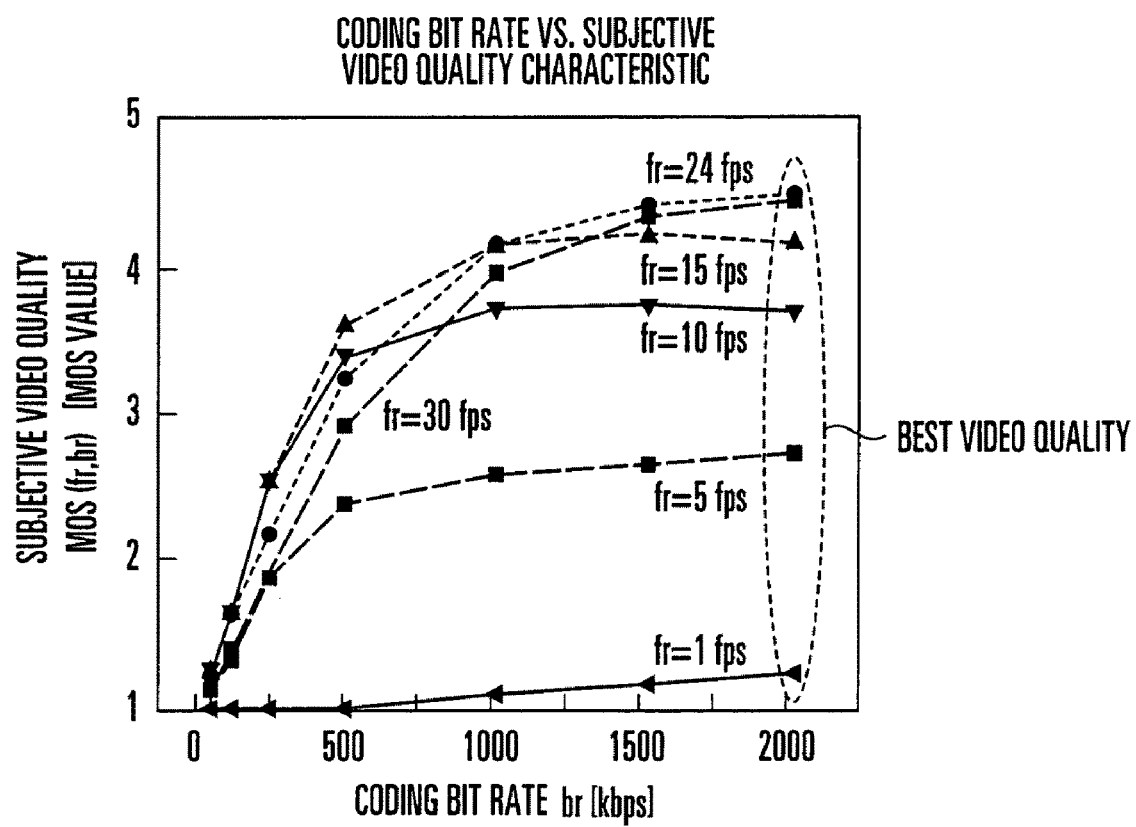
F I G. 34

| INPUT FRAME RATE fr [fps] | BEST VIDEO QUALITY β(fr) [MOS] | VIDEO QUALITY FIRST CHANGE INDEX δ(fr) | VIDEO QUALITY SECOND CHANGE INDEX ε(fr) |
|---|---|---|---|
| 30 | 4.8 | 500 | 1.73 |
| ⋮ | ⋮ | ⋮ | ⋮ |
| 15 | 4.3 | 260 | 1.97 |
| ⋮ | ⋮ | ⋮ | ⋮ |
| 10 | 3.8 | 240 | 2.06 |

FIG. 42

| COEFFICIENT DATABASE 28 | COMMUNICATION TYPE PARAMETER 25A | REPRODUCTION PERFORMANCE PARAMETER 25B | | | | | REPRODUCTION ENVIRONMENT PARAMETER 25C | CHARACTERISTIC COEFFICIENTS 29 | | | |
|---|---|---|---|---|---|---|---|---|---|---|---|
| | TASK | ENCODING METHOD | VIDEO FORMAT | KEY FRAME [sec] | MONITOR SIZE [inch] | MONITOR RESOLUTION | INDOOR LUMINANCE | j | k | r | q |
| | VIDEOPHONE | MPEG1 | VGA | 1 | 17 | 1280×1024 | 500 | 0.2 | 0.3 | 0.5 | 0.5 |
| | VIDEO DISTRIBUTION | MPEG4 | QVGA | 3 | 15 | 1024×768 | 500 | 0.7 | 0.5 | 0.6 | 0.9 |
| | VIDEO DISTRIBUTION | H264 | QVGA | 3 | 15 | 1024×768 | 500 | 0.2 | 0.9 | 0.7 | 0.8 |
| | | | | ........ | | | | | | ........ | |

VIDEO QUALITY ESTIMATION APPARATUS, METHOD, AND PROGRAM

The present patent application is a non-provisional application of International Application No. PCT/JP2006/323733, filed Nov. 28, 2006.

TECHNICAL FIELD

The present invention relates to an audiovisual communication technique and, more particularly, to a video quality estimation technique of estimating subjective video quality a viewer actually senses when a terminal receives and reproduces an audiovisual medium encoded into a plurality of frames.

BACKGROUND ART

Advance in high-speed and broadband Internet access networks is raising expectations for spread of audiovisual communication services which transfer audiovisual media containing video and audio data between terminals or server terminals via the Internet.

Audiovisual communication services of this type use encoding communication to improve the audiovisual medium transfer efficiency, in which an audiovisual medium is encoded into a plurality of frames and transferred using intra-image or inter-frame autocorrelation of the audiovisual medium or human visual characteristic.

On the other hand, a best-effort network such as the Internet used for the audiovisual communication services does not always guarantee the communication quality. For this reason, in transferring a streaming content such as an audiovisual medium having a temporal continuity via the internet, narrow bands or congestions in communication lines are perceptible as degradation in quality, i.e., subjective video quality a viewer actually senses from the audiovisual medium received and reproduced via the communication lines. Additionally, encoding by an application adds encoding distortions to the video image, which are perceptible as degradation in subjective video quality. More specifically, the viewer perceives degradation in quality of an audiovisual medium as defocus, blur, mosaic-shaped distortion, and jerky effect in the video image.

In the audiovisual communication services that transfer audiovisual media, quality degradation is readily perceived. To provide a high-quality audiovisual communication service, quality design of applications and networks before providing the service and quality management after the start of the service are important. This requires a simple and efficient video quality evaluation technique capable of appropriately expressing video quality enjoyed by a viewer.

As a conventional technique of estimating the quality of an audio medium as one of streaming contents, ITU-T recommendation P.862 (International Telecommunication Union-Telecommunication Standardization Sector) defines an objective speech quality evaluation method PESQ (Perceptual Evaluation of Speech Quality) which inputs a speech signal. ITU-T recommendation G.107 describes an audio quality estimation method which inputs audio quality parameters and is used for quality design in VoIP (Voice over IP).

On the other hand, as a technique of estimating the quality of a video medium, an objective video image evaluation method (e.g., ITU-T recommendation J.144: to be referred to as reference 1 hereinafter) which inputs a video signal is proposed as a recommendation. A video quality estimation method which inputs video quality parameters is also proposed (e.g., Yamagishi & Hayashi, "Video Quality Estimation Model based on Display size and Resolution for Audiovisual Communication Services", IEICE Technical Report CQ2005-90, 2005/09, pp. 61-64: to be referred to as reference 2 hereinafter). This technique formalizes the video quality on the basis of the relationship between the video quality and each video quality parameter and formalizes the video quality by the linear sum of the products. A quality estimation model taking coding parameters and packet loss into account is also proposed (e.g., Arayama, Kitawaki, & Yamada, "Opinion model for audio-visual communication quality for quality parameters by coding and packet loss", IEICE Technical Report CQ2005-77, 2005/11, pp. 57-60: to be referred to as reference 3 hereinafter).

DISCLOSURE OF INVENTION

Problems to be Solved by the Invention

In quality design and quality management of applications and networks, specific and useful guidelines for quality design/management corresponding to various conditions related to audiovisual communication services are necessary. Especially because of the existence of many factors, i.e., video quality parameters affecting the video quality of an audiovisual communication service, it is important to obtain guidelines for quality design/management to know the influence of video quality parameters on the video quality or a specific video quality parameter that should be improved and its improving effect on the video quality.

Factors greatly affecting the video quality are a coding bit rate and a frame rate which represent the contents of encoding of an audiovisual medium. The coding bit rate is a value representing the number of coding bits per unit time of an audiovisual medium. The frame rate is a value representing the number of frames per unit time of an audiovisual medium.

In providing a video image encoded at a certain coding bit rate, when the video image is encoded at a high frame rate, the temporal video quality can be improved because a smooth video image is obtained. On the other hand, spatial image degradation may become noticeable because of the decrease in the number of coding bits per unit frame, resulting in poor video quality. When the video image is encoded by using a large number of coding bits per unit frame, spatial image degradation improves so that a higher video quality can be obtained. However, since the number of frames per unit time decreases, temporal frame drop with a jerky effect may take place, resulting in poor video quality.

Another factor greatly affecting the video quality is a packet loss rate. The packet loss rate represents a packet loss occurrence probability used to transfer an audiovisual medium, which occurs in a communication network or terminal.

Normally, a high packet loss rate inhibits normal decoding of an encoded audiovisual medium, resulting in poor video quality. If the coding bit rate is low, the influence of the packet loss rate on the video quality is small. However, even when the packet loss rate does not change, it greatly affects the video quality if the coding bit rate is high. The packet loss rate has the same characteristic feature as described above even in association with the frame rate.

Hence, specific and useful guidelines for quality design/management are important to know the set values of the coding bit rate, frame rate, and packet loss rate and video quality corresponding to them in consideration of the influence of the packet loss rate on the video quality, which changes depending on the coding bit rate and frame rate.

However, the objective quality evaluation method using a video signal as an input which is described in reference 1 above, estimates the video quality in consideration of a feature of a video image, i.e., a feature calculated from spatial and temporal distortions. Hence, the influence of many factors, i.e., video quality parameters on the video quality of an audiovisual communication service is indefinite. It is therefore impossible to obtain guidelines for quality design/management to know a video quality parameter that should be improved and its improving effect on the video quality.

References 2 and 3 above describe video quality estimation methods using video quality parameters as an input. These methods, however, do not consider the fact that the influence of packet loss on video quality changes depending on the set of the coding bit rate and frame rate. It is therefore impossible to obtain specific and useful guidelines for quality design/management in quality design and quality management of applications and networks.

The present invention has been made to solve the above-described problems, and has as its object to provide a video quality estimation apparatus, method, and program capable of obtaining specific and useful guidelines for quality design/management considering the influence of the packet loss rate on video quality, which changes depending on the coding bit rate and frame rate.

Means of Solution to the Problems

To solve the above-described problems, a video quality estimation apparatus according to the present invention comprises a parameter extraction unit which extracts, as main parameters, an input coding bit rate representing the number of coding bits per unit time, an input frame rate representing the number of frames per unit time, and an input packet loss rate representing a packet loss occurrence probability of an audiovisual medium encoded into a plurality of frames, a first storage unit which stores reference subjective video quality representing subjective video quality of the audiovisual medium encoded at the input coding bit rate and the input frame rate without packet loss, a degradation model specifying unit which specifies a degradation model representing a relationship between the input packet loss rate and degradation in the reference subjective video quality on the basis of the input coding bit rate and the input frame rate, and a video quality correction unit which corrects the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal.

A video quality estimation method according to the present invention comprises the steps of causing a parameter extraction unit to extract, as main parameters, an input coding bit rate representing the number of coding bits per unit time, an input frame rate representing the number of frames per unit time, and an input packet loss rate representing a packet loss occurrence probability of an audiovisual medium encoded into a plurality of frames, causing a first storage unit to store reference subjective video quality representing subjective video quality of the audiovisual medium encoded at the input coding bit rate and the input frame rate without packet loss, causing a degradation model specifying unit to specify a degradation model representing a relationship between the input packet loss rate and degradation in the reference subjective video quality on the basis of the input coding bit rate and the input frame rate, and causing a video quality correction unit to correct the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal.

A program according to the present invention causes a computer of a video quality estimation apparatus which calculates, for audiovisual communication to transmit an audiovisual medium encoded into a plurality of frames to an arbitrary terminal via a communication network, an estimation value of subjective video quality a viewer actually senses from the audiovisual medium reproduced on the terminal, to execute the steps of causing a parameter extraction unit to extract, as main parameters, an input coding bit rate representing the number of coding bits per unit time, an input frame rate representing the number of frames per unit time, and an input packet loss rate representing a packet loss occurrence probability of an audiovisual medium encoded into a plurality of frames, causing a storage unit to store reference subjective video quality representing subjective video quality of the audiovisual medium encoded at the input coding bit rate and the input frame rate without packet loss, causing a degradation model specifying unit to specify a degradation model representing a relationship between the input packet loss rate and degradation in the reference subjective video quality on the basis of the input coding bit rate and the input frame rate, and causing a video quality correction unit to correct the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal.

Effects of the Invention

According to the present invention, in estimating subjective video quality corresponding to main parameters which are input as an input frame rate representing the number of frames per unit time, an input coding bit rate representing the number of coding bits per unit time, and an input packet loss rate representing a packet loss occurrence probability of an audiovisual medium, the degradation model specifying unit specifies a degradation model representing the relationship between the packet loss rate and the degradation in reference subjective video quality on the basis of the input frame rate and input coding bit rate. The reference subjective video quality is corrected on the basis of a video quality degradation ratio corresponding to the input packet loss rate calculated by using the degradation model.

It is therefore possible to calculate a video quality degradation ratio corresponding to a packet loss rate input as an estimation condition by referring to the degradation model corresponding to the input coding bit rate and frame rate input as estimation conditions and correct reference subjective video quality on the basis of the video quality degradation ratio to obtain a desired video quality estimation value.

This allows to obtain specific and useful guidelines for quality design/management to know the set values of the coding bit rate, frame rate, and packet loss rate and video quality corresponding to them in consideration of the influence of the packet loss rate on the video quality, which changes depending on the coding bit rate and frame rate. The guidelines are highly applicable in quality design of applications and networks before providing a service and quality management after the start of the service.

BRIEF DESCRIPTION OF DRAWINGS

FIG. 9 is a flowchart illustrating the video quality estimation process of the video quality estimation apparatus according to the first embodiment of the present invention;

FIG. 10 is a view showing a structural example of degradation index information;

FIG. 13 is an explanatory view showing an arrangement of a degradation index coefficient DB;

FIG. 21 is an explanatory view showing a frame rate vs. subjective video quality characteristic modeled by a Gaussian function;

FIG. 22 is a graph showing a coding bit rate vs. video quality degradation index characteristic;

FIG. 27 is an explanatory view showing an arrangement of a characteristic coefficient DB;

FIG. 31 is a graph showing the estimation accuracy of a video quality estimation apparatus using the embodiment;

FIG. 32 is a graph showing the estimation accuracy of a conventional video quality estimation apparatus;

FIG. 34 is a graph showing a coding bit rate vs. subjective video quality characteristic of an audiovisual medium in an audiovisual communication service;

FIG. 42 is an explanatory view showing an arrangement of a coefficient DB;

BEST MODE FOR CARRYING OUT THE INVENTION

The embodiments of the present invention will be described next with reference to the accompanying drawings.

First Embodiment

Figure 1:
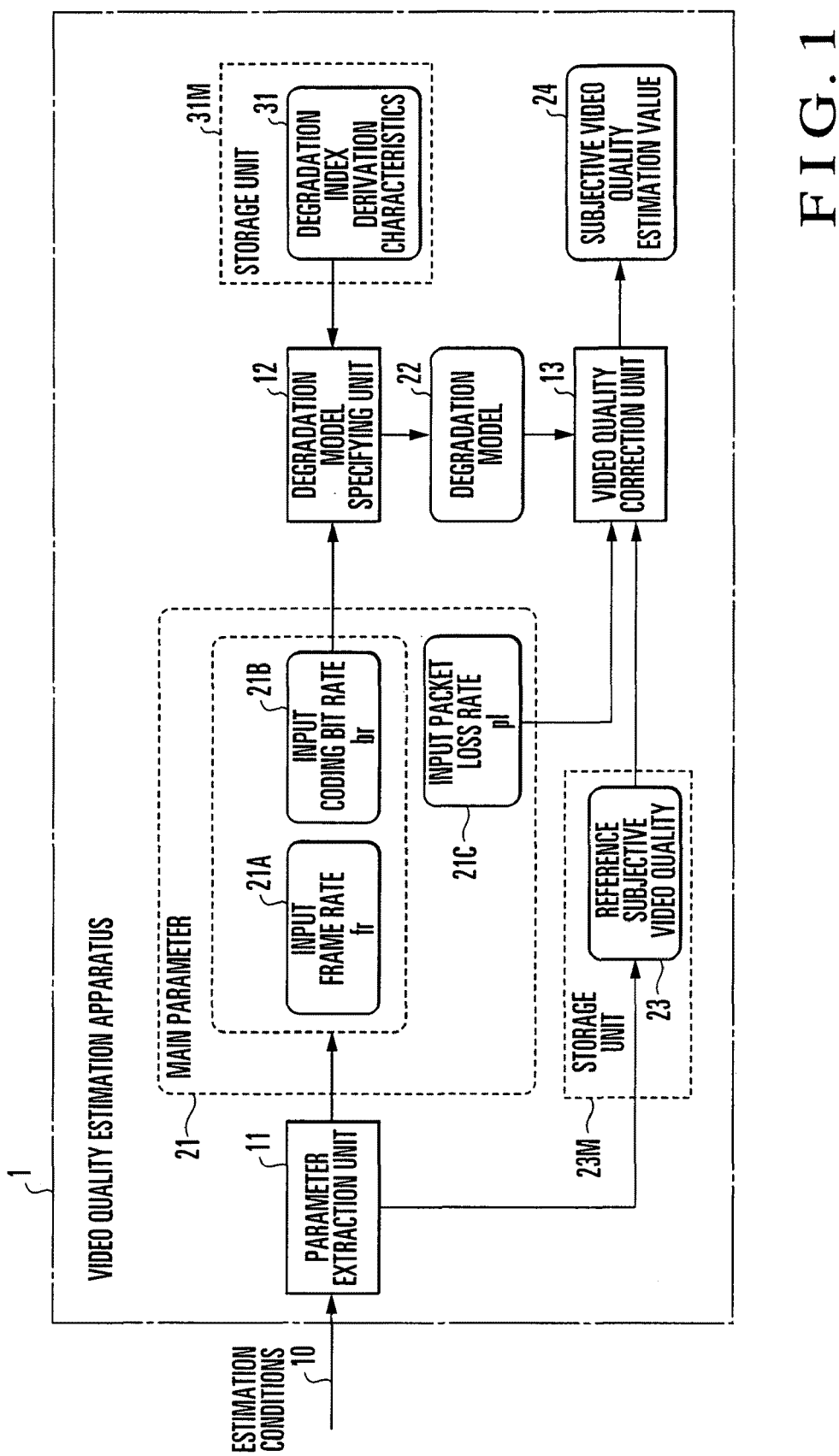
FIG. 1 is a block diagram showing the arrangement of a video quality estimation apparatus according to the first embodiment of the present invention.

A video quality estimation apparatus according to the first embodiment of the present invention will be described first with reference to FIG. 1. FIG. 1 is a block diagram showing the arrangement of the video quality estimation apparatus according to the first embodiment of the present invention.

A video quality estimation apparatus 1 is formed from an information processing apparatus such as a computer that calculates input information. In audiovisual communication for transmitting an audiovisual medium encoded into a plurality of frames to an arbitrary terminal via a communication network, the video quality estimation apparatus 1 inputs estimation conditions about the audiovisual medium and the communication network and calculates, by using a predetermined estimation model, the estimation value of subjective video quality a viewer actually senses from the audiovisual medium reproduced on the terminal.

In this embodiment, an input coding bit rate representing the number of coding bits per unit time, an input frame rate representing the number of frames per unit time, and an input packet loss rate representing the packet loss occurrence probability of an audiovisual medium are input. For reference subjective video quality indicating the subjective video quality of an audiovisual medium encoded at the input coding bit rate and input frame rate, a degradation model representing the relationship between the packet loss rate and degradation in reference subjective video quality is specified on the basis of the input coding bit rate and input frame rate. The reference subjective video quality is corrected on the basis of a video quality degradation ratio corresponding to a packet loss calculated by the specified degradation model, thereby calculating an estimation value.

[Video Quality Estimation Apparatus]

Figure 2:
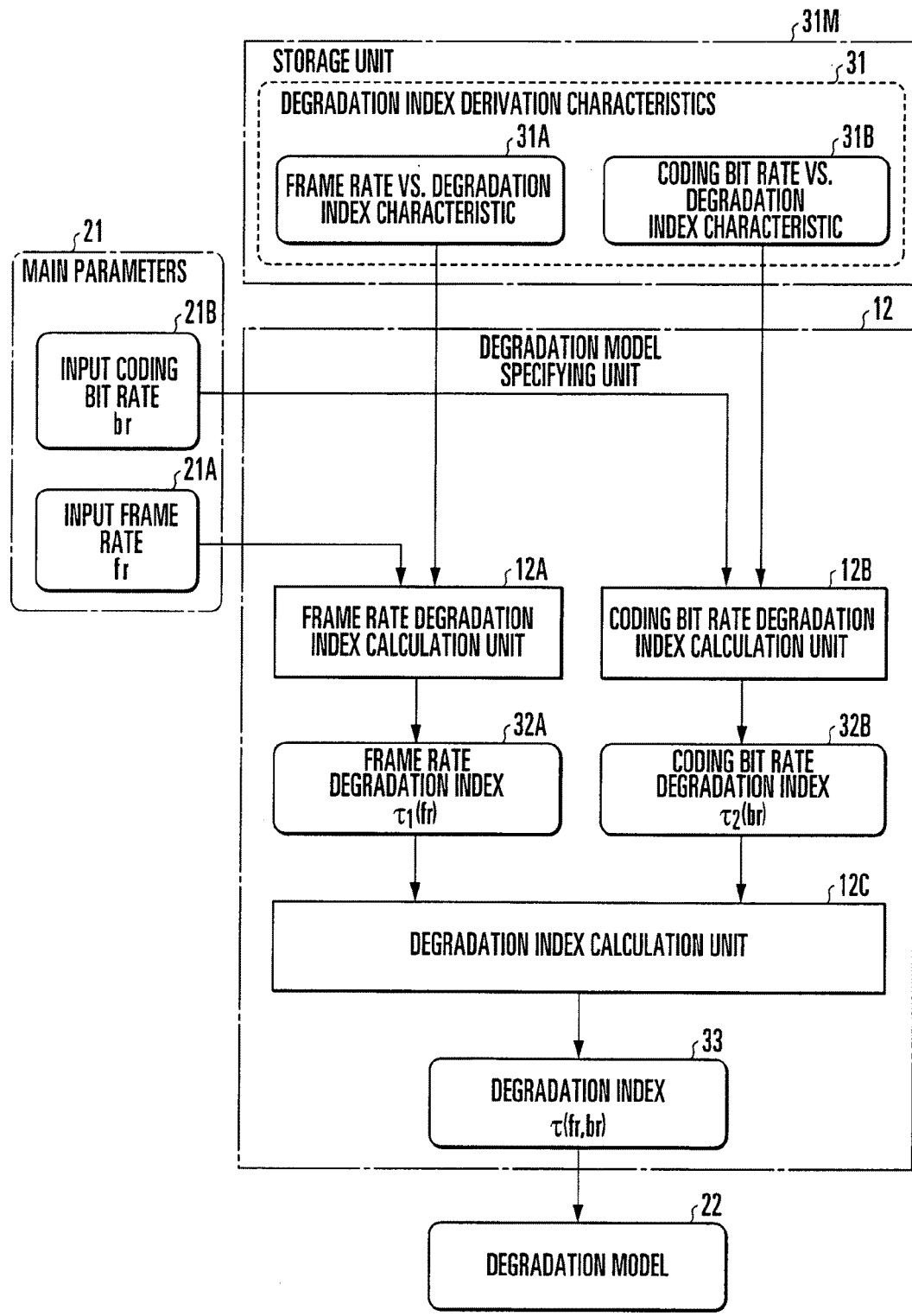
FIG. 2 is a block diagram showing the arrangement of the degradation model specifying unit of the video quality estimation apparatus according to the first embodiment of the present invention.

The arrangement of the video quality estimation apparatus according to the first embodiment of the present invention will be described next in detail with reference to FIGS. 1 and 2. FIG. 2 is a block diagram showing the arrangement of the degradation model specifying unit of the video quality estimation apparatus according to the first embodiment of the present invention.

The video quality estimation apparatus 1 includes a parameter extraction unit 11, degradation model specifying unit 12, and video quality correction unit 13 as main functional units. These functional units may be implemented either by dedicated calculation circuits or by providing a microprocessor such as a CPU and its peripheral circuits and making the microprocessor read out and execute a program prepared in advance to cause the hardware and program to cooperate with each other. Storage units (to be described later) including storage devices such as a memory and a hard disk store pieces of process information used in these functional units. The pieces of process information are exchanged between the functional units via a storage unit (not shown) including a storage device. The program may be stored in the storage unit. The video quality estimation apparatus 1 also includes various fundamental components such as a storage device, operation input device, and screen display device, like a general information processing apparatus.

The parameter extraction unit 11 has a function of extracting various kinds of estimation conditions 10 related to an evaluation target audiovisual communication service, a function of extracting a frame rate and a coding bit rate related to encoding of an audiovisual medium from the estimation conditions 10, a function of extracting, from the estimation conditions 10, a packet loss rate related to the performance of a terminal and a communication network to transfer an audiovisual medium, and a function of outputting the extracted coding bit rate, frame rate, and packet loss rate as main parameters 21 including an input frame rate fr (21A), an input coding bit rate br (21B), and input packet loss rate pl (21C).

The operator can input the estimation conditions 10 by using an operation input device such as a keyboard. Alternatively, the estimation conditions 10 may be either acquired from an external device, recording medium, or communication network by using a data input/output device for inputting/outputting data or measured from an actual audiovisual communication service. The input packet loss rate pl (21C) can include one or both of a packet loss in the communication network and a packet loss in the terminal depending on the characteristic feature of the audiovisual communication service or desired subjective video quality.

The degradation model specifying unit 12 has a function of specifying a degradation model 22 representing the relationship between the packet loss rate and degradation in the reference subjective video quality 23 on the basis of the input frame rate 21A and input coding bit rate 21B of the main parameters 21 output from the parameter extraction unit 11. The reference subjective video quality 23 is subjective video quality of an audiovisual medium encoded at the input frame rate 21A and input coding bit rate 21B without packet loss. The reference subjective video quality 23 may be stored in a storage unit 23M (first storage unit) in advance. Alternatively, the parameter extraction unit 11 may extract the reference subjective video quality 23 from the estimation conditions 10 together with the main parameters 21 and saves them in the storage unit 23M.

The video quality correction unit 13 has a function of calculating a video quality degradation ratio corresponding to the input packet loss rate 21C of the main parameters 21 by referring to the degradation model 22 specified by the degradation model specifying unit 12, and a function of calculating a desired subjective video quality estimation value 24 by correcting the reference subjective video quality 23 on the basis of the video quality degradation ratio.

The degradation model specifying unit 12 also includes several functional units, as shown in FIG. 2. The main functional units include a frame rate degradation index calculation unit 12A, coding bit rate degradation index calculation unit 12B, and degradation index calculation unit 12C.

The frame rate degradation index calculation unit 12A has a function of calculating a frame rate degradation index $\tau_1(\text{fr})$ (first degradation index: 32A) representing the degree of influence of the packet loss rate on degradation in subjective video quality characteristic of the audiovisual medium transmitted at the input frame rate fr (21A) by referring to a frame rate vs. degradation index characteristic 31A in a storage unit 31M (second storage unit).

The coding bit rate degradation index calculation unit 12B has a function of calculating a coding bit rate degradation index $\tau_2(\text{br})$ (second degradation index: 32B) representing the degree of influence of the packet loss rate on degradation in subjective video quality characteristic of the audiovisual medium transmitted at the input coding bit rate br (21B) by referring to a coding bit rate vs. degradation index characteristic 31B in the storage unit 31M.

The degradation index calculation unit 12C has a function of calculating, on the basis of the frame rate degradation index $\tau_1(\text{fr})$ and coding bit rate degradation index $\tau_2(\text{br})$ as a parameter to specify the degradation model 22, a degradation index $\tau(\text{fr},\text{br})$ (33) representing the degree of influence of the packet loss rate on degradation in the reference subjective video quality 23 of the audiovisual medium transmitted at the input frame rate fr (21A) and input coding bit rate br (21B).

The frame rate vs. degradation index characteristic 31A and coding bit rate vs. degradation index characteristic 31B are prepared as degradation index derivation characteristics 31 and stored in the storage unit 31M (second storage unit) in advance.

[Subjective Video Quality Characteristic]

Figure 3:
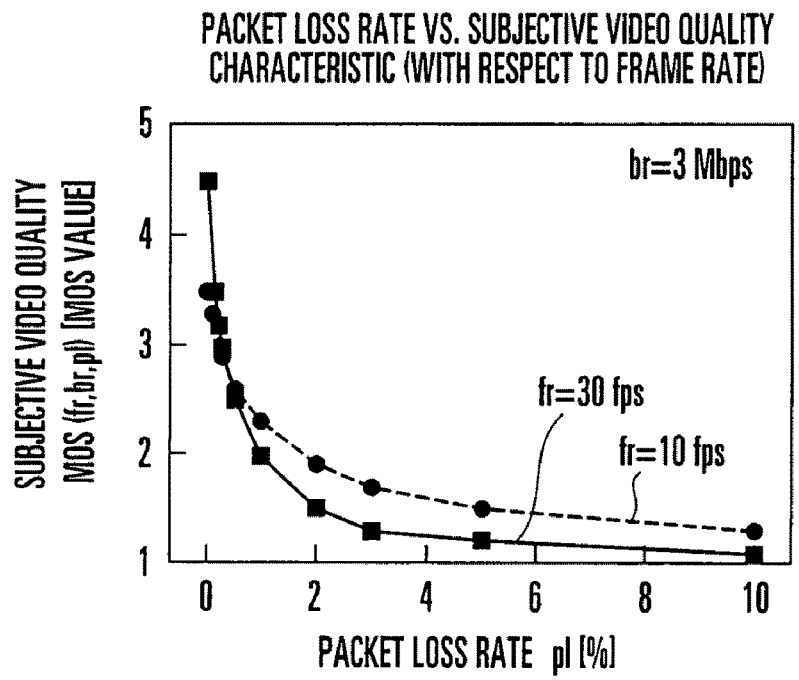
FIG. 3 is a graph showing a packet loss rate vs. subjective video quality characteristic (with respect to the frame rate)
Figure 4:
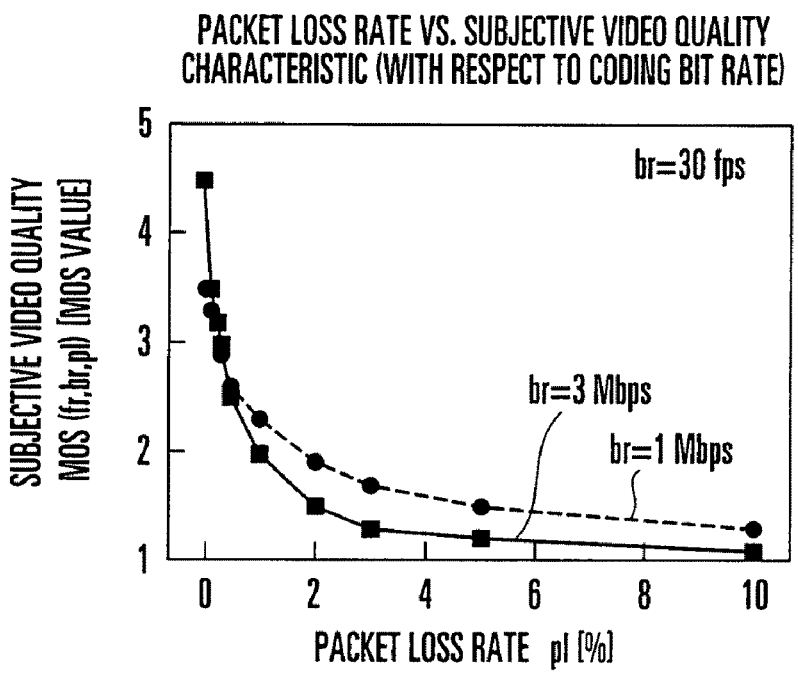
FIG. 4 is a graph showing a packet loss rate vs. subjective video quality characteristic (with respect to the coding bit rate)

The influence of a packet loss rate on degradation in subjective video quality of an audiovisual communication medium in an audiovisual communication service will be described next with reference to FIGS. 3 and 4. FIG. 3 is a graph showing a packet loss rate vs. subjective video quality characteristic (with respect to the frame rate) of an audiovisual communication medium in an audiovisual communication service. FIG. 3 shows characteristics corresponding to the respective frame rates fr. FIG. 4 is a graph showing a packet loss rate vs. subjective video quality characteristic (with respect to the coding bit rate) of an audiovisual communication medium in an audiovisual communication service. FIG. 4 shows characteristics corresponding to the respective coding bit rates br. Referring to FIGS. 3 and 4, the abscissa represents the packet loss rate pl (%), and the ordinate represents a subjective video quality value MOS(fr,br,pl) (MOS value).

Generally, when packets of an encoded audiovisual medium are lost in a communication network or terminal, it is sometimes impossible to normally decode the encoded audiovisual medium. In this case, distortions occur as degradation in the spatial and temporal systems of the audiovisual medium. As shown in FIGS. 3 and 4, the video quality monotonically degrades along with the increase in packet loss rate.

If the coding bit rate of the audiovisual medium is low, the influence of the packet loss rate on the video quality is small. However, even when the packet loss rate does not change, it greatly affects the video quality if the coding bit rate of the audiovisual medium is high. The packet loss rate has the same characteristic feature as described above even in association with the frame rate.

For example, when the frame rate of the audiovisual medium is high (fr=30 fpr), the video quality degrades steeply with respect to the change in packet loss rate, as shown in FIG. 3. When the frame rate is low (fr=10 ps), the video quality degrades moderately with respect to the change in packet loss rate. In addition, when the coding bit rate of the audiovisual medium is high (br=3 Mbps), the video quality degradation degrades steeply with respect to the change in packet loss rate, as shown in FIG. 4. When the coding bit rate is low (br=1 Mbps), the video quality degradation degrades moderately with respect to the change in packet loss rate. That is, when packet loss occurs, the interaction between the frame rate and coding bit rate of the audiovisual medium affects the degradation in video quality.

Hence, specific and useful guidelines for quality design/management are important to know the set values of the coding bit rate, frame rate, and packet loss rate and video quality corresponding to them in consideration of the influence of the packet loss rate on video quality, which changes depending on the coding bit rate and frame rate.

This embodiment places focus on such property of the subjective video quality characteristic. The degradation model specifying unit 12 specifies the degradation model 22 representing the relationship between the input packet loss rate pl 21C and degradation in the reference subjective video quality 23 of the audiovisual medium on the basis of the input frame rate 21A and input coding bit rate 21B. The video quality correction unit 13 estimates the subjective video quality estimation value 24 corresponding to the input packet loss rate pl 21C by using the degradation model 22 specified by the degradation model specifying unit 12.

[Degradation Model]

The degradation model used by the degradation model specifying unit 12 and the method of specifying the degradation model will be described next in detail.

Subjective video quality of an audiovisual medium encoded at the input frame rate fr and input coding bit rate of the main parameters 21 without packet loss (pl=0) is defined as a reference subjective video quality G(fr,br). The degree of degradation by the packet loss rate pl with respect to the reference subjective video quality G(fr,br) at the input frame rate fr and input coding bit rate br is defined as a video quality degradation ratio P(fr,br,pl). In this case, the subjective video quality MOS(fr,br,pl) at an arbitrary input packet loss rate pl is given by $$MOS(fr,br,pl)=1+G(fr,br) \cdot P(fr,br,pl) \quad (1)$$

When the subjective video quality degradation characteristic with respect to the packet loss rate pl is expressed by the degradation model 22 as shown in FIGS. 3 and 4 described above, an exponential function is usable. The exponential function uses the input frame rate fr, input coding bit rate br, and input packet loss rate pl of the main parameters 21 as variables and monotonically decreases the subjective video quality along with the increase in packet loss rate pl.

The degree of influence of the packet loss rate on the degradation model 22 by the frame rate fr and coding bit rate br is defined as a degradation index τ(fr,br). The video quality degradation ratio P(fr,br,pl) can be modeled by $$P(fr, br, p1) = \exp\left\{-\frac{p1}{\tau(fr, br)}\right\} \quad (2)$$

The degree of influence of the packet loss rate on the degradation in subjective video quality by the frame rate fr and coding bit rate br individually exists, as shown in FIGS. 3 and 4 described above. When the influence component on the subjective video quality by the frame rate fr is the frame rate degradation index $\tau_1$(fr), the influence component on the subjective video quality by the coding bit rate br is the coding bit rate degradation index $\tau_2$(br), and a, b, and c are coefficients, the degradation index τ(fr,br) can be modeled by $$\tau(fr,br)=a+b \cdot \tau_1(fr)+c \cdot \tau_2(br) \quad (3)$$

which is formed by the linear sum of the frame rate degradation index $\tau_1$(fr) and coding bit rate degradation index $\tau_2$(br).

Figure 5:
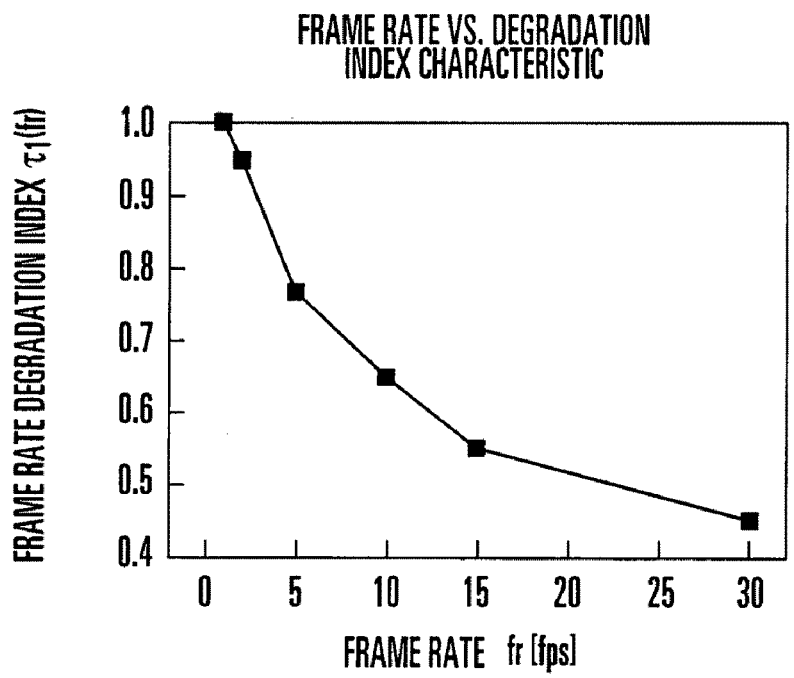
FIG. 5 is a graph showing a frame rate vs. degradation index characteristic.
Figure 6:
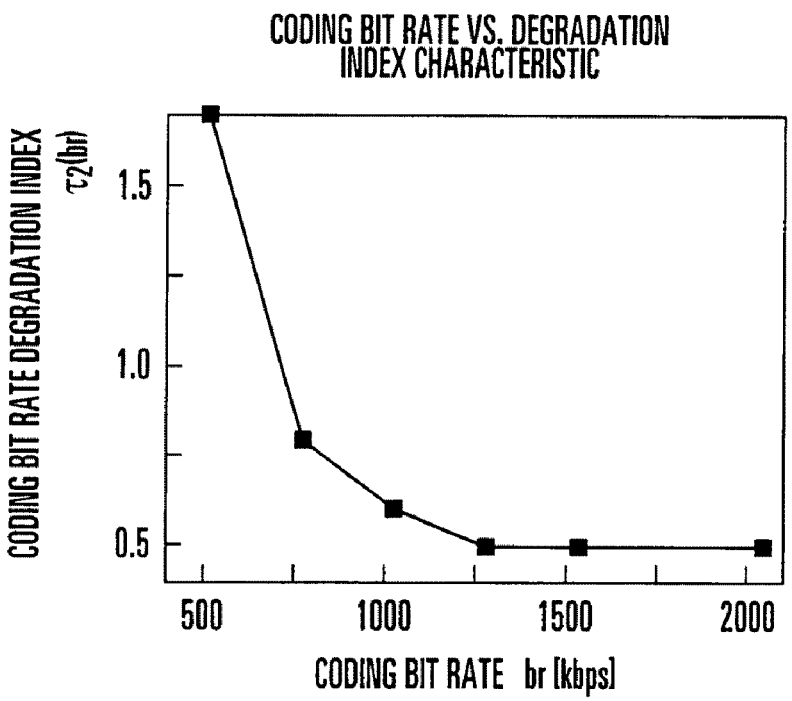
FIG. 6 is a graph showing a coding bit rate vs. degradation index characteristic.

FIG. 5 is a graph showing a frame rate vs. degradation index characteristic representing the influence component on the subjective video quality by the frame rate fr. The abscissa represents the frame rate fr (fps), and the ordinate represents the frame rate degradation index $\tau_1$(fr). Along with the increase in frame rate, the frame rate degradation index $\tau_1$(fr) monotonically decreases. FIG. 6 is a graph showing a coding bit rate vs. degradation index characteristic representing the influence component on the subjective video quality by the coding bit rate br. The abscissa represents the coding bit rate br (bps), and the ordinate represents the coding bit rate degradation index $\tau_2$(br). Along with the increase in coding bit rate, the coding bit rate degradation index $\tau_2$(br) monotonically decreases.

When the degradation index τ(fr,br) (33) is calculated on the basis of the frame rate degradation index $\tau_1$(fr) and coding bit rate degradation index $\tau_2$(br), the degradation model 22, i.e., the packet loss rate vs. video quality degradation ratio characteristic corresponding to the estimation conditions 10 can be determined.

Figure 7:
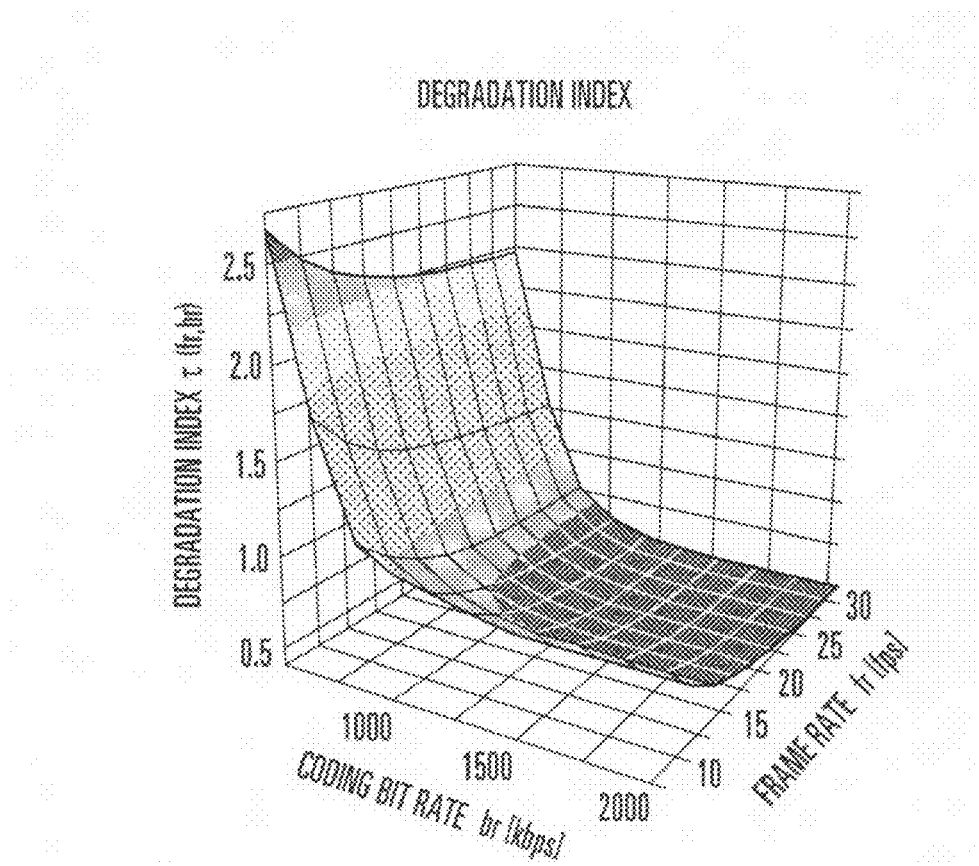
FIG. 7 is a three-dimensional graph showing a degradation exponent.
Figure 8:
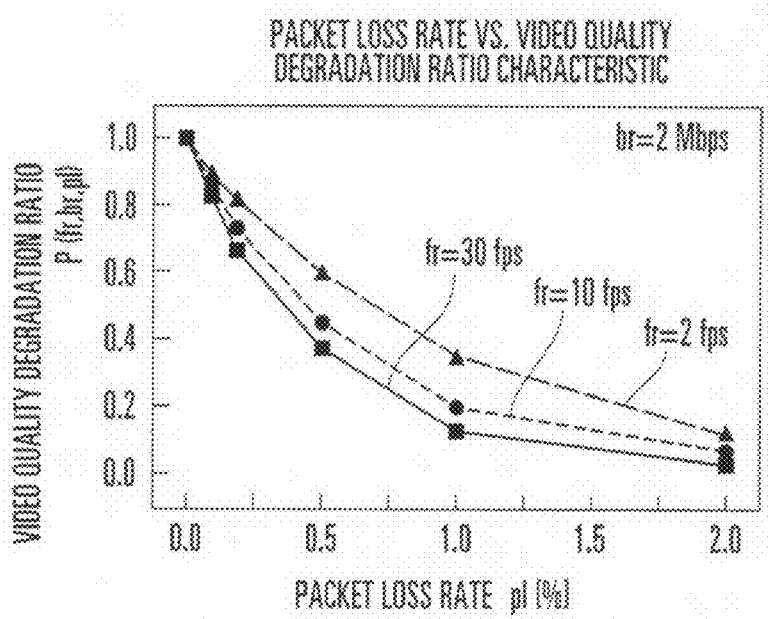
FIG. 8 is a graph showing a packet loss rate vs. video quality degradation ratio characteristic (with respect to the frame rate)

FIG. 7 is a three-dimensional graph showing a degradation index. The first abscissa represents the frame rate fr, the second abscissa represents the coding bit rate br, and the ordinate represents the degradation index τ(fr,br). FIG. 8 is a graph showing a packet loss rate vs. video quality degradation ratio characteristic (with respect to the frame rate). The abscissa represents the packet loss rate pl (%), and the ordinate represents the video quality degradation ratio P(fr,br,pl). FIG. 8 shows characteristics corresponding to frame rates fr=2, 10, and 30 fps while fixing coding bit rate br=2 Mbps.

Operation of the First Embodiment

The operation of the video quality estimation apparatus according to the first embodiment of the present invention will be described next with reference to FIG. 9. FIG. 9 is a flowchart illustrating the video quality estimation process of the video quality estimation apparatus according to the first embodiment of the present invention.

The video quality estimation apparatus 1 starts the video quality estimation process in FIG. 9 in accordance with an instruction operation from the operator or input of the estimation conditions 10. The estimation conditions 10 designate the reference subjective video quality 23 together with the main parameters 21. In the video quality estimation apparatus 1, the above-described frame rate vs. degradation index characteristic 31A (FIG. 5) and coding bit rate vs. degradation index characteristic 31B (FIG. 6) are prepared in advance and stored in the storage unit 31M as function expressions.

First, the parameter extraction unit 11 extracts the various estimation conditions 10 related to an evaluation target audiovisual communication service, extracts a frame rate and a coding bit rate related to encoding of an audiovisual medium from the estimation conditions 10, extracts a packet loss rate of the audiovisual medium in the communication network or terminal, and outputs the input frame rate fr (21A), input coding bit rate br (21B), and input packet loss rate pl (21C) as the main parameters 21 (step S100). At this time, the parameter extraction unit 11 extracts, from the estimation conditions 10, a subjective video quality value at the input frame rate fr (21A) and input coding bit rate br (21B) without packet loss (pl=0) and outputs it as the reference subjective video quality 23.

The degradation model specifying unit 12 specifies the degradation model 22 representing the relationship between the packet loss rate and the subjective video quality of the audiovisual medium on the basis of the input frame rate 21A and input coding bit rate 21B of the main parameters 21 output from the parameter extraction unit 11.

More specifically, the frame rate degradation index calculation unit 12A calculates the frame rate degradation index $\tau_1(fr)$ (32A) corresponding to the input frame rate fr (21A) by referring to the frame rate vs. degradation index characteristic 31A, as shown in FIG. 5, in the storage unit 31M (step S101).

Next, the degradation model specifying unit 12 causes the coding bit rate degradation index calculation unit 12B to calculate the coding bit rate degradation index $\tau_2(br)$ (32B) corresponding to the input coding bit rate br (21B) by referring to the coding bit rate vs. degradation index characteristic 31B, as shown in FIG. 6, in the storage unit 31M (step S102).

The degradation model specifying unit 12 causes the degradation index calculation unit 12C to substitute the actual values of the frame rate degradation index $\tau_1(fr)$ and coding bit rate degradation index $\tau_2(br)$ into equation (3) described above, thereby calculating the degradation index τ(fr,br) (33) (step S103). With this process, the degradation model 22 shown in FIG. 8, i.e., the packet loss rate vs. video quality degradation ratio characteristic expressed by equation (2) described above is specified.

Then, the video quality estimation apparatus 1 causes the video quality correction unit 13 to substitute the degradation index τ(fr,br) and the input packet loss rate pl (21C) of the main parameters 21 output from the parameter extraction unit 11 into equation (2) described above by referring to the degradation model 22 specified by the degradation model specifying unit 12, thereby calculating the corresponding video quality degradation ratio P(fr,br,pl) (step S104).

After that, the video quality correction unit 13 substitutes the actual value of the video quality degradation ratio P(fr,br,pl) and the reference subjective video quality 23 into equation (1) described above, thereby calculating the video quality MOS(fr,br,pl). The video quality correction unit 13 outputs the video quality as the subjective video quality estimation value 24 a viewer actually senses from the audiovisual medium reproduced on the terminal by using the evaluation target audiovisual communication service (step S105), and finishes the series of video quality estimation processes.

As described above, in this embodiment, in estimating subjective video quality corresponding to the main parameters 21 which are input as the input frame rate 21A representing the number of frames per unit time, the input coding bit rate 21B representing the number of coding bits per unit time, and the input packet loss rate 21C representing the packet loss occurrence probability of an audiovisual medium, the degradation model specifying unit 12 specifies the degradation model 22 representing the relationship between the packet loss rate and the degradation in the reference subjective video quality 23 on the basis of the input frame rate 21A and input coding bit rate 21B. The desired subjective video quality estimation value 24 is calculated by correcting the reference subjective video quality on the basis of the video quality degradation ratio corresponding to the input packet loss rate 21C calculated by using the degradation model 22.

It is therefore possible to obtain the subjective video quality estimation value 24 corresponding to the input packet loss rate 21C input as the estimation condition 10 by referring to the degradation model 22 corresponding to the input frame rate 21A and input coding bit rate 21B input as the estimation conditions 10.

This allows to obtain specific and useful guidelines for quality design/management to know the set values of the coding bit rate, frame rate, and packet loss rate and video quality corresponding to them in consideration of the influence of the packet loss rate on video quality, which changes depending on the coding bit rate and frame rate. The guidelines are highly applicable in quality design of applications and networks before providing a service and quality management after the start of the service.

For example, assume that an audiovisual medium should be distributed at desired video quality. Use of the video quality estimation apparatus 1 of this embodiment enables to grasp a specific packet loss rate that is allowable in transferring an audiovisual medium encoded at a coding bit rate and a frame rate while satisfying the desired video quality. Especially, the coding bit rate is often limited by the constraints of a network. In this case, the coding bit rate is fixed, and the video quality estimation apparatus 1 of this embodiment is applied. This makes it possible to easily and specifically grasp the relationship between the frame rate, packet loss rate, and video quality.

In the example described in this embodiment, the frame rate vs. degradation index characteristic 31A and coding bit rate vs. degradation index characteristic 31B used to calculate the degradation index 33 are prepared in the form of function expressions in advance. However, the degradation index derivation characteristics 31 used to derive the degradation index 33 are not limited to function expressions. They may be stored in the storage unit 31M as values corresponding to the input frame rate and input coding bit rate.

FIG. 10 is a view showing a structural example of degradation index information representing the correlation between the input frame rate, the input coding bit rate, and the degradation index. Each degradation index information contains a set of the input frame rate fr (21A) and input coding bit rate br (21B) and corresponding degradation index τ(fr,br) (33). The degradation index information is calculated on the basis of the degradation index derivation characteristics 31 and stored in the storage unit 31M in advance.

The degradation model specifying unit 12 may derive the degradation index τ(fr,br) corresponding to the input frame rate 21A and input coding bit rate 21B by referring to the degradation index information.

In this embodiment, the video quality degradation ratio P(fr,br,pl) corresponding to the degradation index τ(fr,br) is calculated by using equation (2) described above. However, the video quality degradation ratio P(fr,br,pl) may be calculated by using any other calculation formula.

For example, the video quality degradation ratio P(fr,br,pl) may be modeled by using super-exponential function (4) which is obtained by a product-sum operation of a plurality of sets of coefficients determined by the input frame rate fr and input coding bit rate br and exponential functions using the degradation index τ(fr,br) and given by, e.g., $$P(fr, br, pl) = \alpha(fr, br)\exp\left\{-\frac{pl}{\tau_x(fr, br)}\right\} + \beta(fr, br)\exp\left\{-\frac{pl}{\tau_y(fr, br)}\right\} + \ldots \quad (4)$$

This calculation is suitable when, for example, the video quality degradation ratio P(fr,br,pl) steeply decreases along with the increase in packet loss rate pl.

The video quality degradation ratio P(fr,br,pl) may be modeled by a linear function using only the packet loss rate pl and coefficients a and b and given by $$P(fr,br,pl)=a+b\cdot pl \quad (5)$$

This equation is usable under limited estimation conditions with a small variation width and greatly shortens the calculation time.

Second Embodiment

Figure 11:
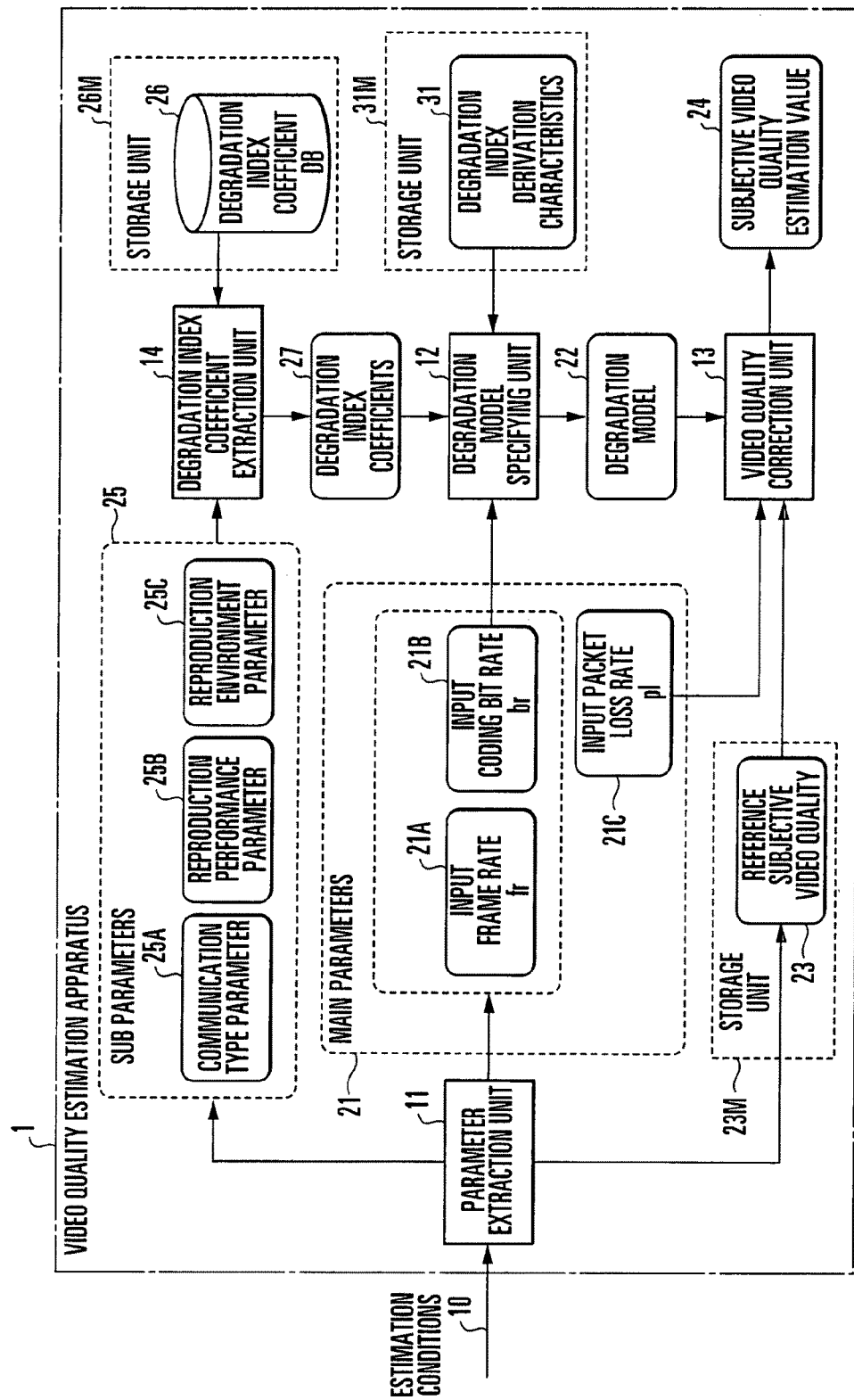
FIG. 11 is a block diagram showing the arrangement of a video quality estimation apparatus according to the second embodiment of the present invention.
Figure 12:
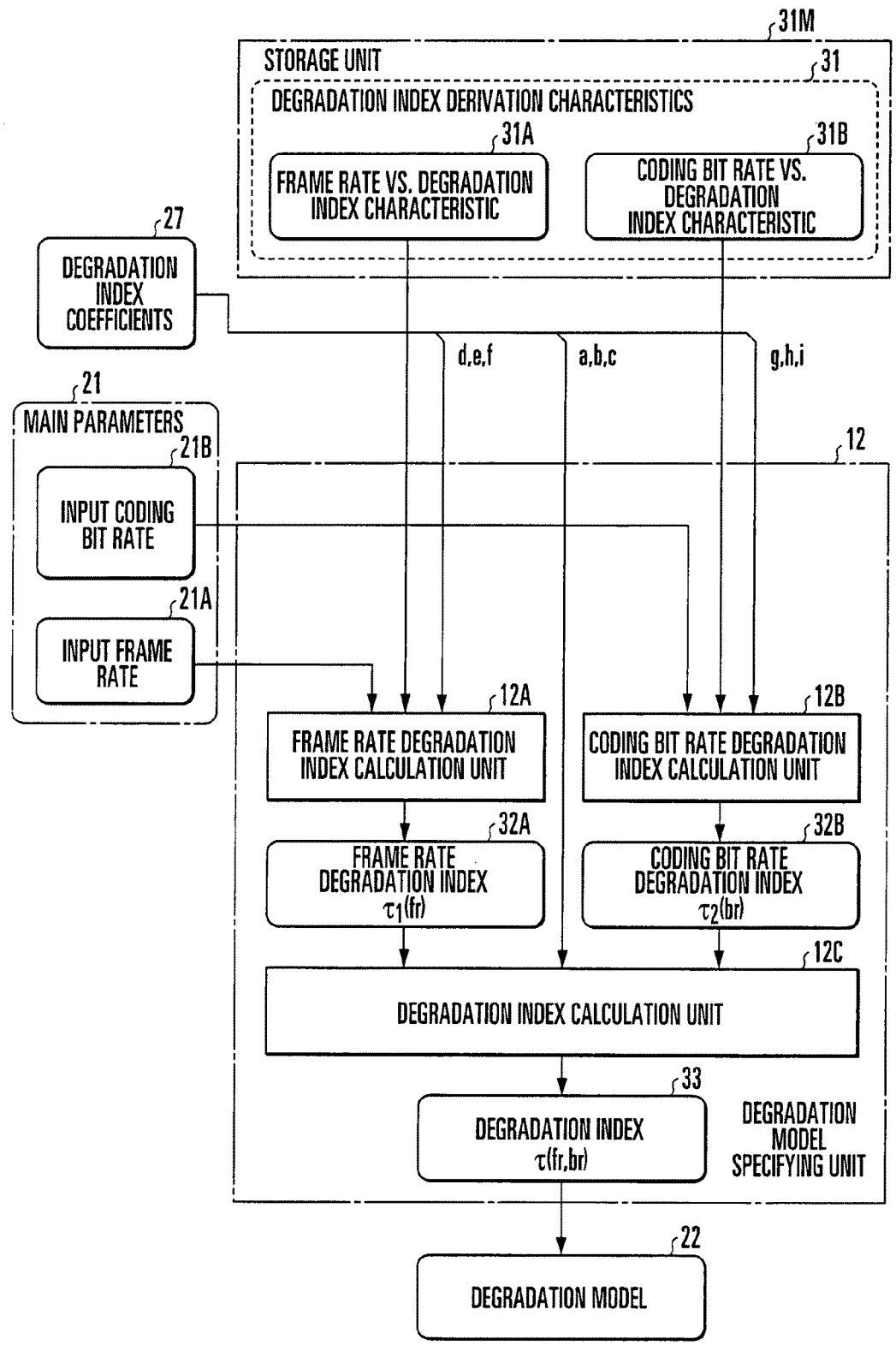
FIG. 12 is a block diagram showing the arrangement of the degradation model specifying unit of the video quality estimation apparatus according to the second embodiment of the present invention.

A video quality estimation apparatus according to the second embodiment of the present invention will be described next with reference to FIGS. 11 and 12. FIG. 11 is a block diagram showing the arrangement of a video quality estimation apparatus according to the second embodiment of the present invention. The same reference numerals as in FIG. 1 described above denote the same or similar parts in FIG. 11. FIG. 12 is a block diagram showing the arrangement of the estimation model specifying unit of the video quality estimation apparatus according to the second embodiment of the present invention. The same reference numerals as in FIG. 2 described above denote the same or similar parts in FIG. 12.

The first embodiment has exemplified a case in which the degradation index 33 corresponding to the input frame rate 21A and input coding bit rate 21B is derived by referring to the degradation index derivation characteristics 31 prepared in advance. In the second embodiment, a case will be described in which degradation index derivation characteristics 31 corresponding to various estimation conditions 10 related to an evaluation target audiovisual communication service are sequentially specified on the basis of, of the estimation conditions 10, the communication type of the audiovisual communication service, the reproduction performance of a terminal that reproduces an audiovisual medium, or the reproduction environment of a terminal that reproduces an audiovisual medium.

Unlike the first embodiment (FIG. 1), a video quality estimation apparatus 1 according to the second embodiment additionally includes a degradation index coefficient extraction unit 14 and a degradation index coefficient database (to be referred to as a degradation index coefficient DB hereinafter) 26.

The degradation index coefficient extraction unit 14 has a function of extracting degradation index coefficients 27 corresponding to sub parameters 25 extracted by a parameter extraction unit 11 from the estimation conditions 10 by referring to the degradation index coefficient DB 26 in a storage unit 26M (third storage unit).

FIG. 13 is an explanatory view showing an arrangement of the degradation index coefficient DB. The degradation index coefficient DB 26 is a database showing sets of the various sub parameters 25 and corresponding characteristic coefficients a, b, c, . . . , i (27). The sub parameters 25 include a communication type parameter 25A indicating the communication type of an audiovisual communication service, a reproduction performance parameter 25B indicating the reproduction performance of a terminal that reproduces an audiovisual medium, and a reproduction environment parameter 25C indicating the reproduction environment of a terminal that reproduces an audiovisual medium.

A detailed example of the communication type parameter 25A is "task" that indicates a communication type executed by an evaluation target audiovisual communication service.

Detailed examples of the reproduction performance parameter 25B are "encoding method", "video format", and "key frame" related to encoding of an audiovisual medium and "monitor size" and "monitor resolution" related to the medium reproduction performance of a terminal.

A detailed example of the reproduction environment parameter 25C is "indoor luminance" in reproducing a medium on a terminal.

The sub parameters 25 are not limited to these examples. They can arbitrarily be selected in accordance with the contents of the evaluation target audiovisual communication service or audiovisual medium and need only include at least one of the communication type parameter 25A, reproduction performance parameter 25B, and reproduction environment parameter 25C.

The degradation index coefficient extraction unit 14 extracts the degradation index coefficients 27 corresponding to the sub parameters 25 by referring to the degradation index coefficient DB 26 in the storage unit 26M prepared in advance. The degradation index coefficients 27 are coefficients to specify the degradation index derivation characteristics 31 to be used to derive a degradation index 33.

A degradation model specifying unit 12 specifies the degradation index derivation characteristics 31, i.e., frame rate vs. degradation index characteristic 31A and coding bit rate vs. degradation index characteristic 31B specified by the degradation index coefficients 27 extracted by the degradation index coefficient extraction unit 14.

[Degradation Index Derivation Characteristics]

The degradation index derivation characteristics 31 used by the degradation model specifying unit 12 will be described next in detail.

The degradation index derivation characteristics 31 can be modeled in the following way by using the degradation index coefficients 27 extracted by the degradation index coefficient extraction unit 14 from the degradation index coefficient DB 26.

The frame rate vs. degradation index characteristic 31A of the degradation index derivation characteristics 31 tends to monotonically decrease the frame rate degradation index along with the increase in frame rate and then converge to a certain minimum value, as shown in FIG. 5 described above. The frame rate vs. degradation index characteristic 31A can be modeled by, e.g., a general exponential function. Let fr be the frame rate, $\tau_1(fr)$ be the corresponding frame rate degradation index, and d, e, and f be coefficients. In this case, the frame rate vs. degradation index characteristic 31A is given by $$\tau_1(fr) = d + e \cdot \exp(-fr/f) \tag{6}$$

The coding bit rate vs. degradation index characteristic 31B of the degradation index derivation characteristics 31 tends to decrease the coding bit rate degradation index along with the increase in coding bit rate and then converge to a certain minimum value, as shown in FIG. 6 described above. The coding bit rate vs. degradation index characteristic 31B can be modeled by, e.g., a general exponential function. Let br be the coding bit rate, $\tau_2(br)$ be the corresponding coding bit rate degradation index, and g, h, and i be coefficients.

In this case, the coding bit rate vs. degradation index characteristic 31B is given by $$\tau_2(br) = g + h \cdot \exp(-br/i) \tag{7}$$

Modeling of the degradation index derivation characteristics 31 need not always be done by using the above-described exponential function. Any other function may be used. For example, depending on the contents of the evaluation target audiovisual communication service or audiovisual medium, the network performance, or the contents of the estimation conditions 10, a video quality estimation process based on an input coding bit rate or input frame rate within a relatively limited range suffices. If such local estimation is possible, the degradation index derivation characteristics 31 can be modeled by a simple function such as a linear function, as described above.

When equations (6) and (7) described above, which represent the frame rate degradation index $\tau_1(fr)$ and coding bit rate degradation index $\tau_2(br)$, respectively, are substituted into equation (3) described above, which represents the degradation index $\tau(fr,br)$, we obtain $$\begin{aligned}\tau(fr, br) &= a + b \cdot \tau_1(fr) + c\tau_2(br) \\ &= a + b\{d + e \cdot \exp(-fr/f)\} + c\{g + h \cdot \exp(-br/i)\} \\ &= (a + bd + cg) + be \cdot \exp(-fr/f) + ch \cdot \exp(-br/i)\end{aligned} \tag{8}$$

All the coefficients a to i of equation (8) are constants. This allows to redefine the coefficients a+bd+cg, be, ch, f, and i as new coefficients a', b', c', d', and e' and the exponential function terms as new degradation indices $\tau_1'(fr)$ and $\tau_2'(br)$, as represented by $$a+bd+cg \Leftrightarrow a'$$

$$be \Leftrightarrow b'$$

$$ch \Leftrightarrow c'$$

$$\exp(-fr/f) \Leftrightarrow \tau_1'(fr)$$

$$\exp(-br/i) \Leftrightarrow \tau_2'(br)$$

$$f \Leftrightarrow d'$$

$$i \Leftrightarrow e' \tag{9}$$

As a result, the degradation index $\tau(fr,br)$ can be modeled by $$\begin{aligned}\tau(fr, br) &= a' + b'\tau_1'(fr) + c'\tau_2'(br) \\ &= a' + b' \cdot \exp(-fr/d') + c' \cdot \exp(-br/e')\end{aligned} \tag{10}$$

It is therefore possible to execute estimation by using the new frame rate degradation index $\tau_1'(fr)$ and coding bit rate degradation index $\tau_2'(br)$ as the frame rate degradation index $\tau_1(fr)$ and coding bit rate degradation index $\tau_2(br)$. This allows to decrease the number of coefficients necessary for estimating the degradation index $\tau(fr,br)$ and largely decrease the calculation amount required to specify a degradation model 22.

Operation of the Second Embodiment

Figure 14:
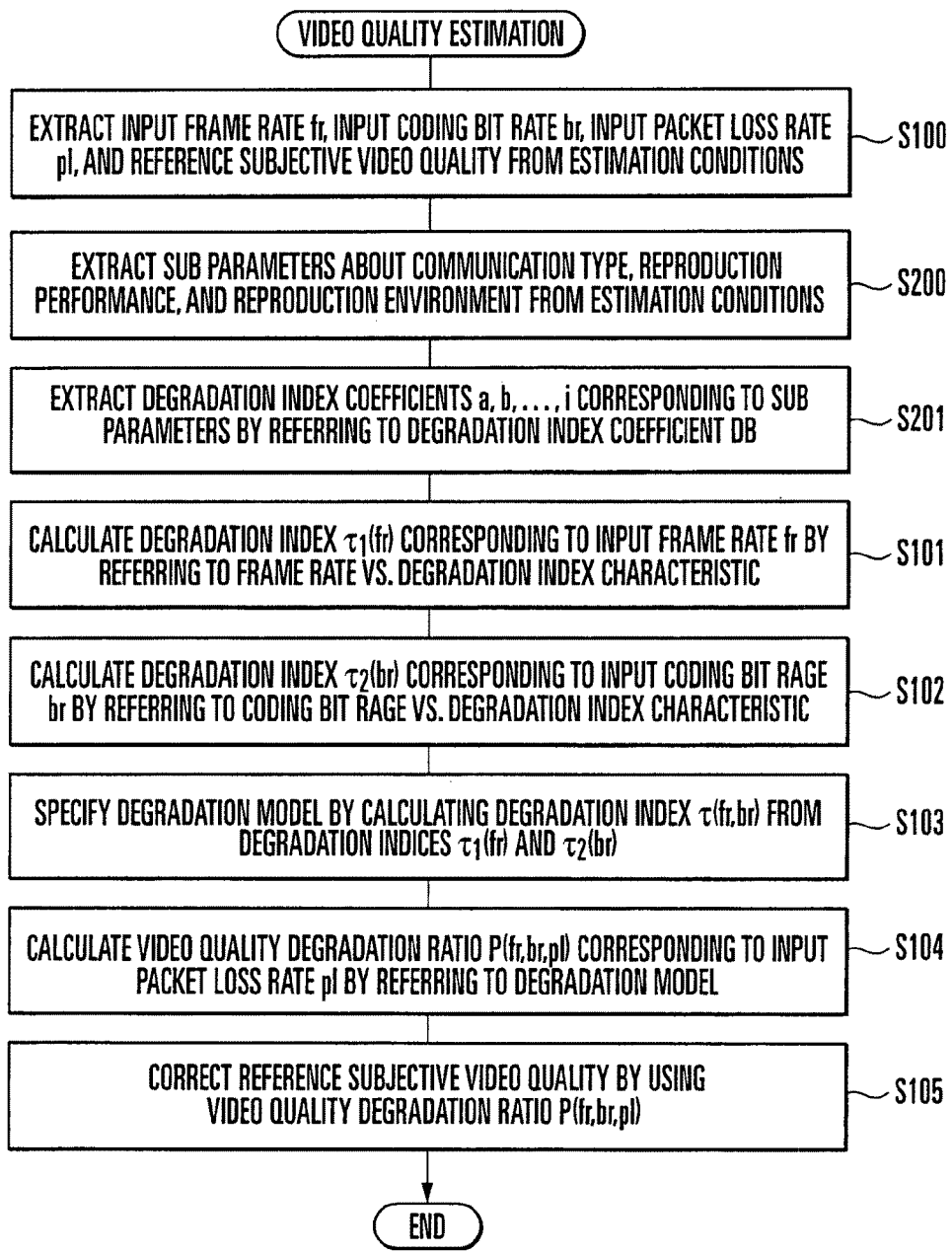
FIG. 14 is a flowchart illustrating the video quality estimation process of the video quality estimation apparatus according to the second embodiment of the present invention.

The operation of the video quality estimation apparatus according to the second embodiment of the present invention will be described next with reference to FIG. 14. FIG. 14 is a flowchart illustrating the video quality estimation process of the video quality estimation apparatus according to the second embodiment of the present invention. The same step numbers as in FIG. 9 described above denote the same or similar steps in FIG. 14.

The video quality estimation apparatus 1 starts the video quality estimation process in FIG. 9 in accordance with an instruction operation from the operator or input of the estimation conditions 10. The communication type parameter 25A, reproduction performance parameter 25B, and reproduction environment parameter 25C are used as the sub parameters 25. The degradation index coefficient DB 26 in the storage unit 26M stores the sets of the sub parameters 25 and degradation index coefficients 27 in advance.

First, the parameter extraction unit 11 extracts the various estimation conditions 10 related to an evaluation target audiovisual communication service, extracts a frame rate and a coding bit rate related to encoding of an audiovisual medium from the estimation conditions 10, extracts a packet loss rate of the audiovisual medium in the communication network or terminal, and outputs the input frame rate fr (21A), input coding bit rate br (21B), and input packet loss rate pl (21C) as main parameters 21 (step S100). At this time, the parameter extraction unit 11 extracts, from the estimation conditions 10, the subjective video quality value at the input frame rate fr (21A) and input coding bit rate br (21B) without any packet loss (pl=0) and outputs it as a reference subjective video quality 23.

The parameter extraction unit 11 also extracts the communication type parameter 25A, reproduction performance parameter 25B, and reproduction environment parameter 25C from the estimation conditions 10 and outputs them as the sub parameters 25 (step S200).

The degradation index coefficient extraction unit 14 extracts and outputs the degradation index coefficients a, b, ..., i (27) corresponding to the values of the sub parameters 25 by referring to the degradation index coefficient DB 26 in the storage unit 26M (step S201).

Accordingly, the degradation model specifying unit 12 causes a frame rate degradation index calculation unit 12A to calculate a frame rate degradation index $\tau_1(\mathrm{fr})$ (32A) corresponding to the input frame rate fr (21A) by referring to the frame rate vs. degradation index characteristic 31A which is specified by the coefficients d, e, and f of the degradation index coefficients 27 (step S101).

Next, the degradation model specifying unit 12 causes a coding bit rate degradation index calculation unit 12B to calculate a coding bit rate degradation index $\tau_2(\mathrm{br})$ (32B) corresponding to the input coding bit rate br (21B) by referring to the coding bit rate vs. degradation index characteristic 31B which is specified by the coefficients g, h, and i of the degradation index coefficients 27 (step S102).

After the frame rate degradation index $\tau_1(\mathrm{fr})$ and coding bit rate degradation index $\tau_2(\mathrm{br})$ are calculated, the degradation model specifying unit 12 calculates the degradation index $\tau(\mathrm{fr,br})$ (33) by equation (3) described above using the frame rate degradation index $\tau_1(\mathrm{fr})$, coding bit rate degradation index $\tau_2(\mathrm{br})$, and the coefficients a, b, and c of the degradation index coefficients 27, thereby specifying the degradation model 22 (step S103).

Then, the video quality estimation apparatus 1 causes a video quality correction unit 13 to calculate the video quality degradation ratio P(fr,br,pl) corresponding to the degradation index $\tau(\mathrm{fr,br})$ and input packet loss rate pl (21C) by referring to the degradation model 22 specified by the degradation model specifying unit 12 in the same way as described above (step S104).

After that, in the same way as described above, the video quality correction unit 13 calculates video quality MOS(fr,br,pl) on the basis of the video quality degradation ratio P(fr,br,pl) and reference subjective video quality 23, outputs it as a subjective video quality estimation value 24 a viewer actually senses from the audiovisual medium reproduced on the terminal by using the evaluation target audiovisual communication service (step S105), and finishes the series of video quality estimation processes.

As described above, in this embodiment, the degradation index coefficient extraction unit 14 extracts, from the degradation index coefficient DB 26 in the storage unit 26M, the degradation index coefficients 27 corresponding to the sub parameters 25 which are extracted by the parameter extraction unit 11 and include at least one of the communication type parameter 25A, reproduction performance parameter 25B, and reproduction environment parameter 25C. The degradation model specifying unit 12 calculates the degradation index 33 corresponding to the input frame rate 21A and input coding bit rate 21B on the basis of the degradation index derivation characteristics 31 specified by the degradation index coefficients 27. It is therefore possible to derive the degradation index 33 based on the specific properties of the evaluation target audiovisual communication service or terminal. This improves the video quality estimation accuracy.

Especially, in estimating video quality in the prior art, a degradation model needs to be prepared for each encoding method, communication network, or terminal used in an evaluation target audiovisual communication service. However, according to this embodiment, the degradation model 22 does not depend on the encoding method, communication network, or terminal. The same degradation model can be used only by referring to the degradation index coefficients to be used in the degradation model in accordance with the encoding method communication network, or terminal. It is therefore possible to flexibly cope with audiovisual communication services in different environments.

Third Embodiment

Figure 15:
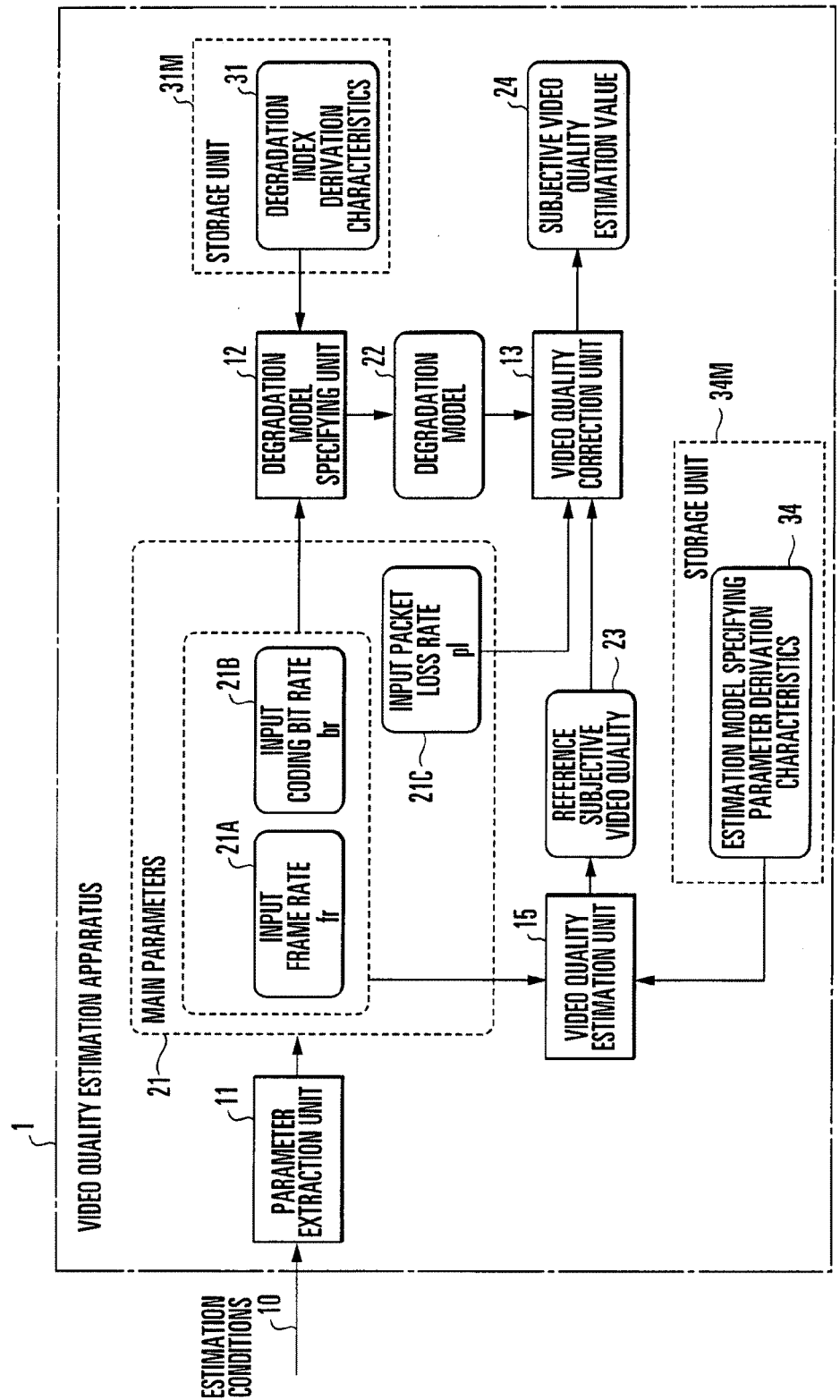
FIG. 15 is a block diagram showing the arrangement of a video quality estimation apparatus according to the third embodiment of the present invention.
Figure 16:
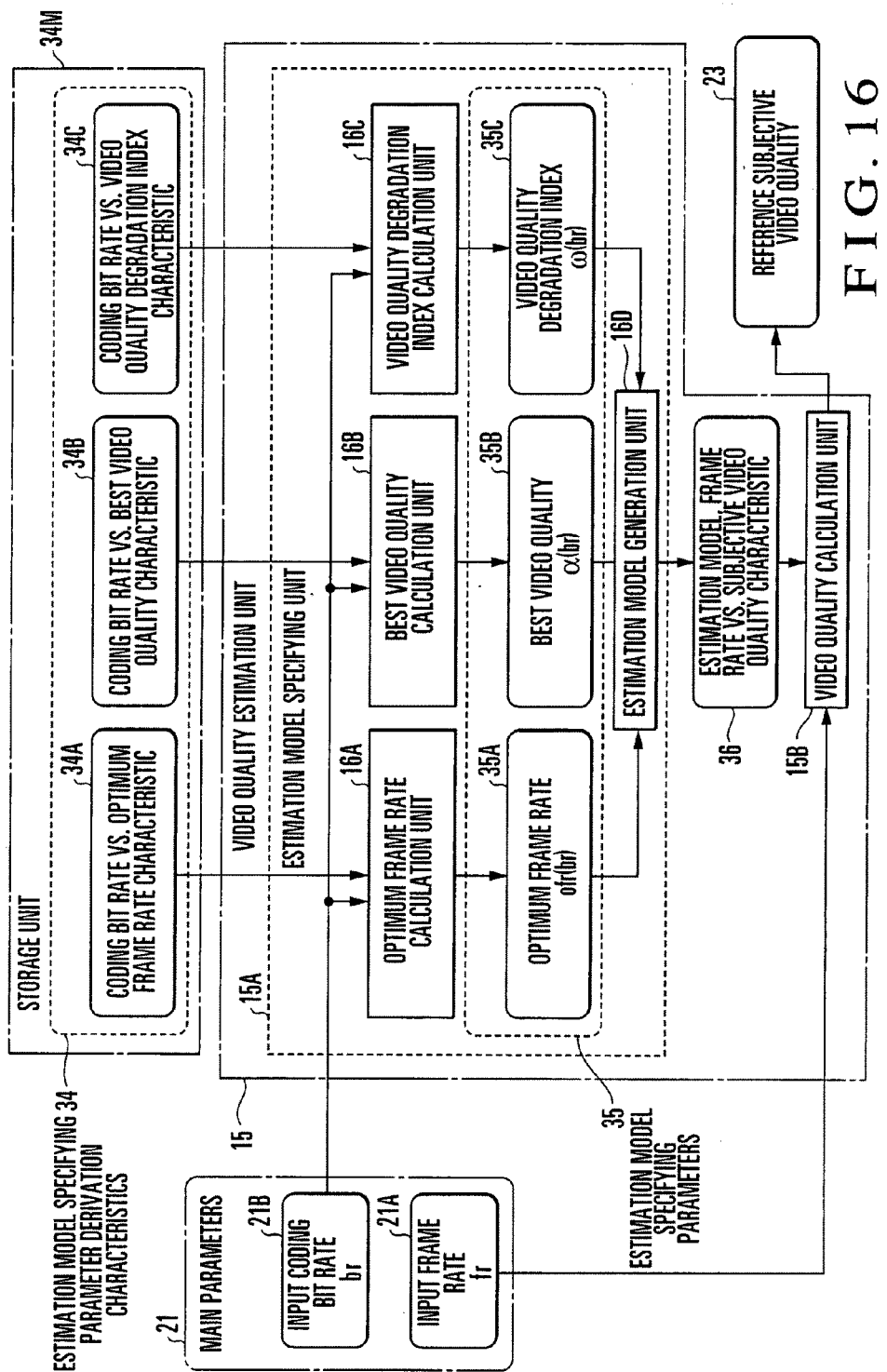
FIG. 16 is a block diagram showing the arrangement of the video quality estimation unit of the video quality estimation apparatus according to the third embodiment of the present invention.

A video quality estimation apparatus according to the third embodiment of the present invention will be described next with reference to FIGS. 15 and 16. FIG. 15 is a block diagram showing the arrangement of a video quality estimation apparatus according to the third embodiment of the present invention. The same reference numerals as in FIG. 1 described above denote the same or similar parts in FIG. 15. FIG. 16 is a block diagram showing the arrangement of the estimation model specifying unit of the video quality estimation apparatus according to the third embodiment of the present invention. The same reference numerals as in FIG. 2 described above denote the same or similar parts in FIG. 16.

The first and second embodiments have exemplified a case in which the reference subjective video quality 23 is designated by the estimation conditions 10 and stored in the storage unit 23M in advance. In the third embodiment, a case will be described in which a video quality estimation apparatus 1 incorporates a video quality estimation unit 15, and a reference subjective video quality 23 is estimated on the basis of an input frame rate 21A and an input coding bit rate 21B of main parameters 21 designated by estimation conditions 10.

In this embodiment, in estimating reference subjective video quality corresponding to main parameters which are input as an input coding bit rate representing the number of coding bits per unit time and an input frame rate representing the number of frames per unit time of an audiovisual medium, an estimation model representing the relationship between the frame rate and the reference subjective video quality of the audiovisual medium is specified on the basis of the input coding bit rate. Reference subjective video quality corresponding to the input frame rate is estimated by using the specified estimation model and output.

The arrangement of causing a video quality correction unit 13 to obtain a subjective video quality estimation value 24 by correcting the reference subjective video quality 23 on the basis of a degradation model 22 is the same as in the above-described first embodiment, and a detailed description thereof will not be repeated here. The second embodiment may be used in place of the first embodiment.

[Video Quality Estimation Unit]

Unlike the first embodiment (FIG. 1), the video quality estimation apparatus 1 according to the third embodiment additionally includes the video quality estimation unit 15.

The video quality estimation unit 15 also includes several functional units, as shown in FIG. 16. The main functional units include an estimation model specifying unit 15A and a video quality calculation unit 15B.

The estimation model specifying unit 15A has a function of calculating estimation model specifying parameters 35 to specify an estimation model 36 representing the relationship between the frame rate and subjective video quality of an audiovisual medium on the basis of the input coding bit rate 21B of the main parameters 21 output from a parameter extraction unit 11.

The video quality calculation unit 15B has a function of estimating subjective video quality corresponding to the input frame rate 21A of the main parameters 21 and outputting it as the desired reference subjective video quality 23 by referring to the estimation model 36 specified by the estimation model specifying unit 15A.

The estimation model specifying unit 15A also includes several functional units, as shown in FIG. 16. The main functional units for calculating the estimation model specifying parameters 35 include an optimum frame rate calculation unit 16A, best video quality calculation unit 16B, video quality degradation index calculation unit 16C, and estimation model generation unit 16D.

The estimation model specifying parameters 35 are values which specify the shapes of functions to be used as the estimation model 36. In this embodiment, at least the optimum frame rate and best video quality to be described below are used as the estimation model specifying parameters 35. Another parameter represented by a video quality degradation index may be added to the estimation model specifying parameters 35.

The optimum frame rate calculation unit 16A has a function of calculating, as one of the estimation model specifying parameters 35, an optimum frame rate ofr(br) (35A) representing a frame rate corresponding to the best subjective video quality of an audiovisual medium transmitted at the input coding bit rate br (21B) by referring to a coding bit rate vs. optimum frame rate characteristic 34A in a storage unit 34M.

The best video quality calculation unit 16B has a function of calculating, as one of the estimation model specifying parameters 35, best video quality α(br) (35B) representing the best value of the subjective video quality of an audiovisual medium transmitted at the input coding bit rate 21B by referring to a coding bit rate vs. best video quality characteristic 34B in the storage unit 34M.

The video quality degradation index calculation unit 16C has a function of calculating, as one of the estimation model specifying parameters 35, a video quality degradation index ω(br) (35C) representing the degree of degradation from the best video quality 35B representing the best value of the subjective video quality of an audiovisual medium transmitted at the input coding bit rate 21B by referring to a coding bit rate vs. video quality degradation index characteristic 34C in the storage unit 34M.

The coding bit rate vs. optimum frame rate characteristic 34A, coding bit rate vs. best video quality characteristic 34B, and coding bit rate vs. video quality degradation index characteristic 34C are prepared as estimation model specifying parameter derivation characteristics 34 and stored in the storage unit 34M in advance.

The estimation model generation unit 16D has a function of generating the estimation model 36 to estimate subjective video quality corresponding to the input frame rate 21A of the main parameters 21 by substituting, into a predetermined function expression, the values of the estimation model specifying parameters 35 including the optimum frame rate ofr(br) calculated by the optimum frame rate calculation unit 16A, the best video quality α(br) calculated by the best video quality calculation unit 16B, and the video quality degradation index ω(br) calculated by the video quality degradation index calculation unit 16C.

[Subjective Video Quality Characteristic]

Figure 17:
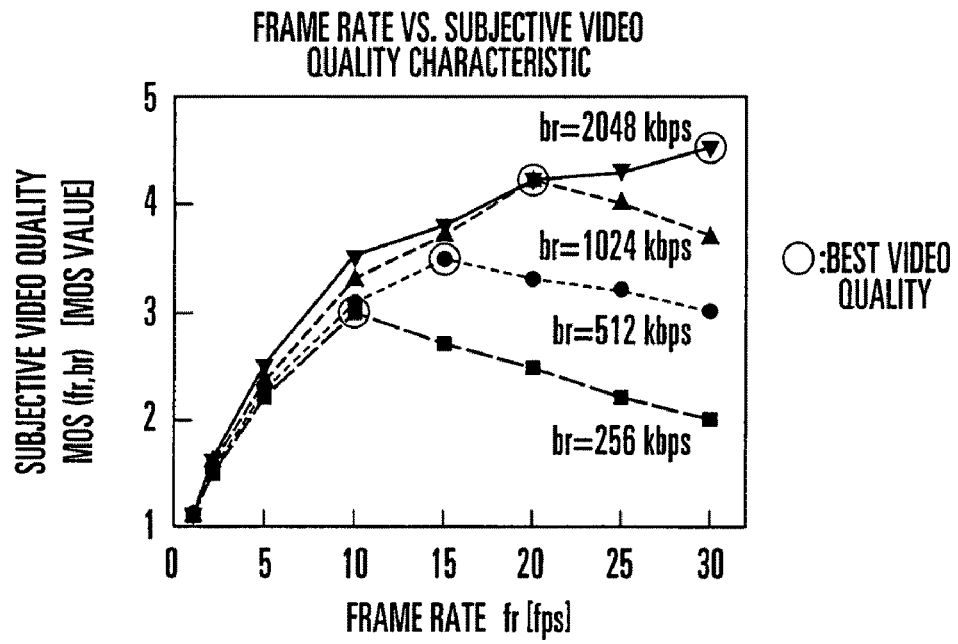
FIG. 17 is a graph showing a frame rate vs. subjective video quality characteristic.

The subjective video quality characteristic of an audiovisual communication medium in an audiovisual communication service will be described next with reference to FIG. 17. FIG. 17 is a graph showing the frame rate vs. subjective video quality characteristic of an audiovisual communication medium in an audiovisual communication service. Referring to FIG. 17, the abscissa represents a frame rate fr (fps), and the ordinate represents a subjective video quality value MOS(fr, br) (MOS value). FIG. 17 shows characteristics corresponding to the respective coding bit rates br.

The number of coding bits per unit frame and the frame rate have a tradeoff relationship with respect to the subjective video quality of an audiovisual medium.

More specifically, in providing a video image encoded at a certain coding bit rate, when the video image is encoded at a high frame rate, the temporal video quality can be improved because a smooth video image is obtained. On the other hand, spatial image degradation may become noticeable because of the decrease in the number of coding bits per unit frame, resulting in poor video quality. When the video image is encoded by using a large number of coding bits per unit frame, spatial image degradation improves so that a higher video quality can be obtained. However, since the number of frames per unit time decreases, temporal frame drop with a jerky effect may take place, resulting in poor video quality.

As is apparent From FIG. 17, an optimum frame rate, i.e., an optimum frame rate at which maximum video quality, i.e., best video quality is obtained exists in correspondence with each coding bit rate. Even when the frame rate increases beyond the optimum frame rate, video quality does not improve. For example, when coding bit rate br=256 [kbbs], the subjective video quality characteristic exhibits a convex shape with a vertex of best video quality=3 [MOS] corresponding to frame rate fr=10 [fps].

The subjective video quality characteristic exhibits a similar shape even when the coding bit rate changes. The coordinate position of each subjective video quality characteristic can be specified by its vertex, i.e., estimation model specifying parameters including the optimum frame rate and best video quality.

This embodiment places focus on such property of the subjective video quality characteristic. The estimation model specifying unit 15A specifies the estimation model 36 representing the relationship between the frame rate and the subjective video quality of an audiovisual medium on the basis of the input coding bit rate 21B. The video quality calculation unit 15B estimates the reference subjective video quality 23 corresponding to the input frame rate 21A by using the estimation model 36 specified by the estimation model specifying unit 15A.

[Derivation of Estimation Model Specifying Parameters]

Derivation of the estimation model specifying parameters in the estimation model specifying unit 15A of the video quality estimation unit 15 will be described next in detail.

To cause the estimation model specifying unit 15A to specify the estimation model 36 representing the relationship between the frame rate and the subjective video quality of an audiovisual medium on the basis of the input coding bit rate 21B, it is necessary to derive the optimum frame rate 35A and best video quality 35B as estimation model specifying parameters corresponding to the input coding bit rate 21B.

In this embodiment, the coding bit rate vs. optimum frame rate characteristic 34A and coding bit rate vs. best video quality characteristic 34B to be described below are prepared in advance as the estimation model specifying parameter derivation characteristics 34. The estimation model specifying parameters 35 corresponding to the input coding bit rate 21B are derived by referring to these characteristics.

Of the characteristics shown in FIG. 17, the coding bit rate when the audiovisual medium is reproduced with the best video quality and the frame rate at that time, i.e., optimum frame rate have such a relationship that the optimum frame rate monotonically increases along with the increase in coding bit rate and then converges to the maximum frame rate.

Figure 18:
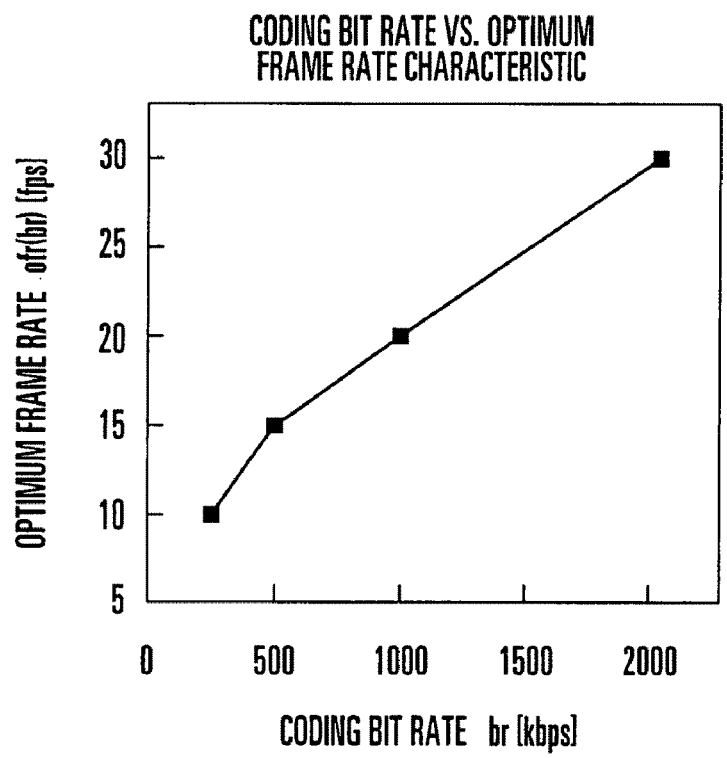
FIG. 18 is a graph showing a coding bit rate vs. optimum frame rate characteristic.

FIG. 18 is a graph showing the coding bit rate vs. optimum frame rate characteristic. Referring to FIG. 18, the abscissa represents a coding bit rate br (kbps), and the ordinate represents an optimum frame rate ofr(br) (fps).

Of the characteristics shown in FIG. 17, the coding bit rate when the audiovisual medium is transmitted at the optimum frame rate and the video quality, i.e., best video quality have a relationship with such a tendency that the video quality becomes high along with the increase in coding bit rate and then converges to a maximum value (maximum subjective video quality value) or becomes low along with the decrease in coding bit rate and then converges to a minimum value.

Figure 19:
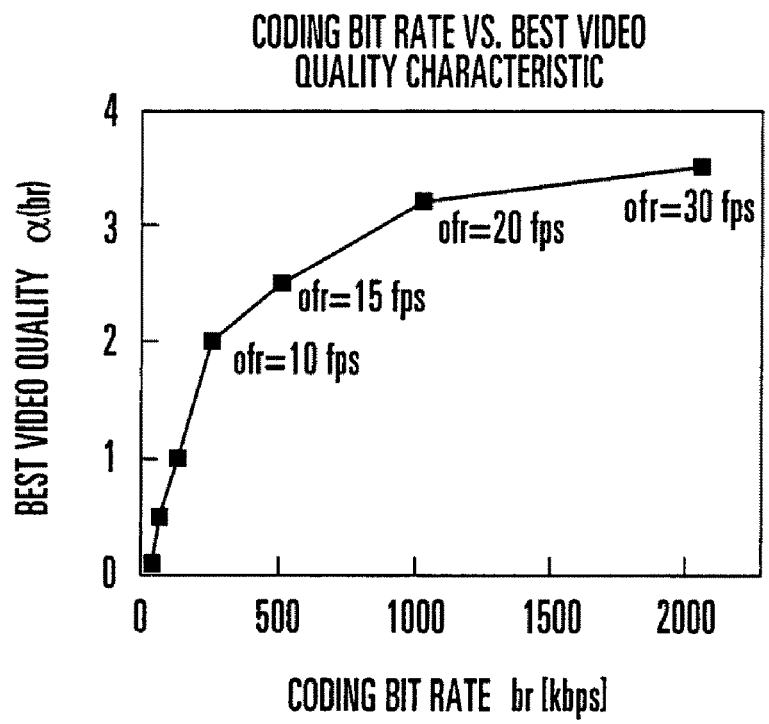
FIG. 19 is a graph showing a coding bit rate vs. best video quality characteristic.

FIG. 19 is a graph showing the coding bit rate vs. best video quality characteristic. Referring to FIG. 19, the abscissa represents the coding bit rate br (kbps), and the ordinate represents the best video quality $\alpha(br)$. Video quality is expressed by the MOS value which uses "1" as a reference value and can take "5" at maximum. The best video quality $\alpha(br)$ of the estimation model 36 uses "0" as a reference value and can take "4" at maximum. Although the reference values are different, these values use almost the same scale and therefore will not particularly be distinguished below.

According to this coding bit rate vs. best video quality characteristic, even when a high coding bit rate is set, the video quality is saturated at a certain coding bit rate. This matches the human visual characteristic and, more particularly, even when the coding bit rate is increased more than necessary, no viewer can visually detect the improvement of video quality. If the coding bit rate is too low, video quality conspicuously degrades and consequently converges to the minimum video quality. This matches an actual phenomenon and, more specifically, in a video image containing, e.g., a human face moving in the screen, the outlines of eyes and nose become blurred and flat so the viewer cannot recognize the face itself.

[Estimation Model]

The estimation model used by the estimation model specifying unit 15A of the video quality estimation unit 15 and the method of specifying the estimation model will be described next in detail.

Figure 20:
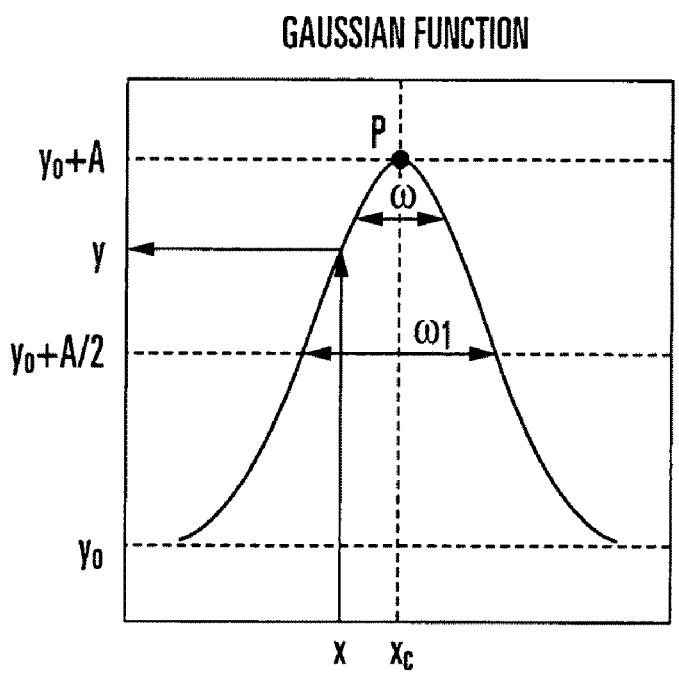
FIG. 20 is an explanatory view showing a Gaussian function.

The characteristic of a convex function having a vertex corresponding to the optimum frame rate 35A and best video quality 35B as the estimation model specifying parameters 35 can be expressed by using a Gaussian function as shown in FIG. 20. FIG. 20 is an explanatory view showing a Gaussian function.

The Gaussian function exhibits a convex shape which has a vertex P corresponding to the maximum value and attenuates from there to the both sides. The function expression is given by the x-coordinate of the vertex P and the maximum amplitude. Let $x_c$ be the x-coordinate of the vertex P, A be the maximum amplitude, $y_0$ be the reference value (minimum value) of the Y-axis, and $\omega$ be the coefficient representing the spread width of the convex characteristic. A function value y with respect to an arbitrary variable x is given by $$y = y_0 + A \cdot \exp\left(-\frac{(x - x_c)^2}{2\omega^2}\right) \quad (11)$$

$$\omega_1 = 2\sqrt{\ln(4)} \cdot \omega$$

Let the variable x be the logarithmic value of the frame rate of the audiovisual medium, the function value y be the subjective video quality, the variable x of the vertex P be the logarithmic value of the optimum frame rate corresponding to the coding bit rate, and the maximum amplitude A be the best video quality $\alpha(br)$ corresponding to the coding bit rate. In this case, a subjective video quality corresponding to an arbitrary frame rate is given by $$MOS(fr, br) = 1 + G(fr, br) \quad (12)$$

$$G(fr, br) = \alpha(br) \cdot \exp\left(-\frac{(\ln(fr) - \ln(ofr(br)))^2}{2\omega(br)^2}\right)$$

It is consequently possible to specify an estimation model corresponding to the input coding bit rate, i.e., frame rate vs. subjective video quality characteristic. FIG. 21 is an explanatory view showing a frame rate vs. subjective video quality characteristic modeled by the Gaussian function.

At this time, $\alpha(br)$ and $G(fr,br)$ used in equation (12) use "0" as a reference value and can take "4" at maximum. When "1" is added to $G(fr,br)$, an actual video quality value expressed by a MOS value (1 to 5) can be obtained.

In the Gaussian function, the spread width of the convex characteristic is specified by using the coefficient $\omega$. If it is necessary to change the spread width in correspondence with each frame rate vs. subjective video quality characteristic corresponding to a coding bit rate, the video quality degradation index $\omega(br)$ (35C) corresponding to the coding bit rate is used.

The video quality degradation index $\omega(br)$ indicates the degree of degradation from the best video quality 35B representing the best value of the subjective video quality of an audiovisual medium transmitted at the input coding bit rate 21B. The video quality degradation index $\omega(br)$ corresponds to the coefficient $\omega$ of the Gaussian function.

Of the characteristics shown in FIG. 17, the coding bit rate and the degree of degradation of subjective video quality have such a relationship that the degree of degradation becomes smooth as the coding bit rate increases, while the degree of degradation becomes large as the coding bit rate decreases. Hence, the coding bit rate and the video quality degradation index have a relationship with such a tendency that as the coding bit rate becomes high, the spread width of the convex shape of the frame rate vs. subjective video quality characteristic becomes large, and the video quality degradation index also becomes large. As the coding bit rate becomes low, the spread width of the convex shape of the frame rate vs. subjective video quality characteristic becomes small, and the video quality degradation index also becomes small.

FIG. 22 is a graph showing the coding bit rate vs. video quality degradation index characteristic. Referring to FIG. 22, the abscissa represents the coding bit rate br (kbps), and the ordinate represents the video quality degradation index $\omega(br)$. FIG. 22 shows a coding bit rate vs. video quality degradation index characteristic in an estimation model expressed by a Gaussian function. If another estimation model is used, a coding bit rate vs. video quality degradation index characteristic representing a coefficient corresponding to the estimation model is used.

It may be unnecessary to use individual spread widths for frame rate vs. subjective video quality characteristics corresponding to individual coding bit rates depending on the estimation target audiovisual communication service. In this case, a constant is usable as the video quality degradation index $\omega(br)$.

Operation of the Third Embodiment

Figures 23, 24:
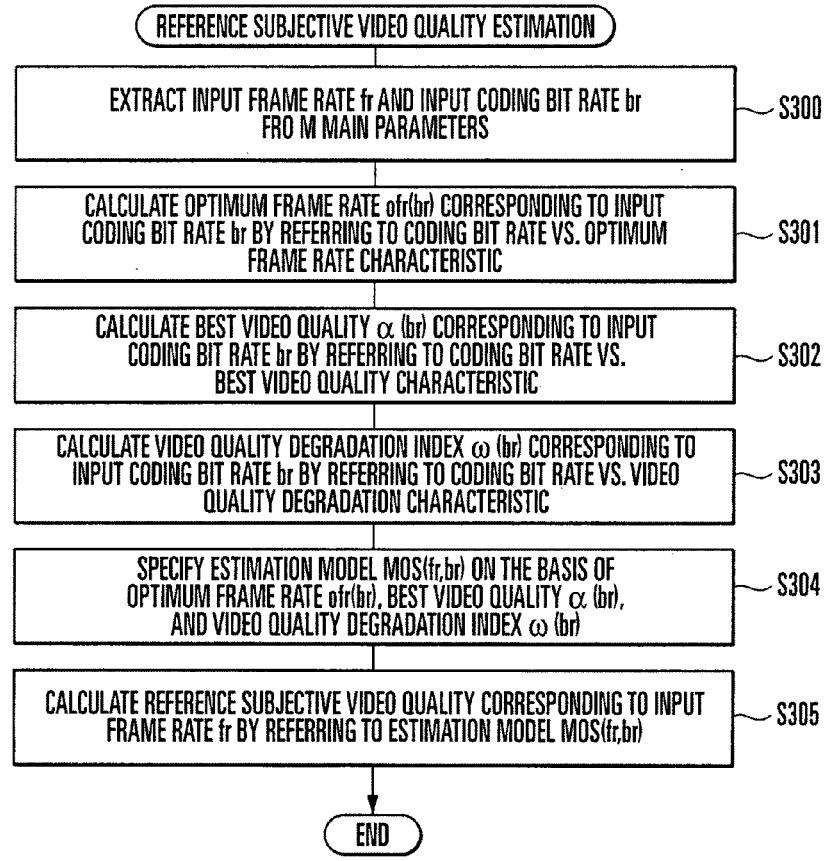
FIG. 23 is a flowchart illustrating the reference subjective video quality estimation process of the video quality estimation apparatus according to the third embodiment of the present invention.
FIG. 24 is a view showing a structural example of estimation model specifying parameter information.

The operation of the video quality estimation apparatus according to the third embodiment of the present invention will be described next with reference to FIG. 23. FIG. 23 is a flowchart illustrating the reference subjective video quality estimation process of the video quality estimation apparatus according to the third embodiment of the present invention.

The video quality estimation apparatus 1 starts the reference subjective video quality estimation process in FIG. 23 in accordance with an instruction operation from the operator or input of the estimation conditions 10. An example will be described here in which the video quality degradation index 35C is used as an estimation model specifying parameter in addition to the optimum frame rate 35A and best video quality 35B. In the video quality estimation apparatus 1, the above-described coding bit rate vs. optimum frame rate characteristic 34A (FIG. 18), coding bit rate vs. best video quality characteristic 34B (FIG. 19), and coding bit rate vs. video quality degradation index characteristic 34C (FIG. 22) are prepared in advance and stored in the storage unit 34M as function expressions.

First, the estimation model specifying unit 15A of the video quality estimation unit 15 acquires, from the storage unit (not shown), the input frame rate fr (21A) and input coding bit rate br (21B) which are extracted from the estimation conditions 10 by the parameter extraction unit 11 (step S300). The estimation model specifying unit 15A specifies the estimation model 36 representing the relationship between the frame rate and the subjective video quality of the audiovisual medium on the basis of the input coding bit rate br (21B).

More specifically, the optimum frame rate calculation unit 16A calculates the optimum frame rate ofr(br) (35A) corresponding to the input coding bit rate br (21B) by referring to the coding bit rate vs. optimum frame rate characteristic 34A in the storage unit 34M (step S301).

Next, the estimation model specifying unit 15A causes the best video quality calculation unit 16B to calculate the best video quality α(br) (35B) corresponding to the input coding bit rate br (21B) by referring to the coding bit rate vs. best video quality characteristic 34B in the storage unit 34M (step S302).

Similarly, the estimation model specifying unit 15A causes the video quality degradation index calculation unit 16C to calculate the video quality degradation index ω(br) (35C) corresponding to the input coding bit rate br (21B) by referring to the coding bit rate vs. video quality degradation index characteristic 34C in the storage unit 34M (step S303).

After the estimation model specifying parameters 35 are calculated, the estimation model specifying unit 15A causes the estimation model generation unit 16D to substitute the actual values of the estimation model specifying parameters 35 including the optimum frame rate ofr(br), best video quality α(br), and video quality degradation index ω(br) into equation (12) described above, thereby specifying the estimation model MOS(fr,br), i.e., frame rate vs. subjective video quality characteristic (step S304).

Then, the video quality estimation apparatus 1 causes the video quality calculation unit 15B of the video quality estimation unit 15 to calculate video quality corresponding to the input frame rate 21A of the main parameters 21 output from the parameter extraction unit 11 by referring to the estimation model 36 specified by the estimation model specifying unit 15A, outputs the video quality as the reference subjective video quality 23 representing subjective video quality a viewer actually senses from the audiovisual medium reproduced on the terminal by using the evaluation target audiovisual communication service (step S305), and finishes the series of reference subjective video quality estimation processes.

As described above, in this embodiment, in estimating subjective video quality corresponding to the main parameters 21 which are input as the input coding bit rate 21B representing the number of coding bits per unit time and the input frame rate 21A representing the number of frames per unit time of an audiovisual medium, the estimation model specifying unit 15A specifies the estimation model 36 representing the relationship between the frame rate and the subjective video quality of the audiovisual medium on the basis of the input coding bit rate 21B. Subjective video quality corresponding to the input frame rate 21A is estimated by using the specified estimation model 36 and output as the reference subjective video quality 23.

It is therefore possible to obtain the reference subjective video quality 23 corresponding to the input frame rate 21A input as the estimation condition 10 by referring to the estimation model 36 corresponding to the input coding bit rate 21B input as the estimation condition 10.

This allows to estimate, in the video quality estimation apparatus 1, the reference subjective video quality 23 of the audiovisual medium encoded at the input frame rate 21A and input coding bit rate 21B so that the reference subjective video quality 23 need not be designated from the outside as the estimation conditions 10. Hence, the video quality correction unit 13 described in the first or second embodiment can estimate the subjective video quality estimation value 24 corresponding to the arbitrary estimation conditions 10 without preparing the reference subjective video quality 23.

In the example described in this embodiment, the coding bit rate vs. optimum frame rate characteristic 34A, coding bit rate vs. best video quality characteristic 34B, and coding bit rate vs. video quality degradation index characteristic 34C used to calculate the estimation model specifying parameters 35 are prepared in the form of function expressions and stored in the storage unit 34M in advance. However, the estimation model specifying parameter derivation characteristics 34 used to calculate the estimation model specifying parameters are not limited to function expressions. They may be stored in the storage unit 34M as values corresponding to the input coding bit rate.

FIG. 24 is a view showing a structural example of estimation model specifying parameter information representing the correlation between the input coding bit rate and the estimation model specifying parameters. Each estimation model specifying parameter information contains a set of the input coding bit rate br (21B) and corresponding optimum frame rate ofr(br) (35A), best video quality α(br) (35B), and video quality degradation index ω(br) (35C). The estimation model specifying parameter information is calculated on the basis of the estimation model specifying parameter derivation characteristics 34 and stored in the storage unit 131M in advance.

The estimation model specifying parameters 35 corresponding to the input coding bit rate 21B may be derived by referring to the estimation model specifying parameter information.

Fourth Embodiment

Figure 25:
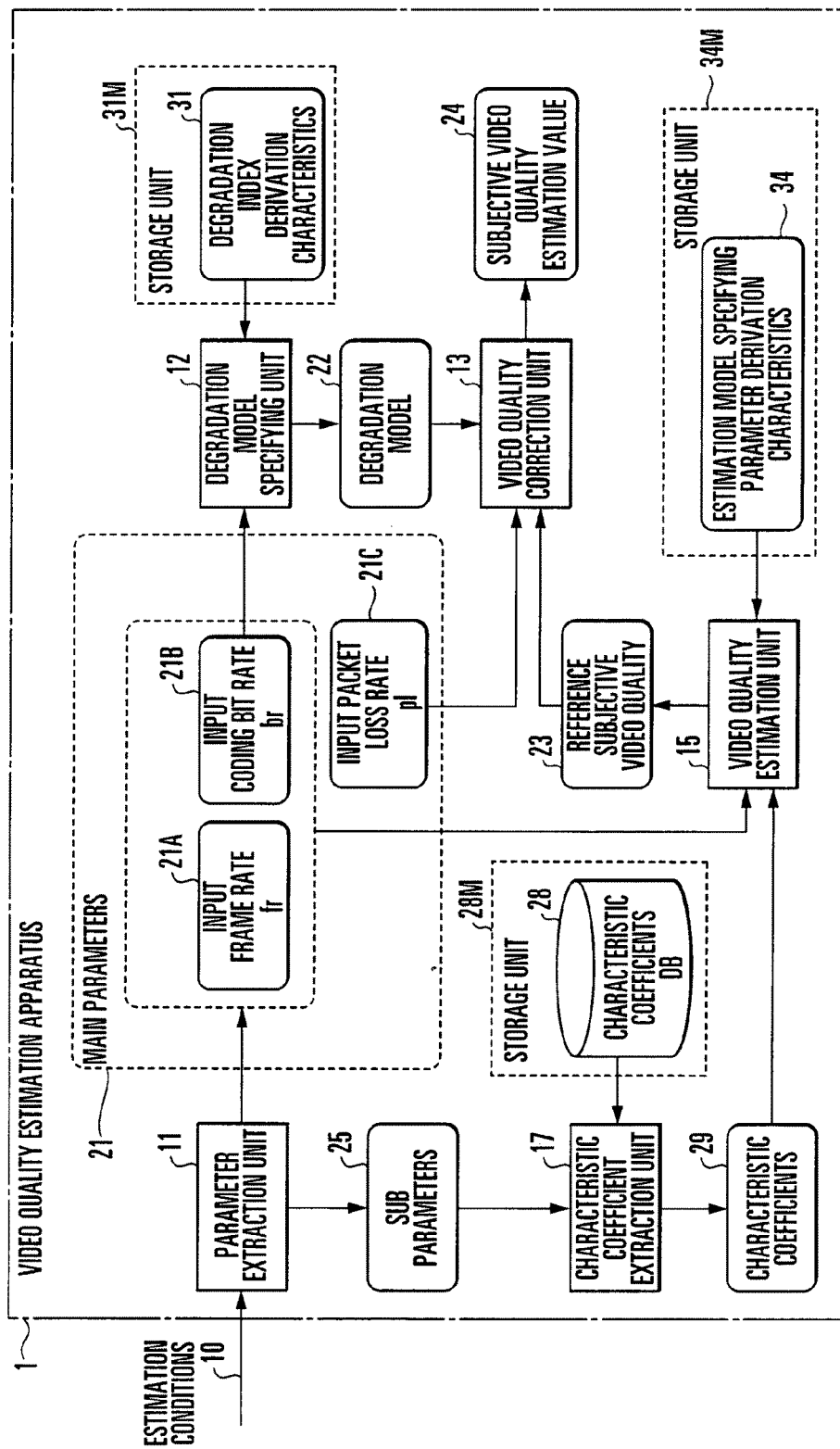
FIG. 25 is a block diagram showing the arrangement of a video quality estimation apparatus according to the fourth embodiment of the present invention.
Figure 26:
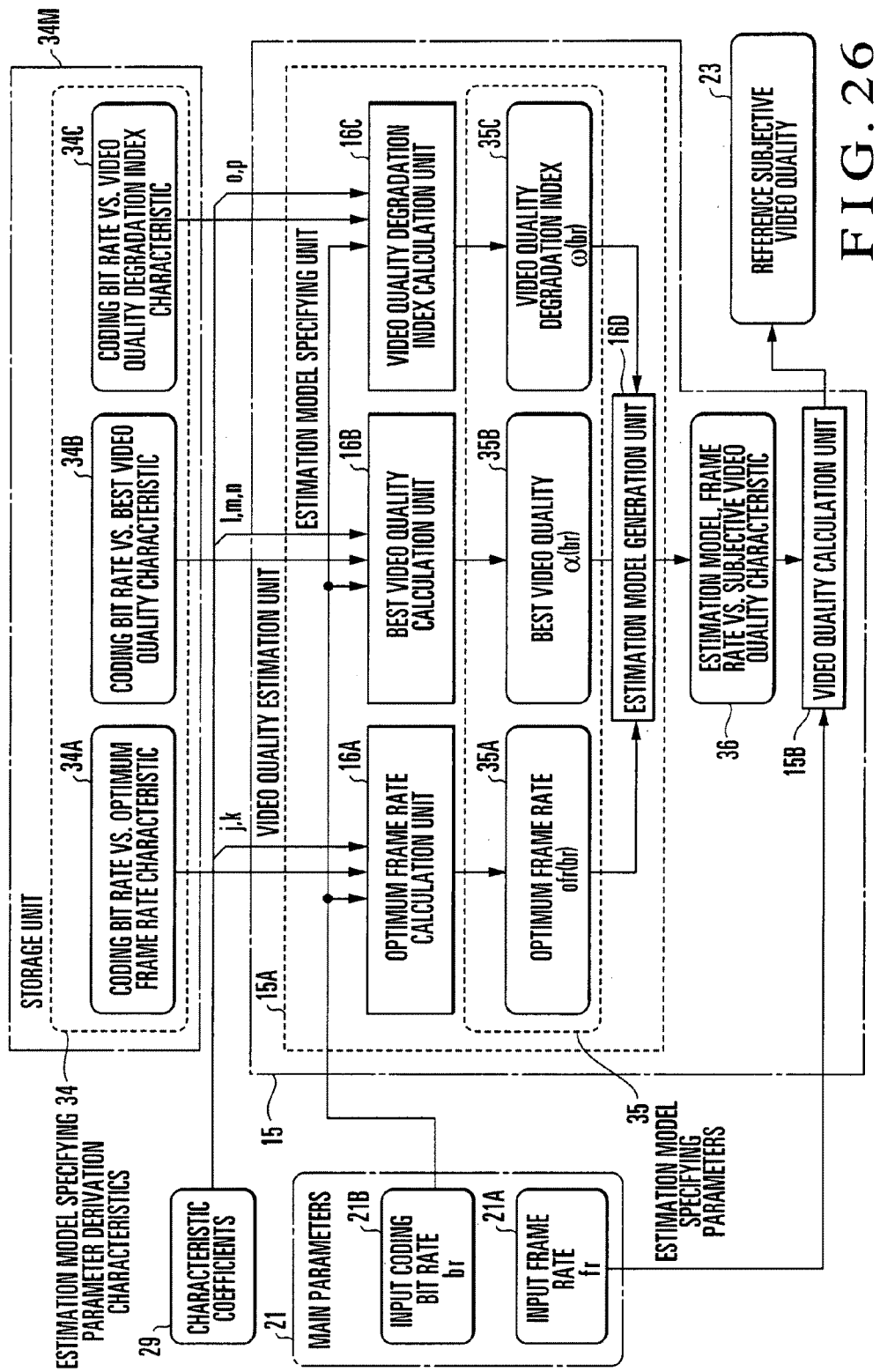
FIG. 26 is a block diagram showing the arrangement of the video quality estimation unit of the video quality estimation apparatus according to the fourth embodiment of the present invention.

A video quality estimation apparatus according to the fourth embodiment of the present invention will be described next with reference to FIGS. 25 and 26. FIG. 25 is a block diagram showing the arrangement of a video quality estimation apparatus according to the fourth embodiment of the present invention. The same reference numerals as in FIG. 15 described above denote the same or similar parts in FIG. 25. FIG. 26 is a block diagram showing the arrangement of the estimation model specifying unit of the video quality estimation apparatus according to the fourth embodiment of the present invention. The same reference numerals as in FIG. 16 described above denote the same or similar parts in FIG. 26.

The third embodiment has exemplified a case in which the estimation model specifying parameters 35 corresponding to an input coding bit rate are derived by referring to the estimation model specifying parameter derivation characteristics 34 prepared in advance. In the fourth embodiment, a case will be described in which assuming the third embodiment, estimation model specifying parameter derivation characteristics 34 corresponding to various estimation conditions 10 related to an evaluation target audiovisual communication service are sequentially specified on the basis of, of the estimation conditions 10, the communication type of the audiovisual communication service, the reproduction performance of a terminal that reproduces an audiovisual medium, or the reproduction environment of a terminal that reproduces an audiovisual medium, instead of preparing the estimation model specifying parameter derivation characteristics 34 in advance.

Unlike the third embodiment (FIG. 15), a video quality estimation apparatus 1 according to the fourth embodiment additionally includes a characteristic coefficient extraction unit 17 and a characteristic coefficient database (to be referred to as a characteristic coefficient DB hereinafter) 28.

The characteristic coefficient extraction unit 17 has a function of extracting characteristic coefficients 29 corresponding to sub parameters 25 extracted by a parameter extraction unit 11 from the estimation conditions 10 by referring to the characteristic coefficient DB 28 in a storage unit 28M (fourth storage unit). The sub parameters 25 used in this embodiment are the same as those described in the second embodiment, and a detailed description thereof will not be repeated here.

FIG. 27 is an explanatory view showing an arrangement of the characteristic coefficient DB. The characteristic coefficient DB 28 is a database showing sets of the various sub parameters 25 and corresponding characteristic coefficients j, k, . . . , p (29). As described above, the sub parameters 25 include a communication type parameter 25A indicating the communication type of an audiovisual communication service, a reproduction performance parameter 25B indicating the reproduction performance of a terminal that reproduces an audiovisual medium, and a reproduction environment parameter 25C indicating the reproduction environment of a terminal that reproduces an audiovisual medium.

The sub parameters 25 are not limited to these examples. They can arbitrarily be selected in accordance with the contents of the evaluation target audiovisual communication service or audiovisual medium and need only include at least one of the communication type parameter 25A, reproduction performance parameter 25B, and reproduction environment parameter 25C.

The characteristic coefficient extraction unit 17 extracts the characteristic coefficients 29 corresponding to the sub parameters 25 by referring to the characteristic coefficient DB 28 prepared in advance. The characteristic coefficients 29 are coefficients to specify the estimation model specifying parameter derivation characteristics to be used to derive estimation model specifying parameters 35.

An estimation model specifying unit 15A specifies the estimation model specifying parameter derivation characteristics 34, i.e., coding bit rate vs. optimum frame rate characteristic 34A, coding bit rate vs. best video quality characteristic 34B, and coding bit rate vs. video quality degradation index characteristic 34C specified by the characteristic coefficients 29 extracted by the characteristic coefficient extraction unit 17.

[Estimation Model Specifying Parameter Derivation Characteristics]

The estimation model specifying parameter derivation characteristics 34 used by the estimation model specifying unit 15A will be described next in detail.

The estimation model specifying parameter derivation characteristics 34 can be modeled in the following way by using the characteristic coefficients 29 extracted by the characteristic coefficient extraction unit 17 from the characteristic coefficient DB 28.

The coding bit rate vs. optimum frame rate characteristic 34A of the estimation model specifying parameter derivation characteristics 34 tends to monotonically increase the optimum frame rate along with the increase in coding bit rate and then converge to a certain maximum frame rate, as shown in FIG. 18 described above. The coding bit rate vs. optimum frame rate characteristic 34A can be modeled by, e.g., a general linear function. Let br be the coding bit rate, ofr(br) be the corresponding optimum frame rate, and j and k be coefficients. In this case, the coding bit rate vs. optimum frame rate characteristic 34A is given by $$ofr(br)=j+k \cdot br \tag{13}$$

The coding bit rate vs. best video quality characteristic 34B of the estimation model specifying parameter derivation characteristics 34 tends to increase the video quality along with the increase in coding bit rate and then converge to a certain maximum value and decrease the video quality along with the decrease in coding bit rate and then converge to a certain minimum value, as shown in FIG. 19 described above. The coding bit rate vs. best video quality characteristic 34B can be modeled by, e.g., a general logistic function.

Figure 28:
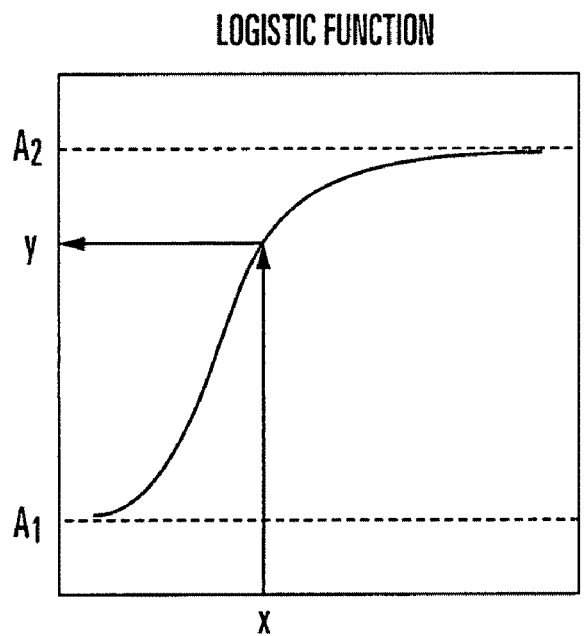
FIG. 28 is an explanatory view showing a logistic function.

FIG. 28 is an explanatory view showing a logistic function. A logistic function monotonically increases a function value y along with the increase in variable x when coefficient p>1. As the variable x decreases, the function value y converges to the minimum value. As the variable x increases, the function value y converges to the maximum value. Let $A_1$ be the minimum value, $A_2$ be the maximum value, and p and $x_0$ be coefficients. In this case, the function value y with respect to the arbitrary variable x is given by equation (14) including a term of the maximum value $A_2$ and a fraction term representing the decrease from the maximum value $A_2$.

$$y = A_2 + \frac{A_1 - A_2}{1 + (x/x_0)^p} \tag{14}$$

When the coding bit rate br is substituted into the variable x, a best video quality α(br) into the corresponding function value y, the characteristic coefficient 1 into the maximum value $A_2$, "0" into the minimum value $A_1$, the characteristic coefficient m into the variable $x_0$, and the characteristic coefficient n into the coefficient p, the coding bit rate vs. best video quality characteristic 34B is given by $$\alpha(br) = 1 - \frac{1}{1 + (br/m)^n} \tag{15}$$

Figure 29:
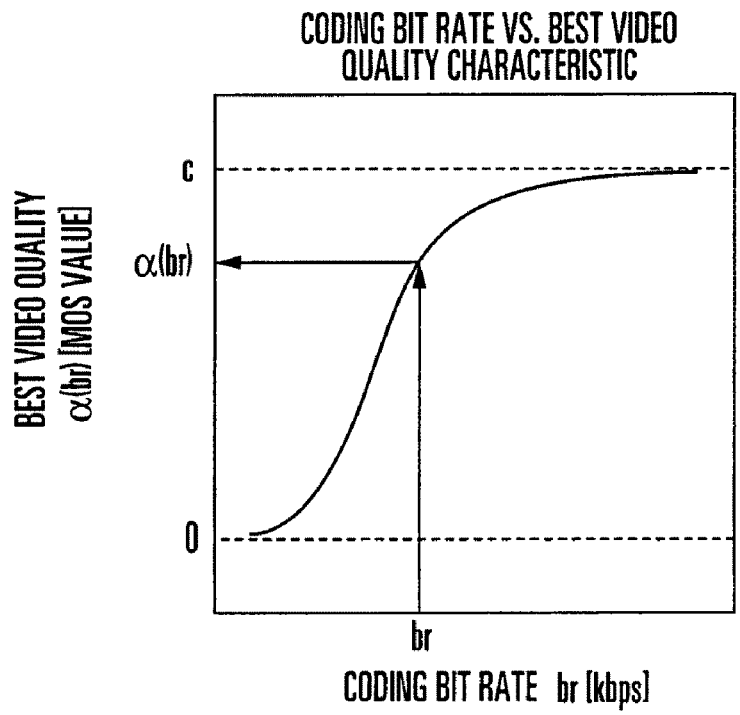
FIG. 29 is an explanatory view showing a coding bit rate vs. best video quality characteristic modeled by a logistic function.

FIG. 29 is an explanatory view showing the coding bit rate vs. best video quality characteristic modeled by a logistic function.

The coding bit rate vs. video quality degradation index characteristic 34C of the estimation model specifying parameter derivation characteristics 34 tends to increase the video quality degradation index along with the increase in coding bit rate and decrease the video quality degradation index along with the decrease in coding bit rate, as shown in FIG. 22 described above. The coding bit rate vs. video quality degradation index characteristic 34C can be modeled by, e.g., a general linear function. Let br be the coding bit rate, ω(br) be the corresponding video quality degradation index, and o and p be coefficients. In this case, the coding bit rate vs. video quality degradation index characteristic 34C is given by $$\omega(br) = o + p \cdot br \quad (16)$$

Modeling of the estimation model specifying parameter derivation characteristics 34 need not always be done by using the above-described linear function or logistic function. Any other function may be used. For example, depending on the contents of the evaluation target audiovisual communication service or audiovisual medium, the network performance, or the contents of the estimation conditions 10, a video quality estimation process based on an input coding bit rate or input frame rate within a relatively limited range suffices. If such local estimation is possible, the estimation model specifying parameter derivation characteristics 34 can be modeled by a simple function such as a linear function, as described above.

If the estimation model specifying parameters largely change with respect to the input coding bit rate or input frame rate, the coding bit rate vs. optimum frame rate characteristic 34A may be expressed by using another function such as an exponential function. In modeling using an exponential function, the optimum frame rate ofr(br) and video quality degradation index ω(br) are given by $$ofr(br) = q + r \cdot \exp(br/s)$$

$$\omega(br) = t + u \cdot \exp(br/v) \quad (17)$$

where q, r, s, t, u, and v are coefficients.

Operation of the Fourth Embodiment

Figure 30:
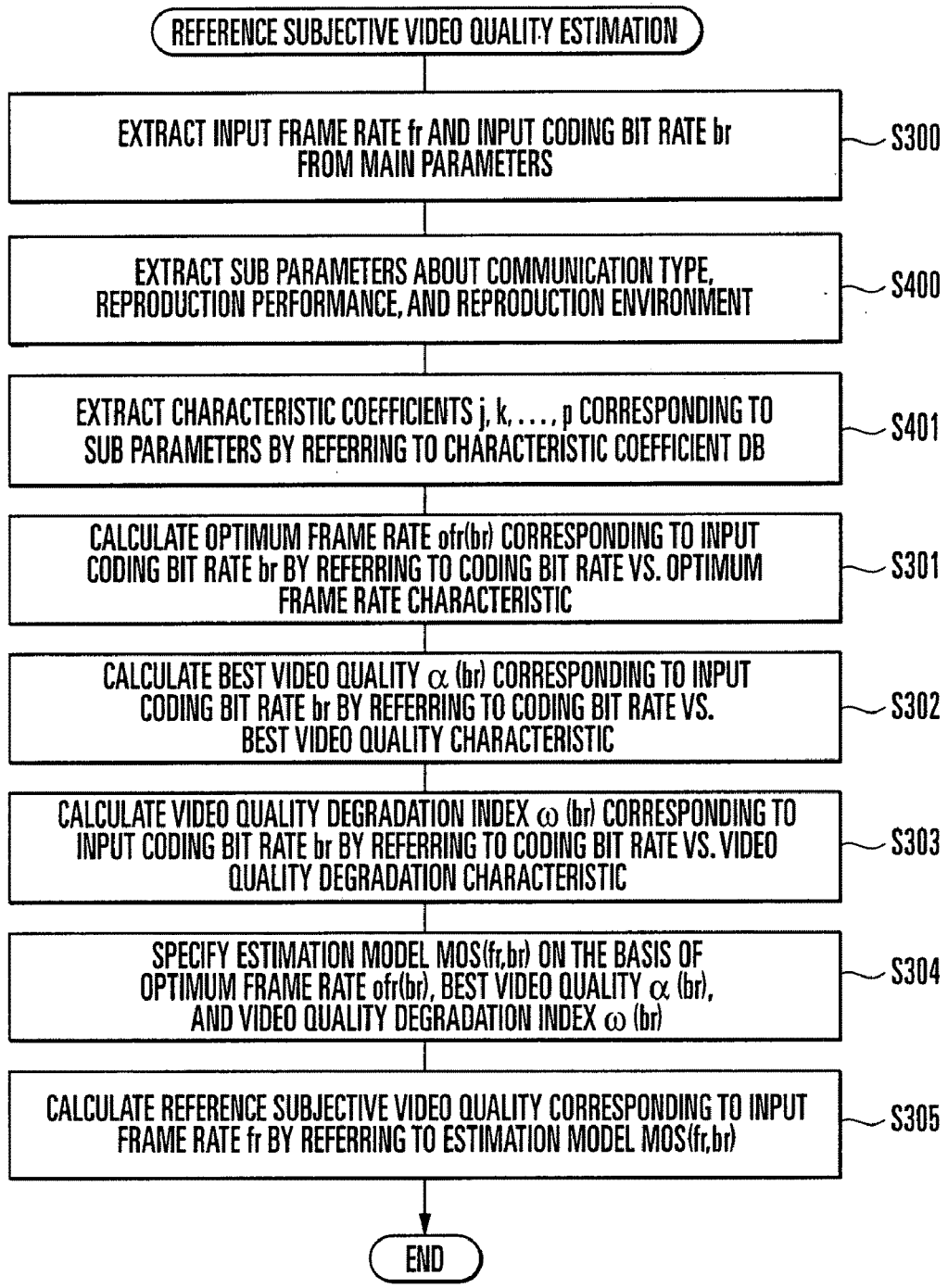
FIG. 30 is a flowchart illustrating the reference subjective video quality estimation process of the video quality estimation apparatus according to the fourth embodiment of the present invention.

The operation of the video quality estimation apparatus according to the fourth embodiment of the present invention will be described next with reference to FIG. 30. FIG. 30 is a flowchart illustrating the reference subjective video quality estimation process of the video quality estimation apparatus according to the fourth embodiment of the present invention. The same step numbers as in FIG. 23 described above denote the same or similar steps in FIG. 30.

The video quality estimation apparatus 1 starts the reference subjective video quality estimation process in FIG. 30 in accordance with an instruction operation from the operator or input of the estimation conditions 10. An example will be described here in which a video quality degradation index 35C is used as an estimation model specifying parameter in addition to an optimum frame rate 35A and a best video quality 35B. Additionally, the communication type parameter 25A, reproduction performance parameter 25B, and reproduction environment parameter 25C are used as the sub parameters 25. The characteristic coefficient DB 28 stores the sets of the sub parameters 25 and characteristic coefficients 29 in advance.

First, the estimation model specifying unit 15A acquires, from the storage unit (not shown), an input frame rate fr (21A) and an input coding bit rate br (21B) of main parameters 21 extracted from the estimation conditions 10 by the parameter extraction unit 11 (step S300).

The characteristic coefficient extraction unit 17 extracts, from the storage unit (not shown), the communication type parameter 25A, reproduction performance parameter 25B, and reproduction environment parameter 25C of the sub parameters 25 extracted from the estimation conditions 10 by the parameter extraction unit 11 (step S400).

The characteristic coefficient extraction unit 17 extracts and outputs the characteristic coefficients j, k, l, . . . , p (29) corresponding to the values of the sub parameters 25 by referring to the characteristic coefficient DB 28 in the storage unit 28M (step S401).

Accordingly, the estimation model specifying unit 15A causes an optimum frame rate calculation unit 16A to calculate the optimum frame rate ofr(br) (35A) corresponding to the input coding bit rate br (21B) by referring to, from the storage unit 34M, the coding bit rate vs. optimum frame rate characteristic 34A which is specified by the characteristic coefficients j and k of the characteristic coefficients 29 (step S301).

Next, the estimation model specifying unit 15A causes a best video quality calculation unit 16B to calculate the best video quality α(br) (35B) corresponding to the input coding bit rate br (21B) by referring to, from the storage unit 34M, the coding bit rate vs. best video quality characteristic 34B which is specified by the characteristic coefficients l, m, and n of the characteristic coefficients 29 (step S302).

Similarly, the estimation model specifying unit 15A causes a video quality degradation index calculation unit 16C to calculate the video quality degradation index ω(br) (35C) corresponding to the input coding bit rate br (21B) by referring to, from the storage unit 34M, the coding bit rate vs. video quality degradation index characteristic 34C which is specified by the characteristic coefficients o and p of the characteristic coefficients 29 (step S303).

After the estimation model specifying parameters 35 are calculated, the estimation model specifying unit 15A causes an estimation model generation unit 16D to substitute the actual values of the estimation model specifying parameters 35 including the optimum frame rate ofr(br), best video quality α(br), and video quality degradation index ω(br) into equation (12) described above, thereby specifying an estimation model MOS(fr,br), i.e., frame rate vs. subjective video quality characteristic (step S304).

Then, the video quality estimation apparatus 1 causes a video quality calculation unit 15B to calculate video quality corresponding to the input frame rate 21A of the main parameters 21 output from the parameter extraction unit 11 by referring to an estimation model 36 specified by the estimation model specifying unit 15A, outputs the video quality as a subjective video quality estimation value 24 a viewer actually senses from the audiovisual medium reproduced on the terminal by using the evaluation target audiovisual communication service (step S305), and finishes the series of reference subjective video quality estimation processes.

As described above, in this embodiment, the characteristic coefficient extraction unit 17 extracts, from the characteristic coefficient DB 28 in the storage unit 28M, the characteristic coefficients 29 corresponding to the sub parameters 25 which are extracted by the parameter extraction unit 11 and include at least one of the communication type parameter 25A, reproduction performance parameter 25B, and reproduction environment parameter 25C. The estimation model specifying unit 15A calculates the estimation model specifying parameters 35 corresponding to the input coding bit rate 21B on the basis of the estimation model specifying parameter derivation characteristics 34 specified by the characteristic coefficients 29. It is therefore possible to derive the estimation model specifying parameters 35 based on the specific properties of the evaluation target audiovisual communication service or terminal. This improves the reference video quality estimation accuracy.

Especially, in estimating video quality in the prior art, a video estimation model needs to be prepared for each encoding method or terminal used in an evaluation target audiovisual communication service. However, according to this embodiment, the video estimation model does not depend on the encoding method or terminal. The same video estimation model can be used only by referring to the coefficients to be used in the video estimation model in accordance with the encoding method or terminal. It is therefore possible to flexibly cope with audiovisual communication services in different environments. Hence, the video quality correction unit 13 described in the first or second embodiment can estimate the subjective video quality estimation value 24 corresponding to the arbitrary estimation conditions 10 without preparing the reference subjective video quality 23.

FIG. 31 is a graph showing the estimation accuracy of a video quality estimation apparatus using this embodiment. FIG. 32 is a graph showing the estimation accuracy of a conventional video quality estimation apparatus based on reference 2. Referring to FIGS. 31 and 32, the abscissa represents the estimation value (MOS value) of subjective video quality estimated by using the video quality estimation apparatus, and the ordinate represents the evaluation value (MOS value) of subjective video quality actually opinion-evaluated by a viewer. The error between the evaluation value and the estimation value is smaller, and the estimation accuracy is higher in FIG. 31 than in FIG. 32. These are comparison results under specific estimation conditions. Similar comparison results have been confirmed even when another encoding method or terminal was used.

Fifth Embodiment

Figure 33:
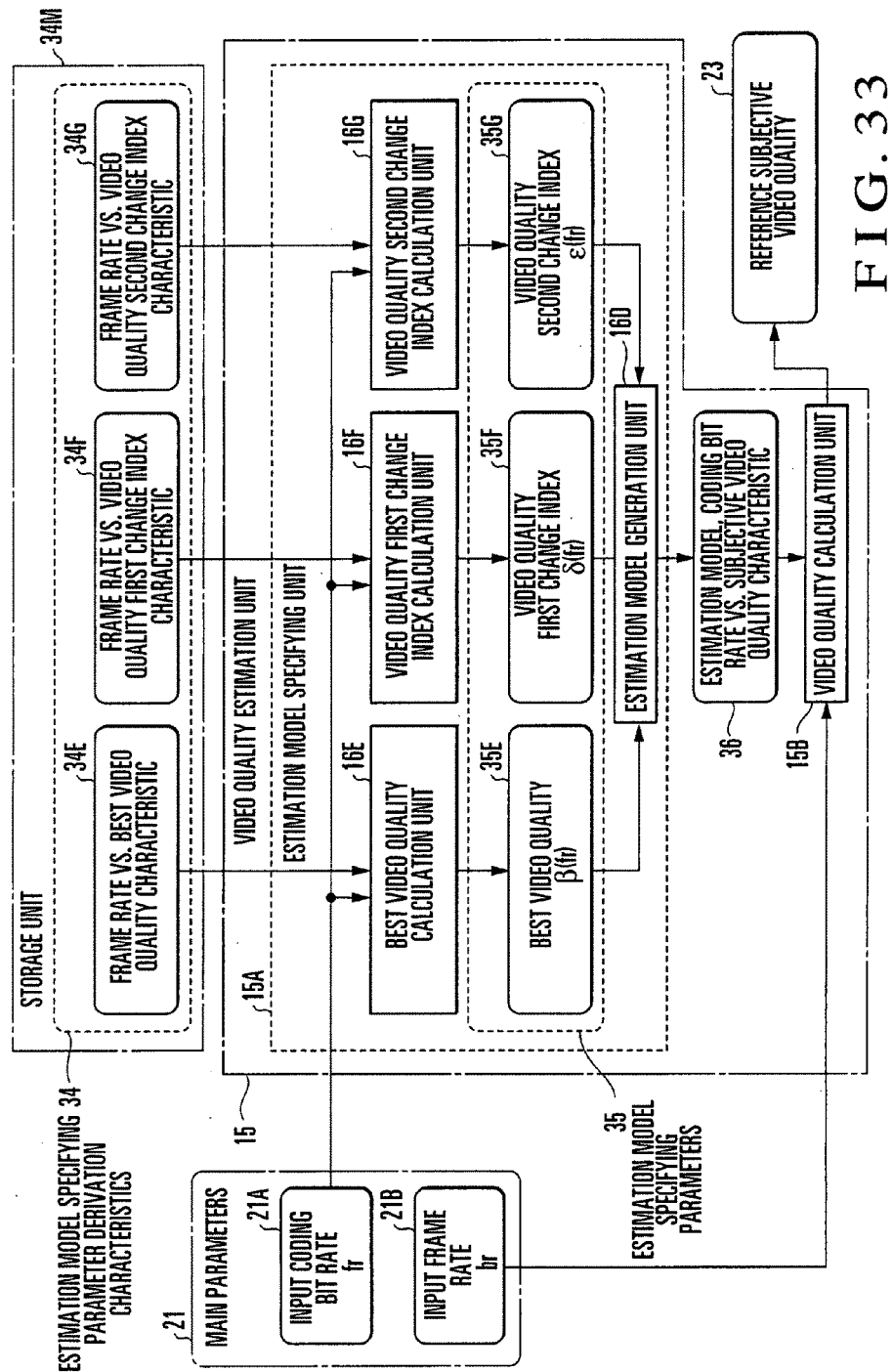
FIG. 33 is a block diagram showing the arrangement of the estimation model specifying unit of a video quality estimation apparatus according to the fifth embodiment of the present invention.

A video quality estimation apparatus according to the fifth embodiment of the present invention will be described first with reference to FIG. 33. FIG. 33 is a block diagram showing the arrangement of the video quality estimation unit of the video quality estimation apparatus according to the fifth embodiment of the present invention. The same reference numerals as in FIG. 16 described above denote the same or similar parts in FIG. 33.

In the example described in the third embodiment, the video quality estimation unit 15 specifies the estimation model 36 representing the relationship between the frame rate and the reference subjective video quality of an audiovisual medium on the basis of the input coding bit rate 21B, estimates the reference subjective video quality 23 corresponding to the input frame rate 21A by using the specified estimation model 36, and outputs the reference subjective video quality.

In the fifth embodiment, an example will be described in which a video quality estimation unit 15 specifies an estimation model 36 representing the relationship between the coding bit rate and the reference subjective video quality of an audiovisual medium on the basis of an input frame rate 21A, estimates a reference subjective video quality 23 corresponding to an input coding bit rate 21B by using the specified estimation model 36, and outputs the reference subjective video quality.

The arrangement of causing a video quality correction unit 13 to obtain a subjective video quality estimation value 24 by correcting the reference subjective video quality 23 on the basis of a degradation model 22 is the same as in the above-described first embodiment, and a detailed description thereof will not be repeated here. The second embodiment may be used in place of the first embodiment.

[Video Quality Estimation Unit]

In a video quality estimation apparatus 1 according to this embodiment, an estimation model specifying unit 15A includes a best video quality calculation unit 16E, video quality first change index calculation unit 16F, and video quality second change index calculation unit 16G in place of the optimum frame rate calculation unit 16A, best video quality calculation unit 16B, and video quality degradation index calculation unit 16C, unlike the third embodiment (FIG. 16). A storage unit 34M stores a frame rate vs. best video quality characteristic 34E, frame rate vs. video quality first change index characteristic 34F, and frame rate vs. video quality second change index characteristic 34G in place of the coding bit rate vs. optimum frame rate characteristic 34A, coding bit rate vs. best video quality characteristic 34B, and coding bit rate vs. video quality degradation index characteristic 34C.

The best video quality calculation unit 16E has a function of calculating, as one of estimation model specifying parameters 35, best video quality $\beta(fr)$ (35E) representing the best value of the subjective video quality of an audiovisual medium transmitted at the input frame rate 21A by referring to the frame rate vs. best video quality characteristic 34E in the storage unit 34M.

The video quality first change index calculation unit 16F has a function of calculating, as one of the estimation model specifying parameters 35, a video quality first change index $\delta(fr)$ (35F) representing the degree of change (degradation) from the best video quality 35E representing the best value of the subjective video quality of an audiovisual medium transmitted at the input frame rate 21A by referring to the frame rate vs. video quality first change index characteristic 34F in the storage unit 34M.

The video quality second change index calculation unit 16G has a function of calculating, as one of the estimation model specifying parameters 35, a video quality second change index $\epsilon(fr)$ (35G) representing the degree of change (degradation) from the best video quality 35E representing the best value of the subjective video quality of an audiovisual medium transmitted at the input frame rate 21A by referring to the frame rate vs. video quality second change index characteristic 34G in the storage unit 34M.

The frame rate vs. best video quality characteristic 34E, frame rate vs. video quality first change index characteristic 34F, and frame rate vs. video quality second change index characteristic 34G are prepared as estimation model specifying parameter derivation characteristics 34 and stored in the storage unit 34M in advance.

An estimation model generation unit 16D has a function of generating the estimation model 36 to estimate subjective video quality corresponding to the input frame rate 21A of the main parameters 21 by substituting, into a predetermined function expression, the values of the estimation model specifying parameters 35 including the best video quality $\beta(fr)$ calculated by the best video quality calculation unit 16E, the video quality first change index $\delta(fr)$ calculated by the video quality first change index calculation unit 16F, and the video quality second change index $\epsilon(fr)$ calculated by the video quality second change index calculation unit 16G.

[Subjective Video Quality Characteristic]

The subjective video quality characteristic of an audiovisual medium in an audiovisual communication service will be described next with reference to FIG. 34. FIG. 34 is a graph showing the coding bit rate vs. subjective video quality characteristic of an audiovisual medium in an audiovisual communication service. Referring to FIG. 34, the abscissa represents a coding bit rate br (kbps), and the ordinate represents a subjective video quality value MOS(fr,br) (MOS value). FIG. 34 shows characteristics corresponding to the respective frame rates fr.

The number of coding bits per unit frame and the frame rate have a tradeoff relationship with respect to the subjective video quality of an audiovisual medium.

More specifically, in providing a video image encoded at a certain coding bit rate, when the video image is encoded at a high frame rate, the temporal video quality can be improved because a smooth video image is obtained. On the other hand, spatial image degradation may become noticeable because of the decrease in the number of coding bits per unit frame, resulting in poor video quality. When the video image is encoded by using a large number of coding bits per unit frame, spatial image degradation improves so that a higher video quality can be obtained. However, since the number of frames per unit time decreases, temporal frame drop with a jerky effect may take place, resulting in poor video quality.

When the frame rate does not change, the video quality has monotonically increases along with the increase in coding bit rate and converges to the best video quality of the audiovisual medium transmitted at the frame rate, as shown in FIG. 34. For example, when frame rate fr=10 [fbs], the subjective video quality characteristic monotonically increases along with the increase in coding bit rate br and converges to best video quality=3.8 [MOS] near coding bit rate br=1000 [kbps].

The subjective video quality characteristic exhibits a similar shape even when the frame rate changes. The coordinate position of each subjective video quality characteristic can be specified by the estimation model specifying parameters including the best video quality and the degree of change corresponding to the best video quality.

This embodiment places focus on such property of the subjective video quality characteristic. The estimation model specifying unit 15A specifies the estimation model 36 representing the relationship between the coding bit rate and the subjective video quality of an audiovisual medium on the basis of the input frame rate 21A. The video quality estimation unit 15 estimates the reference subjective video quality 23 corresponding to the input coding bit rate 21B by using the estimation model 36 specified by the estimation model specifying unit 15A.

[Estimation Model]

The estimation model used by the estimation model specifying unit 15A and derivation of the estimation model specifying parameter will be described next in detail.

The coding bit rate vs. subjective video quality characteristic shown in FIG. 34 tends to monotonically increase along will the increase in coding bit rate and converge to the best video quality of the audiovisual medium transmitted at the frame rate. The coding bit rate vs. subjective video quality characteristic can be modeled by, e.g., a general logistic function as shown in FIG. 28.

When the coding bit rate br is substituted into a variable x, the subjective video quality MOS(fr,br) into a corresponding function value y, the best video quality $\beta(fr)$ into a maximum value $A_2$, "1" into the minimum value $A_1$, the video quality first change index $\delta(fr)$ into a coefficient $x_0$, and the video quality second change index $\epsilon(fr)$ into a coefficient p, the subjective video quality MOS corresponding to the arbitrary coding bit rate br is given by $$MOS(fr, br) = \beta(fr) + \frac{1 - \beta(fr)}{1 + (br/\delta(fr))^{\epsilon(fr)}} \quad (18)$$

Figure 35:
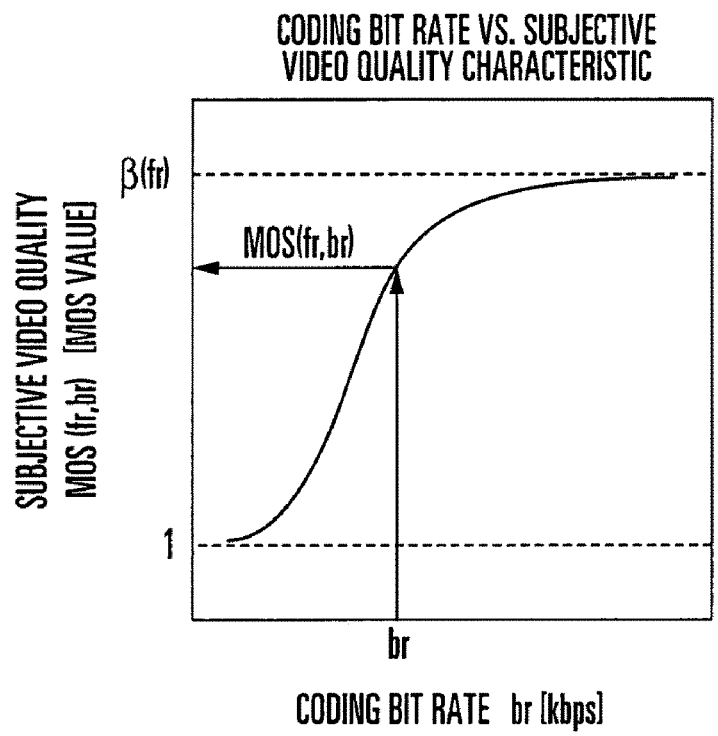
FIG. 35 is an explanatory view showing a coding bit rate vs. subjective video quality characteristic modeled by a logistic function.

As a result, the estimation model 36, i.e., coding bit rate vs. subjective video quality characteristic corresponding to the input frame rate 21A can be specified. FIG. 35 is an explanatory view showing the coding bit rate vs. subjective video quality characteristic modeled by the logistic function.

Hence, when the estimation model specifying unit 15A should specify the estimation model 36 representing the relationship between the coding bit rate and the subjective video quality of an audiovisual medium on the basis of the input frame rate 21A, it is necessary to derive the best video quality 35E, video quality first change index 35F, and video quality second change index 35G as the estimation model specifying parameters corresponding to the input frame rate 21A. Especially, the video quality first change index $\delta(fr)$ and video quality second change index $\epsilon(fr)$ are used to calculate the decrease from the maximum value A4 in the fraction term of the logistic function, i.e., the change (degradation) from the best video quality $\beta(fr)$ and are necessary for specifying the estimation model 36 as change indices representing the degree of change related to the subjective video quality at the frame rate fr.

In this embodiment, the frame rate vs. best video quality characteristic 34E, frame rate vs. video quality first change index characteristic 34F, and frame rate vs. video quality second change index characteristic 34G to be described below are prepared in advance as the estimation model specifying parameter derivation characteristics 34. The estimation model specifying parameters 35 corresponding to the input frame rate 21A are derived by referring to these characteristics.

In the characteristics shown in FIG. 34, the frame rate of a transmitted audiovisual medium and the corresponding best video quality have a relationship with such a tendency that along with the increase in frame rate fr, the best video quality $\beta(fr)$ increases and converges to a certain maximum value (maximum subjective video quality value).

Figure 36:
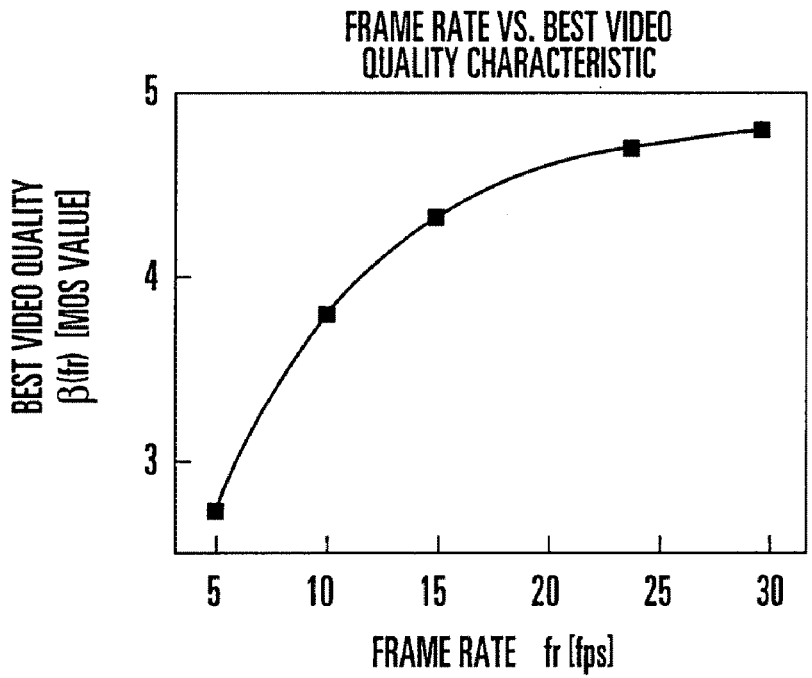
FIG. 36 is a graph showing a frame rate vs. best video quality characteristic.

FIG. 36 is a graph showing the frame rate vs. best video quality characteristic. Referring to FIG. 36, the abscissa represents the frame rate fr (fps), and the ordinate represents the best video quality $\beta(fr)$ (MOS value).

The frame rate of a transmitted audiovisual medium and the corresponding video quality first change index have a relationship with such a tendency that along with the increase in frame rate, the video quality first change index monotonically increases.

Figure 37:
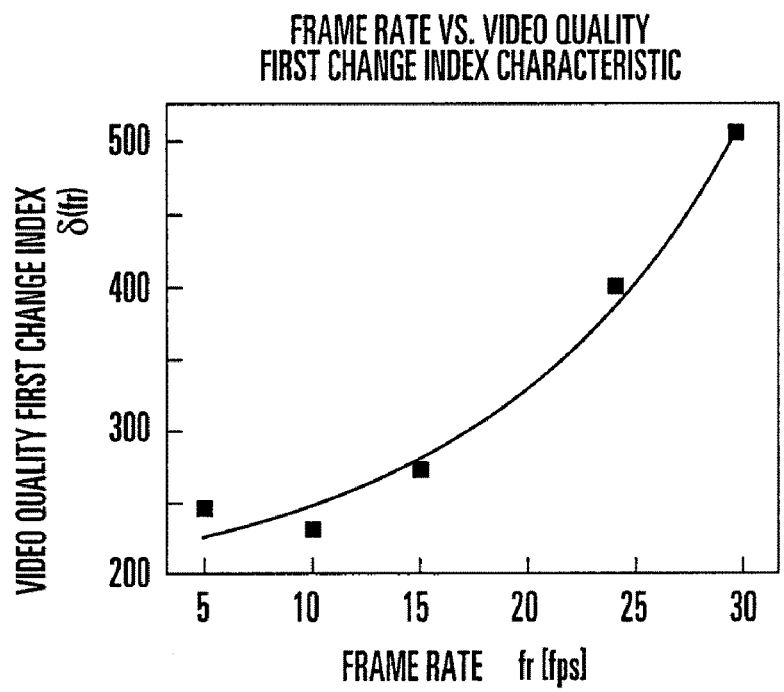
FIG. 37 is a graph showing a frame rate vs. video quality first change index characteristic.

FIG. 37 is a graph showing the frame rate vs. video quality first change index characteristic. Referring to FIG. 37, the abscissa represents the frame rate fr (fps), and the ordinate represents the video quality first change index $\delta(fr)$.

The frame rate of a transmitted audiovisual medium and the corresponding video quality second change index have a relationship with such a tendency that along with the increase in frame rate, the video quality second change index monotonically decreases.

Figure 38:
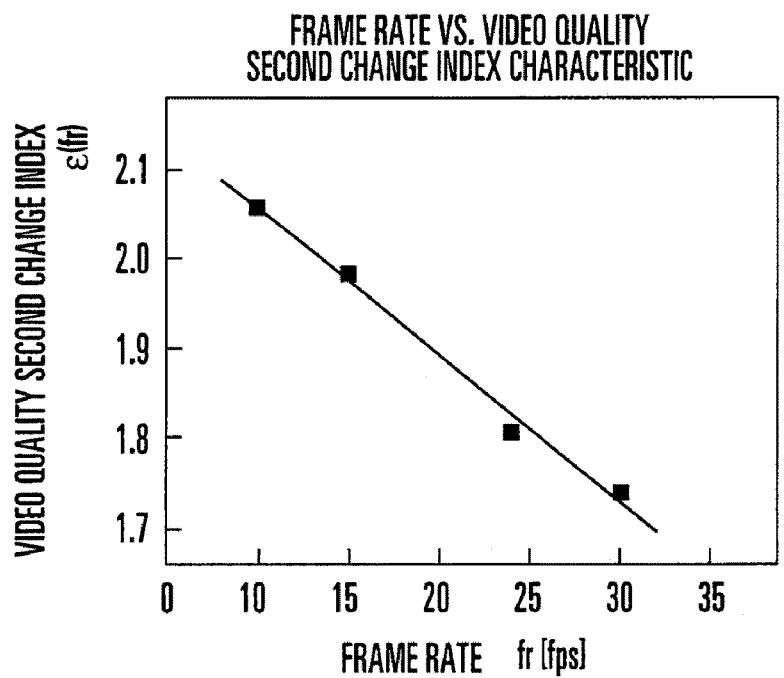
FIG. 38 is a graph showing a frame rate vs. video quality second change index characteristic.

FIG. 38 is a graph showing the frame rate vs. video quality second change index characteristic. Referring to FIG. 38, the abscissa represents the frame rate fr (fps), and the ordinate represents the video quality second change index ε(fr).

Operation of the Fifth Embodiment

Figures 39, 40:
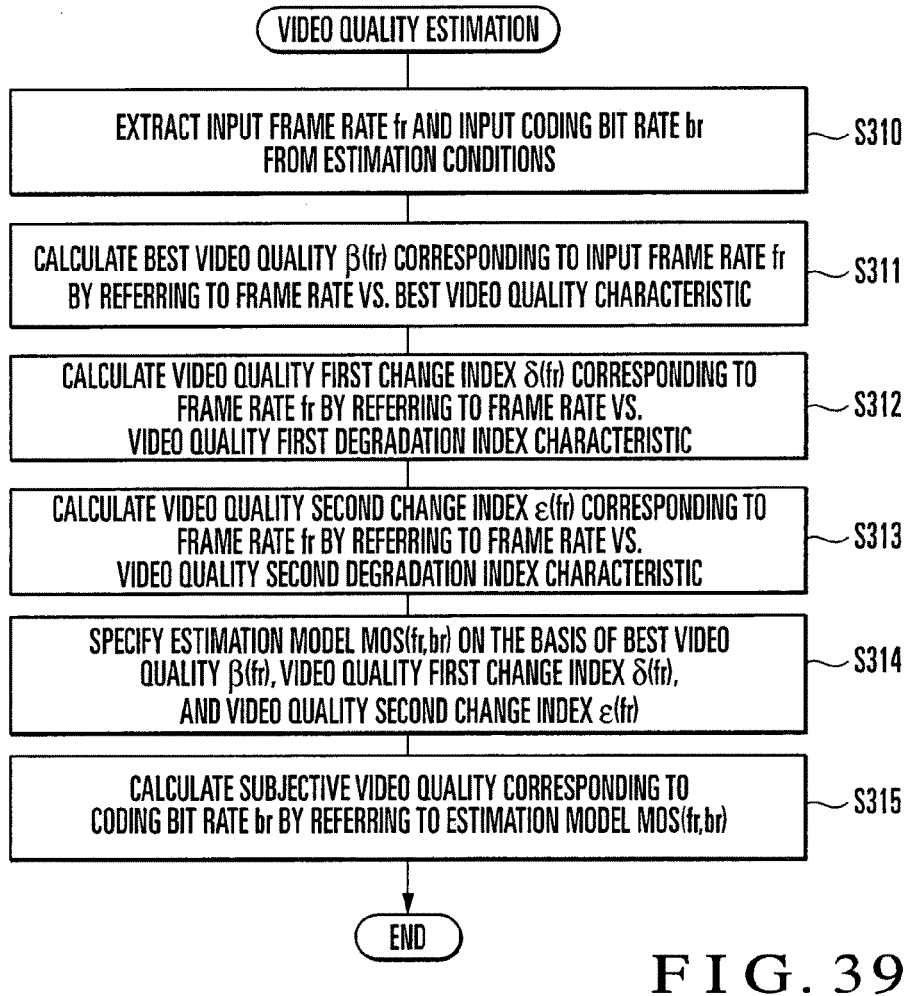
FIG. 39 is a flowchart illustrating the video quality estimation process of the video quality estimation apparatus according to the fifth embodiment of the present invention.
FIG. 40 is a view showing a structural example of estimation model specifying parameter information.

The operation of the video quality estimation apparatus according to the fifth embodiment of the present invention will be described next with reference to FIG. 39. FIG. 39 is a flowchart illustrating the reference subjective video quality estimation process of the video quality estimation apparatus according to the fifth embodiment of the present invention.

The video quality estimation apparatus 1 starts the video quality estimation process in FIG. 39 in accordance with an instruction operation from the operator or input of the estimation conditions 10. In the video quality estimation apparatus 1, the above-described frame rate vs. best video quality characteristic 34E (FIG. 36), frame rate vs. video quality first change index characteristic 34F (FIG. 37), and frame rate vs. video quality second change index characteristic 34G (FIG. 38) are prepared in advance and stored in the storage unit 34M as function expressions.

First, a parameter extraction unit 11 extracts the various estimation conditions 10 related to an evaluation target audiovisual communication service, extracts a coding bit rate and a frame rate related to encoding of an audiovisual medium from the estimation conditions 10, and outputs the input coding bit rate br (21B) and input frame rate fr (21A) as the main parameters 21 (step S310).

The estimation model specifying unit 15A specifies the estimation model 36 representing the relationship between the coding bit rate and the subjective video quality of the audiovisual medium on the basis of the input frame rate 21A of the main parameters 21 output from the parameter extraction unit 11.

More specifically, the best video quality calculation unit 16E calculates the best video quality β(fr) (35E) corresponding to the input frame rate fr (21A) by referring to the frame rate vs. best video quality characteristic 34E in the storage unit 34M (step S311).

Next, the estimation model specifying unit 15A causes the video quality first change index calculation unit 16F to calculate the video quality first change index δ(fr) (35F) corresponding to the input frame rate fr (21A) by referring to the frame rate vs. video quality first change index characteristic 34F in the storage unit 34M (step S312).

Similarly, the estimation model specifying unit 15A causes the video quality second change index calculation unit 16G to calculate the video quality second change index ε(fr) (35G) corresponding to the input frame rate fr (21A) by referring to the frame rate vs. video quality second change index characteristic 34G in the storage unit 34M (step S313).

After the estimation model specifying parameters 35 are calculated, the estimation model specifying unit 15A causes the estimation model generation unit 16D to substitute the actual values of the estimation model specifying parameters 35 including the best video quality β(fr), video quality first change index δ(fr), and video quality second change index ε(fr) into equation (18) described above, thereby specifying the estimation model 36, i.e., coding bit rate vs. subjective video quality characteristic (step S314).

Then, the video quality estimation apparatus 1 causes the video quality estimation unit 15 to calculate video quality corresponding to the input coding bit rate 21B of the main parameters 21 output from the parameter extraction unit 11 by referring to the estimation model 36 specified by the estimation model specifying unit 15A, outputs the video quality as the reference subjective video quality 23 a viewer actually senses from the audiovisual medium reproduced on the terminal by using the evaluation target audiovisual communication service (step S315), and finishes the series of reference subjective video quality estimation processes.

As described above, in this embodiment, in estimating subjective video quality corresponding to the main parameters 21 which are input as the input coding bit rate 21B representing the number of coding bits per unit time and the input frame rate 21A representing the number of frames per unit time of an audiovisual medium, the estimation model specifying unit 15A specifies the estimation model 36 representing the relationship between the coding bit rate and the subjective video quality of the audiovisual medium on the basis of the input frame rate 21A. Subjective video quality corresponding to the input coding bit rate 21B is estimated by using the specified estimation model 36 and output as the reference subjective video quality 23.

It is therefore possible to obtain the reference subjective video quality 23 corresponding to the input coding bit rate 21B input as the estimation condition 10 by referring to the estimation model 36 corresponding to the input frame rate 21A input as the estimation condition 10.

This allows to obtain specific and useful guidelines for quality design/management to know the set values of the coding bit rate and frame rate and video quality corresponding to them in consideration of the tradeoff between the number of coding bits per unit frame and the frame rate with respect to video quality. The guidelines are highly applicable in quality design of applications and networks before providing a service and quality management after the start of the service.

For example, assume that an audiovisual medium should be distributed at desired video quality. Use of the video quality estimation apparatus 1 of this embodiment enables to specifically grasp which coding bit rate and frame rate should be used to encode a video image captured by a camera to satisfy the desired video quality. Especially, the coding bit rate is often limited by the constraints of a network. In this case, the coding bit rate is fixed, and the video quality estimation apparatus 1 of this embodiment is applied. This makes it possible to easily and specifically grasp the relationship between the frame rate and the video quality.

In the example described in this embodiment, the frame rate vs. best video quality characteristic 34E, frame rate vs. video quality first change index characteristic 34F, and frame rate vs. video quality second change index characteristic 34G used to calculate the estimation model specifying parameters 35 are prepared in the form of function expressions and stored in the storage unit 34M in advance. However, the estimation model specifying parameter derivation characteristics 34 used to calculate the estimation model specifying parameters are not limited to function expressions. They may be stored in the storage unit 34M as values corresponding to the input frame rate.

FIG. 40 is a view showing a structural example of estimation model specifying parameter information representing the correlation between the input frame rate and the estimation model specifying parameters. Each estimation model specifying parameter information contains a set of the input frame rate fr (21A) and corresponding best video quality β(fr) (35E), video quality first change index δ(fr) (35F), and video quality second change index ε(fr) (35G). The estimation model specifying parameter information is calculated on the basis of the estimation model specifying parameter derivation characteristics 34 and stored in the storage unit 34M in advance.

The estimation model specifying parameters 35 corresponding to the input frame rate 21A may be derived by referring to the estimation model specifying parameter information.

Sixth Embodiment

Figure 41:
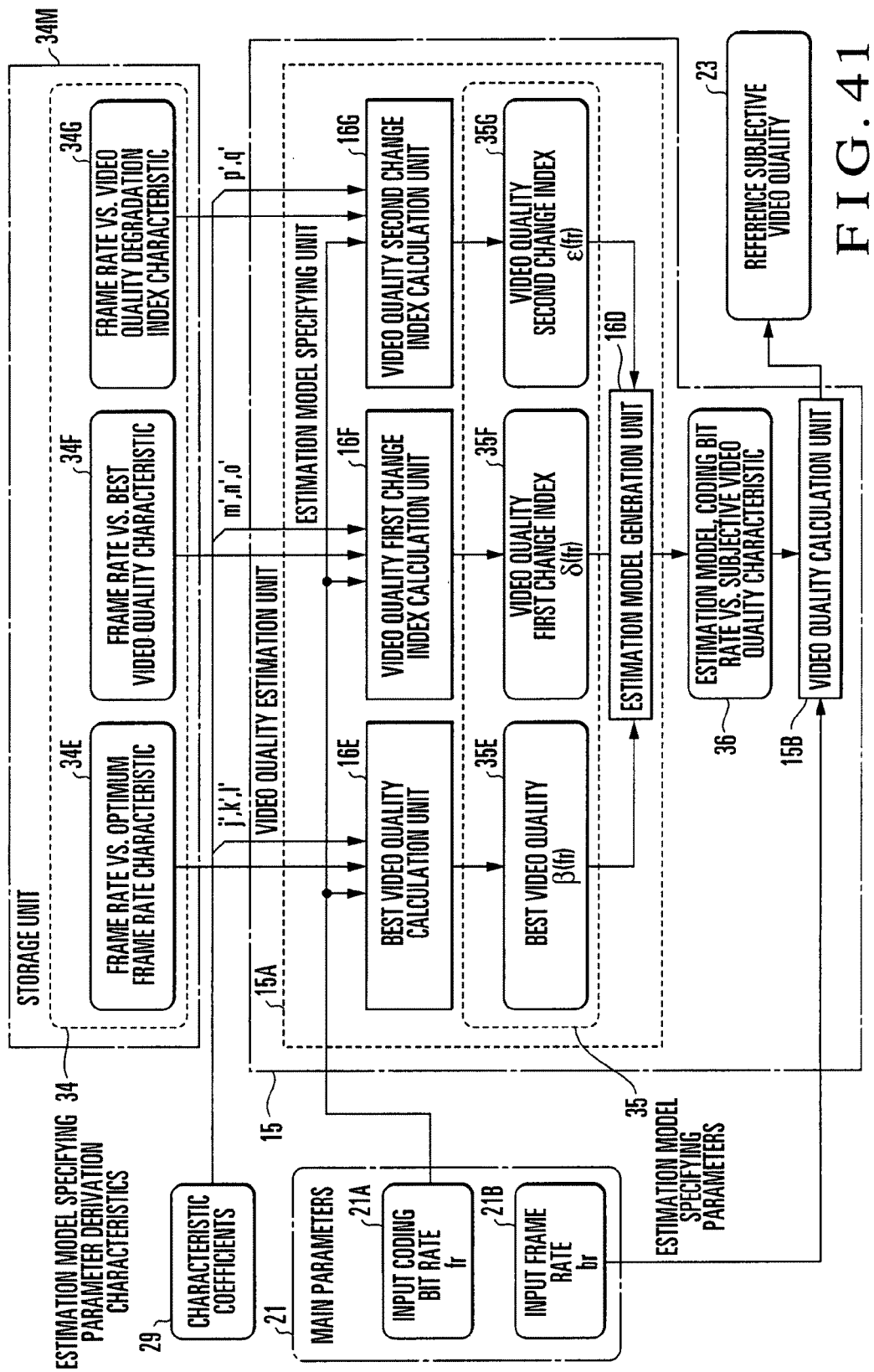
FIG. 41 is a block diagram showing the arrangement of the estimation model specifying unit of a video quality estimation apparatus according to the sixth embodiment of the present invention.

A video quality estimation apparatus according to the sixth embodiment of the present invention will be described next with reference to FIG. 41. FIG. 41 is a block diagram showing the arrangement of the estimation model specifying unit of a video quality estimation apparatus according to the sixth embodiment of the present invention. The same reference numerals as in FIG. 33 described above denote the same or similar parts in FIG. 41.

The fourth embodiment has exemplified a case in which the coding bit rate vs. optimum frame rate characteristic 34A, coding bit rate vs. best video quality characteristic 34B, and coding bit rate vs. video quality degradation index characteristic 34C used in the third embodiment are specified as the estimation model specifying parameter derivation characteristics 34.

In the sixth embodiment, a case will be described in which a frame rate vs. best video quality characteristic 34E, frame rate vs. video quality first change index characteristic 34F, and frame rate vs. video quality second change index characteristic 34G used in the fifth embodiment are specified as estimation model specifying parameter derivation characteristics 34.

The arrangement of the video quality estimation apparatus which sequentially specifies the estimation model specifying parameter derivation characteristics 34 corresponding to estimation conditions 10 on the basis of sub parameters 25 is the same as in the above-described fourth embodiment (FIG. 25), and a detailed description thereof will not be repeated here.

FIG. 42 is an explanatory view showing an arrangement of a characteristic coefficient DB. A characteristic coefficient DB 28 is a database showing sets of the various sub parameters 25 and corresponding characteristic coefficients j', k', l', ..., q' (29). The sub parameters 25 include a communication type parameter 25A indicating the communication type of an audiovisual communication service, a reproduction performance parameter 25B indicating the reproduction performance of a terminal that reproduces an audiovisual medium, and a reproduction environment parameter 25C indicating the reproduction environment of a terminal that reproduces an audiovisual medium.

A detailed example of the communication type parameter 25A is "task" that indicates a communication type executed by an evaluation target audiovisual communication service.

Detailed examples of the reproduction performance parameter 25B are "encoding method", "video format", and "key frame" related to encoding of an audiovisual medium and "monitor size" and "monitor resolution" related to the medium reproduction performance of a terminal.

A detailed example of the reproduction environment parameter 25C is "indoor luminance" in reproducing a medium on a terminal.

The sub parameters 25 are not limited to these examples. They can arbitrarily be selected in accordance with the contents of the evaluation target audiovisual communication service or audiovisual medium and need only include at least one of the communication type parameter 25A, reproduction performance parameter 25B, and reproduction environment parameter 25C.

A characteristic coefficient extraction unit 17 extracts the characteristic coefficients 29 corresponding to the sub parameters 25 by referring to the characteristic coefficient DB 28 in a storage unit 28M prepared in advance. The characteristic coefficients 29 are coefficients to specify the estimation model specifying parameter derivation characteristics to be used to derive estimation model specifying parameters 35.

An estimation model specifying unit 15A specifies the estimation model specifying parameter derivation characteristics 34, i.e., frame rate vs. best video quality characteristic 34E, frame rate vs. video quality first change index characteristic 34F, and frame rate vs. video quality second change index characteristic 34G specified by the characteristic coefficients 29 extracted by the characteristic coefficient extraction unit 17.

[Estimation Model Specifying Parameter Derivation Characteristics]

The estimation model specifying parameter derivation characteristics 34 used by the estimation model specifying unit 15A will be described next in detail.

The estimation model specifying parameter derivation characteristics 34 can be modeled in the following way by using the characteristic coefficients 29 extracted by the characteristic coefficient extraction unit 17 from the characteristic coefficient DB 28.

The frame rate vs. best video quality characteristic 34E of the estimation model specifying parameter derivation characteristics 34 tends to monotonically increase the best video quality along with the increase in frame rate and then converge to certain maximum subjective video quality, as shown in FIG. 36 described above. The frame rate vs. best video quality characteristic 34E can be modeled by, e.g., a general exponential function. Let fr be the frame rate, $\beta(fr)$ be the corresponding best video quality, and j', k', and l' be coefficients. In this case, the frame rate vs. best video quality characteristic 34E is given by $$\beta(fr)=j'+k'\cdot\exp(-fr/l') \quad (19)$$

The frame rate vs. video quality first change index characteristic 34F of the estimation model specifying parameter derivation characteristics 34 tends to monotonically increase the video quality first change index along with the increase in frame rate, as shown in FIG. 37 described above. The frame rate vs. video quality first change index characteristic 34F can be modeled by, e.g., a general exponential function. Let fr be the frame rate, $\delta(fr)$ be the corresponding video quality first change index, and m', n', and o' be coefficients. In this case, the frame rate vs. video quality first change index characteristic 34F is given by $$\delta(fr)=m'+n'\cdot\exp(fr/o') \quad (20)$$

The frame rate vs. video quality second change index characteristic 34G of the estimation model specifying parameter derivation characteristics 34 tends to monotonically decrease the video quality second change index along with the increase in frame rate, as shown in FIG. 38 described above. The frame rate vs. video quality second change index characteristic 34G can be modeled by, e.g., a general linear function. Let fr be the frame rate, $\epsilon(fr)$ be the corresponding video quality second change index, and p' and q' be coefficients. In this case, the frame rate vs. video quality second change index characteristic 34G is given by $$\epsilon(fr)=p'+q'\cdot fr \quad (21)$$

Modeling of the estimation model specifying parameter derivation characteristics 34 need not always be done by using the above-described exponential function or linear function. Any other function may be used. For example, depending on the contents of the evaluation target audiovisual communication service or audiovisual medium, the network performance, or the contents of the estimation conditions 10, a video quality estimation process based on an input coding bit rate or input frame rate within a relatively limited range suffices. If such local estimation is possible, the frame rate vs. best video quality characteristic 34E or frame rate vs. video quality first change index characteristic 34F can be modeled by a simple function such as a linear function, as described above.

If the estimation model specifying parameters largely change with respect to the input coding bit rate or input frame rate, the frame rate vs. video quality second change index characteristic 34G and the frame rate vs. best video quality characteristic 34E or frame rate vs. video quality first change index characteristic 34F may be modeled by using another function such as an exponential function or logistic function.

Operation of the Sixth Embodiment

Figure 43:
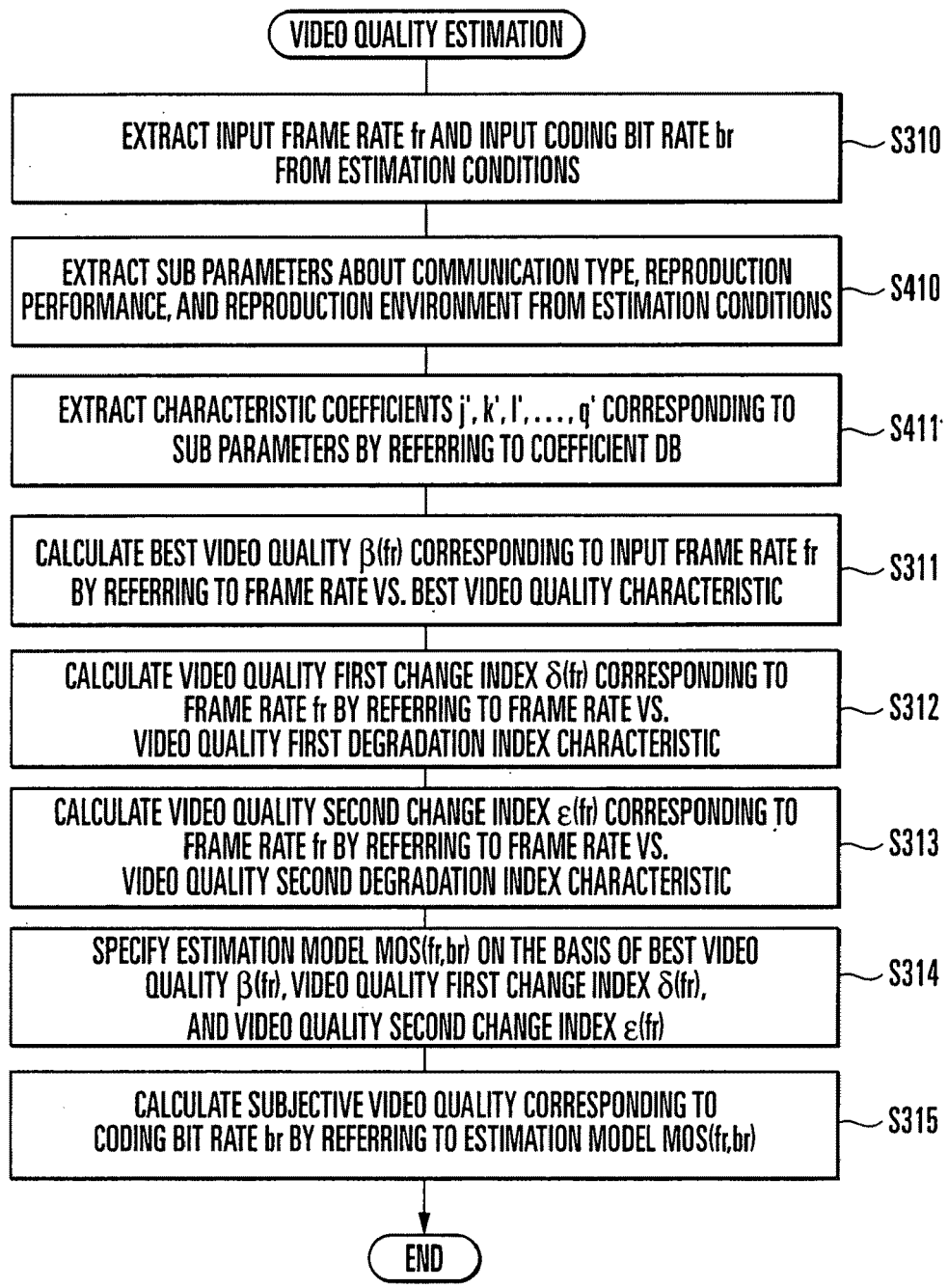
FIG. 43 is a flowchart illustrating the video quality estimation process of the video quality estimation apparatus according to the sixth embodiment of the present invention.

The operation of the video quality estimation apparatus according to the sixth embodiment of the present invention will be described next with reference to FIG. 43. FIG. 43 is a flowchart illustrating the video quality estimation process of the video quality estimation apparatus according to the sixth embodiment of the present invention. The same step numbers as in FIG. 39 described above denote the same or similar steps in FIG. 43.

A video quality estimation apparatus 1 starts the video quality estimation process in FIG. 43 in accordance with an instruction operation from the operator or input of the estimation conditions 10. The communication type parameter 25A, reproduction performance parameter 25B, and reproduction environment parameter 25C are used as the sub parameters 25. The characteristic coefficient DB 28 in the storage unit 28M stores the sets of the sub parameters 25 and characteristic coefficients 29 in advance.

First, a parameter extraction unit 11 extracts the various estimation conditions 10 related to an evaluation target audiovisual communication service, extracts a coding bit rate and a frame rate related to encoding of an audiovisual medium from the estimation conditions 10, and outputs an input coding bit rate br (21B) and an input frame rate fr (21A) as main parameters 21 (step S310). The parameter extraction unit 11 also extracts the communication type parameter 25A, reproduction performance parameter 25B, and reproduction environment parameter 25C from the estimation conditions 10 and outputs them as the sub parameters 25 (step S410).

The characteristic coefficient extraction unit 17 extracts and outputs the characteristic coefficients j', k', l', . . . , q' corresponding to the values of the sub parameters 25 by referring to the characteristic coefficient DB 28 in the storage unit 28M (step S411).

Accordingly, the estimation model specifying unit 15A causes a best video quality calculation unit 16E to calculate best video quality β(fr) (35E) corresponding to the input frame rate fr (21A) by referring to the frame rate vs. best video quality characteristic 34E which is specified by the characteristic coefficients j', k', and l' of the characteristic coefficients 29 (step S311).

Next, the estimation model specifying unit 15A causes a video quality first change index calculation unit 16F to calculate a video quality first change index δ(fr) (35F) corresponding to the input frame rate fr (21A) by referring to the frame rate vs. video quality first change index characteristic 34F which is specified by the characteristic coefficients d', e', and f' of the characteristic coefficients 29 (step S312).

Similarly, the estimation model specifying unit 15A causes a video quality second change index calculation unit 16G to calculate a video quality second change index ε(fr) (35G) corresponding to the input frame rate fr (21A) by referring to the frame rate vs. video quality second change index characteristic 34G which is specified by the characteristic coefficients g' and q' of the characteristic coefficients 29 (step S313).

After the estimation model specifying parameters 35 are calculated, the estimation model specifying unit 15A causes an estimation model generation unit 16D to substitute the actual values of the estimation model specifying parameters 35 including the best video quality β(fr), video quality first change index s(fr), and video quality second change index t(fr) into equation (18) described above, thereby specifying an estimation model 36, i.e., coding bit rate vs. subjective video quality characteristic (step S314).

Then, the video quality estimation apparatus 1 causes a video quality estimation unit 15 to calculate video quality corresponding to the input coding bit rate 21B of the main parameters 21 output from the parameter extraction unit 11 by referring to the estimation model 36 specified by the estimation model specifying unit 15A, outputs the video quality as a reference subjective video quality 23 of subjective video quality a viewer actually senses from the audiovisual medium reproduced on the terminal by using the evaluation target audiovisual communication service (step S315), and finishes the series of video quality estimation processes.

As described above, in this embodiment, the characteristic coefficient extraction unit 17 extracts, from the characteristic coefficient DB 28 in the storage unit 28M, the characteristic coefficients 29 corresponding to the sub parameters 25 which are extracted by the parameter extraction unit 11 and include at least one of the communication type parameter 25A, reproduction performance parameter 25B, and reproduction environment parameter 25C. The estimation model specifying unit 15A calculates the estimation model specifying parameters 35 corresponding to the input frame rate 21A on the basis of the estimation model specifying parameter derivation characteristics 34 specified by the characteristic coefficients 29. It is therefore possible to derive the estimation model specifying parameters 35 based on the specific properties of the evaluation target audiovisual communication service or terminal. This improves the reference video quality estimation accuracy.

Especially, in estimating video quality in the prior art, a video quality estimation model needs to be prepared for each encoding method or terminal used in an evaluation target audiovisual communication service. However, according to this embodiment, the video quality estimation model does not depend on the encoding method or terminal. The same video quality estimation model can be used only by referring to the coefficients to be used in the video quality estimation model in accordance with the encoding method or terminal. It is therefore possible to flexibly cope with audiovisual communication services in different environments. Hence, a video quality correction unit 13 described in the first or second embodiment can estimate a subjective video quality estimation value 24 corresponding to the arbitrary estimation conditions 10 without preparing the reference subjective video quality 23.

Figure 44:
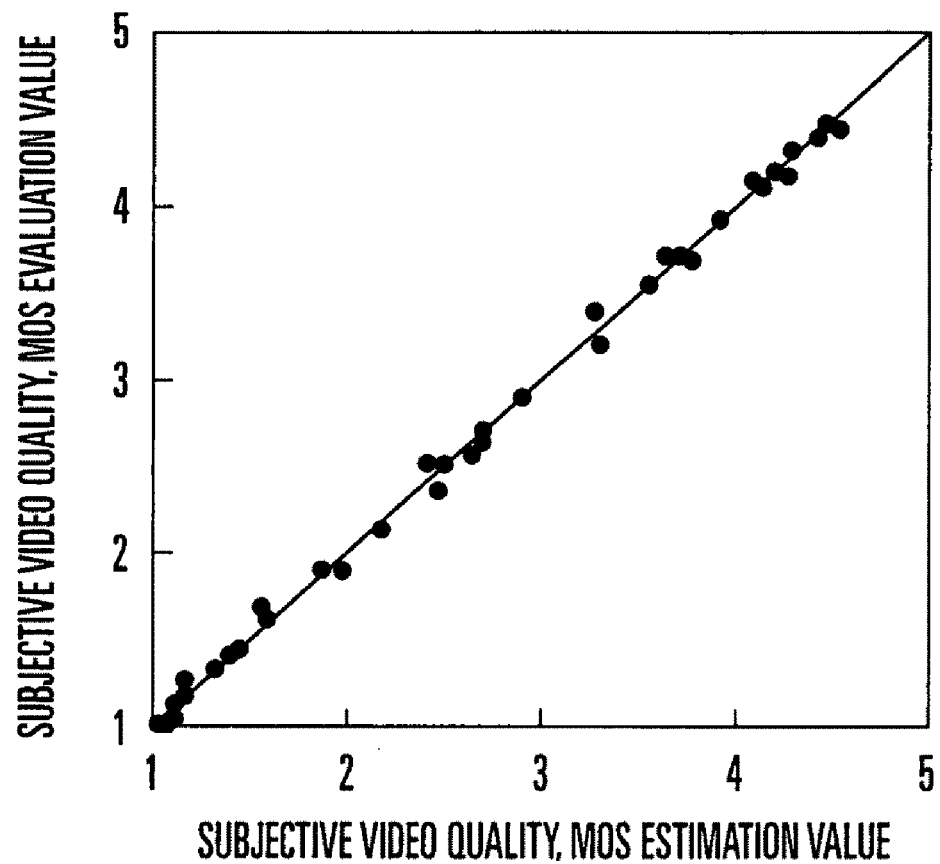
FIG. 44 is a graph showing the estimation accuracy of a video quality estimation apparatus using the embodiment.

FIG. 44 is a graph showing the estimation accuracy of a video quality estimation apparatus using this embodiment. Referring to FIG. 44, the abscissa represents the estimation value (MOS value) of subjective video quality estimated by using the video quality estimation apparatus, and the ordinate represents the evaluation value (MOS value) of subjective video quality actually opinion-evaluated by a viewer. The error between the evaluation value and the estimation value is smaller, and the estimation accuracy is higher in FIG. 44 than in FIG. 32 that shows the estimation accuracy of the conventional video quality estimation apparatus based on reference 2 described above. These are comparison results under specific estimation conditions. Similar comparison results have been confirmed even when another encoding method or terminal was used.

Extension of Embodiments

In the above-described embodiments, the degradation model 22 is modeled using an exponential function, and the estimation model 36 is modeled using a Gaussian function or logistic function. However, the present invention is not limited to this. Any other function such as a linear function, quadratic function, or higher-order function is also usable. In the above-described example, the degradation model 22 or estimation model 36 is modeled by a function. Any model other than a function, e.g., a black box model such as a neural network or case-based reasoning that specifies only the input/output characteristic may be used.

As for the correlation between the sub parameters 25 and the degradation index coefficients 27 in the degradation index coefficient DB 26 used in the second embodiment or the correlation between the sub parameters 25 and the characteristic coefficients 29 in the characteristic coefficient DB 28 used in the fourth and sixth embodiments, the degradation index coefficients 27 or characteristic coefficients 29 may be calculated by actually measuring the degradation index derivation characteristics 31 or estimation model specifying parameter derivation characteristics 34 for each combination of various sub parameters 25 and executing a convergence operation by the least squares method for the obtained measurement data. The video quality estimation apparatus 1 may include an arrangement for such coefficient calculation.

In the embodiments, storage units such as the storage units 23M, 28M, 31M, and 34M are formed by separate storage devices. However, the present invention is not limited to this. Some or all of the storage units may be formed by a single storage device.

The invention claimed is:

1. A video quality estimation apparatus comprising:
a parameter extraction unit which extracts, as main parameters, an input coding bit rate representing the number of coding bits per unit time, an input frame rate representing the number of frames per unit time, and an input packet loss rate representing a packet loss occurrence probability of an audiovisual medium encoded into a plurality of frames;
a first storage unit which stores reference subjective video quality representing subjective video quality of the audiovisual medium encoded at the input coding bit rate and the input frame rate without packet loss;
a degradation model specifying unit which specifies a degradation model representing a relationship between the input packet loss rate and degradation in the reference subjective video quality on the basis of the input coding bit rate and the input frame rate;
a video quality correction unit which corrects the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal;
a second storage unit which stores a first degradation index characteristic representing a relationship between a frame rate of the audiovisual medium and a first degradation index representing a degree of influence of a packet loss rate on degradation in the subjective video quality at the frame rate and a second degradation index characteristic resenting a relationship between a coding bit rate of the audiovisual medium and a second degradation index representing a degree of influence of a packet loss rate on degradation in the subjective video quality at the coding bit rate,
wherein said degradation model specifying unit includes a first degradation index calculation unit which calculates the first degradation index corresponding to the input frame rate by referring to the first degradation index characteristic, a second degradation index calculation unit which calculates the second degradation index corresponding to the input coding bit rate by referring to the second degradation index characteristic, and a degradation index calculation unit which calculates a degradation index to specify the degradation model corresponding to the input frame rate and the coding bit rate by combining the first degradation index and the second degradation index, said apparatus further comprising:
a third storage unit which stores a correlation between degradation index coefficients to specify the degradation index characteristics and sub parameters including at least one of a communication type parameter indicating a type of the audiovisual communication, a reproduction performance parameter indicating reproduction performance of the audiovisual medium on the terminal, and a reproduction environment parameter indicating an ambient environment in reproducing the audiovisual medium on the terminal; and
a degradation index coefficient extraction unit which extracts degradation index coefficients corresponding to sub parameters extracted by said parameter extraction unit by referring to the correlation, wherein said degradation model specifying unit calculates the degradation index and the second degradation index by referring to the degradation index characteristics specified by the degradation index coefficients.

2. A video quality estimation apparatus comprising:
a parameter extraction unit which extracts, as main parameters, an input coding bit rate representing the number of coding bits per unit time, an input frame rate representing the number of frames per unit, and an input packet loss rate representing a packet loss occurrence probability of an audiovisual medium encoded into a plurality of frames;
a first storage unit which stores reference subjective video quality representing subjective video quality of the audiovisual medium encoded at the input coding bit rate and the input frame rate without packet loss;
a degradation model specifying unit which specifies a degradation model representing a relationship between the input packet loss rate and degradation in the reference subjective video quality on the basis of the input coding bit rate and the input frame rate;
a video quality correction unit which corrects the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal;
an estimation model specifying unit which specifies an estimation model representing a relationship between the subjective video quality and a frame rate of the audiovisual medium on the basis of the input coding bit rate; and
a video quality estimation unit ich estimates subjective video quality corresponding to the input frame rate by using the specified estimation mode and outputs the subjective video quality as the reference subjective video quality, wherein said estimation model specifying unit specifies the estimation model on the basis of estimation model specifying parameters including an optimum frame rate representing a frame rate corresponding to best subjective video quality of the audiovisual medium transmitted at the input coding bit rate, and best video quality representing video quality at that time.

3. A video quality estimation apparatus comprising:
a parameter extraction unit which extracts, as main parameters, an input coding bit rate resenting the number of coding bits per unit time, an input frame rate representing the number of frames per unit time, and an input packet loss rate representing a packet loss occurrence probability of an audiovisual medium encoded into a plurality of frames;
a first storage unit which stores reference subjective video quality representing subjective video quality of the audiovisual medium encoded at the input coding bit rate and the input frame rate without packet loss;
a degradation model specifying unit which specifies a degradation model representing a relationship between the input packet loss rate and degradation in the reference subjective video quality on the basis of the input coding bit rate and the input frame rate;
a video quality correction unit which corrects the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal;
an estimation model specifying unit which specifies an estimation model representing a relationship between the subjective video quality and a frame rate of the audiovisual medium on the basis of the input coding bit rate;
a video quality estimation unit which estimates subjective video quality corresponding to the input frame rate by using the specified estimation model and outputs the subjective video quality as the reference subjective video quality,
a second storage unit which stores a correlation between characteristic coefficients to specify the estimation model and sub parameters including at least one of a communication type parameter indicating a type of the audiovisual communication, a reproduction performance parameter indicating reproduction performance of the audiovisual medium on the terminal, and a reproduction environment parameter indicating an ambient environment in reproducing the audiovisual medium on the terminal; and
a characteristic coefficient extraction unit which extracts characteristic coefficients corresponding to sub parameters extracted by said parameter extraction unit by referring to the correlation,
wherein said estimation model specifying unit specifies the estimation model specified by the characteristic coefficients and the input coding bit rate.

4. A video quality estimation method comprising the steps of:
causing a parameter extraction unit to extract, as main parameters, an input coding bit rate representing the number of coding bits per unit time, an input frame rate representing the number of frames per unit time, and an input packet loss rate representing a packet loss occurrence probability of an audiovisual medium encoded into a plurality of frames;
causing a first storage unit to store reference subjective video quality representing subjective video quality of the audiovisual medium encoded at the coding bit rate and the input frame rate without packet loss;
causing a degradation model specifying unit to specify a degradation model representing a relationship between the input packet loss rate and degradation in reference subjective video quality on the basis of the input coding bit rate and the input frame rate; and
causing a video quality correction unit to correct the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal,
causing a second storage unit to store a correlation between degradation index coefficients to specify the degradation index characteristics and sub parameters including at least one of a communication type parameter indicating a type of audiovisual communication, a reproduction performance parameter indicating reproduction performance of the audiovisual medium on the terminal, and a reproduction environment parameter indicating an ambient environment in reproducing the audiovisual medium on the terminal; and
causing a degradation index coefficient extraction unit to extract degradation index coefficients corresponding to sub parameters extracted by the parameter extraction unit by referring to the correlation,
wherein in the degradation model specifying step, the first degradation index and the second degradation index are calculated by referring to the degradation index characteristics specified by the degradation index coefficients.

5. A video quality estimation method comprising the steps of:
causing a parameter extraction unit to extract, as main parameters, an input coding bit rate representing the number of coding bits per unit time, an input frame representing the number of frames per unit time, and an input packet loss rate representing a packet loss occurrence probability of an audiovisual medium encoded into a plurality of frames;
causing a first storage unit to store reference subjective video quality representing subjective video quality of the audiovisual medium encoded at the input coding bit rate and the input frame rate without packet loss;
causing a degradation model specifying unit to specify a degradation model representing a relationship between the input packet loss rate and degradation in the reference subjective video quality on the basis of the input coding bit rate and the input rate;
causing a video quality correction unit to correct the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal;

causing an estimation model specifying unit to specify an estimation model representing a relationship between the subjective video quality and a frame rate of the audiovisual medium on the basis of the input coding bit rate; and causing a video quality estimation unit to estimate subjective video quality corresponding to the input frame rate by using the specified estimation model and output the subjective video quality as the reference subjective video quality, wherein the estimation model specifying step, the estimation model is specified on the basis of estimation model specifying parameters including an optimum frame rate representing a frame rate corresponding to best subjective video quality of the audiovisual medium transmitted at the input coding bit rate, and best video quality representing video quality at that time.

6. A video quality estimation method comprising the steps of:

causing a parameter extraction unit to extract, as main parameter, an input coding bit rate representing the number of coding bits per unit time, an input frame rate representing the number of frames per unit time, and an input packet loss rate representing a packet loss occurrence probability of an audiovisual medium encoded into a plurality of frames;

causing a first storage unit to store reference subjective video quality representing subjective video quality of the audiovisual medium encoded at the input coding bit rate and the input frame rate without packet loss;

causing a degradation model specifying unit to specify a degradation model representing a relationship between the input packet loss rate and degradation in the reference subjective video quality on the basis of the input coding bit rate and the input frame rate;

causing a video quality correction unit to correct the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal;

causing an estimation model specifying unit to specify an estimation model representing a relationship between the subjective video quality and a frame rate of the audiovisual medium on the basis of the input coding bit rate;

causing a video quality estimation unit to estimate subjective video quality corresponding to the input frame rate by using the specified estimation model and output the subjective video quality as the reference subjective video quality;

causing a second storage unit to store a correlation between characteristic coefficients to specify the estimation model and sub parameters including at least one of a communication type parameter indicating a type of audiovisual communication, a reproduction performance parameter indicating reproduction performance of the audiovisual medium on the terminal, and a reproduction environment parameter indicating an ambient environment in reproducing the audiovisual medium on the terminal; and causing a characteristic coefficient extraction unit to extract characteristic coefficients corresponding to sub parameters extracted by the parameter extraction unit by referring to the correlation, wherein in the estimation model specifying step, the estimation model specified by the characteristic coefficients and the input coding bit rate is specified.

7. A non-transitory computer-readable medium encoded with a computer program for causing a computer of a video quality estimation apparatus which calculates, for audiovisual communication to transmit an audiovisual medium encoded into a plurality of frames to an arbitrary terminal via a communication network, an estimation value of subjective video quality a viewer actually senses from the audiovisual medium reproduced on the terminal, to execute the steps of:

causing a parameter extraction unit to extract, as main parameters, an input coding bit rate representing the number of coding bits per unit time, an input frame rate representing the number of frames per unit time, and an input packet loss rate representing a packet loss occurrence probability of an audiovisual medium encoded into a plurality of frames;

causing a first storage unit to store reference subjective video quality representing subjective video quality of the audiovisual medium encoded at the input coding bit rate and the input frame rate without packet loss;

causing a degradation model specifying unit to specify a degradation model representing a relationship between the input packet loss rate and degradation in the reference subjective video quality on the basis of the input coding bit rate and the input frame rate; and causing a video quality correction unit to correct the reference subjective video quality on the basis of a video quality degradation ratio corresponding to the input packet loss rate, which is calculated by using the specified degradation model, thereby calculating an estimation value of subjective video quality a viewer actually senses from the audiovisual medium received via a communication network and reproduced on an arbitrary terminal;

causing a parameter extraction unit to extract, as main parameters, an input coding bit rate representing the number of coding bits per unit time, an input frame rate representing the number of frames per unit time, and an input packet loss rate representing a packet loss occurrence probability of an audiovisual medium encoded into a plurality of frames;

causing a second storage unit to store a correlation between degradation index coefficients to specify the degradation index characteristics and sub parameters including at least one of a communication type parameter indicating a type of audiovisual communication, a reproduction performance parameter indicating reproduction performance of the audiovisual medium on the terminal, and a reproduction environment parameter indicating an ambient environment in reproducing the audiovisual medium on the terminal; and causing a degradation index coefficient extraction unit to extract degradation index coefficients corresponding to sub parameters extracted by the parameter extraction unit by referring to the correlation, wherein in the degradation model specifying step, the first degradation index and the second degradation index are calculated by referring to the degradation index characteristics specified by the degradation index coefficients.

* * * * *

UNITED STATES PATENT AND TRADEMARK OFFICE
CERTIFICATE OF CORRECTION

| | | |
|---|---|---|
| PATENT NO. | : 8,154,602 B2 | Page 1 of 1 |
| APPLICATION NO. | : 11/886406 | |
| DATED | : April 10, 2012 | |
| INVENTOR(S) | : Kazuhisa Yamagishi and Takanori Hayashi | |

It is certified that error appears in the above-identified patent and that said Letters Patent is hereby corrected as shown below:

On the Title Page, in Item [86], under PCT No., please delete "PCT/JP2006/023733" and insert -- PCT/JP2006/323733 --.

In the Claims, Column 40, Claim 1, line 9, please delete "resenting" and insert -- representing --.

Column 40, Claim 2, line 49, after "per unit", please insert -- time --.

Column 41, Claim 3, line 20, please delete "resenting" and insert -- representing --.

Column 42, Claim 4, line 16, after "degradation in", please insert -- the --.

Column 42, Claim 5, line 61, after "the input", please insert -- frame --.

Column 43, Claim 6, line 20, please delete "parameter" and insert -- parameters --.

Signed and Sealed this
Eighteenth Day of September, 2012

David J. Kappos
*Director of the United States Patent and Trademark Office*